(12) United States Patent
Takashima et al.

(10) Patent No.: US 7,086,726 B2
(45) Date of Patent: Aug. 8, 2006

(54) INKJET RECORDING METHOD

(75) Inventors: Masanobu Takashima, Shizuoka-ken (JP); Yoshiharu Yabuki, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 208 days.

(21) Appl. No.: 10/408,655

(22) Filed: Apr. 8, 2003

(65) Prior Publication Data

US 2004/0012663 A1 Jan. 22, 2004

(30) Foreign Application Priority Data

| Apr. 9, 2002 | (JP) | 2002-107030 |
| Apr. 9, 2002 | (JP) | 2002-107031 |
| Apr. 11, 2002 | (JP) | 2002-109112 |
| Apr. 17, 2002 | (JP) | 2002-114690 |
| Jan. 28, 2003 | (JP) | 2003-018394 |

(51) Int. Cl.
*B41J 2/01* (2006.01)

(52) U.S. Cl. ............. 347/100; 347/95; 106/31.27; 523/160

(58) Field of Classification Search ......... 347/101, 347/105, 100, 96, 95; 428/195, 32.1; 523/160; 106/31.27, 31.6, 31.13

See application file for complete search history.

(56) References Cited

U.S. PATENT DOCUMENTS

| 4,830,911 A | * | 5/1989 | Kojima et al. ............ 347/105 |
| 5,041,328 A | * | 8/1991 | Akiya et al. ............. 347/105 |
| 5,104,730 A | | 4/1992 | Misuda et al. |
| 5,182,175 A | | 1/1993 | Sakaki et al. |
| 5,612,281 A | | 3/1997 | Kobayashi et al. |
| 6,093,483 A | | 7/2000 | Tanuma |
| 6,165,606 A | | 12/2000 | Kasahara et al. |
| 6,500,523 B1 | | 12/2002 | Hirose et al. |
| 6,620,470 B1 | * | 9/2003 | Nojima et al. .......... 428/32.34 |
| 6,699,536 B1 | * | 3/2004 | Katoh et al. ............ 428/32.28 |
| 2004/0020408 A1 | * | 2/2004 | Yabuki .................... 347/100 |
| 2004/0024085 A1 | * | 2/2004 | Ishizuka et al. .......... 523/160 |

FOREIGN PATENT DOCUMENTS

| EP | 0 439 153 A2 | | 7/1991 |
| EP | 439153 A2 | * | 7/1991 |
| EP | 1 219 457 A1 | | 7/2002 |
| JP | 2000-309157 | | 11/2000 |
| JP | 2002-059641 | | 2/2002 |
| WO | WO 95/16561 A1 | | 6/1995 |

* cited by examiner

*Primary Examiner*—Manish S. Shah
(74) *Attorney, Agent, or Firm*—Sughrue Mion, PLLC

(57) ABSTRACT

An inkjet recording method of forming an image on an inkjet recording sheet that has, on a support, a colorant-receiving layer which contains at least one inorganic mordant, by using an inkjet recording ink set that comprises, as minimum constituent elements thereof, a yellow ink which contains at least one yellow dye, a magenta ink which contains at least one magenta dye and a cyan ink which contains at least one cyan dye, wherein an oxidation potential of the magenta dye and an oxidation potential of the cyan dye are each nobler than 0.8 V (vs SCE).

21 Claims, No Drawings

INKJET RECORDING METHOD

BACKGROUND OF THE INVENTION

1. Field of the Invention

The present invention relates to an inkjet recording method that enables formation of images of good fastness, high density and good glossiness.

2. Description of the Related Art

These days the mainstream of image-recording material is for forming color images. Concretely, inkjet recording material, thermal transfer image-recording material, electrophotographic recording material, transfer silver halide photographic material, printing ink, recording pens and others are much utilized.

In these color image-recording materials, used are three primary colors (dyes, pigments) for a subtractive color process for reproducing or recording full-color images. At present, however, few dyes are available, which have absorption characteristics capable of realizing any desired color reproduction range and which are fast under various service conditions, and it is much desired to improve colorants.

An inkjet recording method has become much popularized and is being further developed, since the material cost is low, it enables high-speed recording, it does not give too much recording noise, and it facilitates color recording.

The inkjet recording method includes two types, a continuous type of continuously jetting ink drops, and an on-demand type of jetting ink drops according to image information signals. For jetting ink drops according to the method, employable is any of a system of applying pressure to ink drops by using a piezoelectric device to thereby make the ink drops jet out, a system of thermally bubbling ink to jet the ink drops, a system of using ultrasonic waves, or a system of sucking and jetting ink drops by electrostatic force. Ink for inkjet recording includes aqueous ink, oily ink and solid (hot-melt) ink.

Colorant to be used in such inkjet recording ink must satisfy the following requirements: its solubility or dispersibility in solvent is good; it enables high-density recording; its hue is good; it is fast to light, heat, active gas in the environment (e.g., NOx, oxidizing gas such as ozone, SOx); it is fast to water and chemicals; it well fixes in image-receiving material and hardly bleeds out; its storage stability in ink is good; it is not toxic; its purity is high; and it is inexpensive and is readily available. However, it is extremely difficult to seek such colorant that satisfies all these requirements on a high level. In particular, the requirement which the colorant is strongly desired to satisfy is that it has a good hue of any of three primary colors and is fast to light, moisture and heat, especially to oxidizing gas such as ozone in the environment while printed on an image-receiving material that has an ink-receiving layer with porous white inorganic pigment particles therein.

Heretofore, azo dyes have been widely used for magenta dyes, of which the coupling component is any of phenols, naphthols or anilines. Azo dyes disclosed in JP-A 11-209673 and Japanese Patent No. 3,020,660 have good hue, but are problematic in that they are not fast to light. To solve the problem, Japanese Patent Application No. 2000-220649 discloses dyes that have good hue and improved lightfastness. However, the dyes disclosed in these patent publications are not fast to oxidizing gas such as ozone.

Typical examples of cyan dyes are phthalocyanine dyes and triphenylmethane dyes. Phthalocyanine dyes are most widely used, and their typical examples are C.I. Direct Blue 86, 87 and 199. As compared with magenta and yellow dyes, they are fast to light but are greatly discolored and faded when exposed to nitrogen oxide gas which is much discussed these days for environmental problems, or to oxidizing gas such as ozone.

JP-A 3-103484, 4-39365 and 2000-303009 disclose ozone gas-resistant phthalocyanine dyes, which, however, are still unsatisfactory in point of their fastness to oxidizing gas and are therefore desired to be further improved.

On the other hand, triphenylmethane dyes such as typically Acid Blue 9 have good hue but are not fast to light and ozone gas.

As yellow dyes, heretofore used are azobenzene dyes such as typically Direct Yellow 86 and 120, and heterocyclic azo dyes, for example, pyrazolonazo dyes such as Acid Yellow 17, and pyridonazo dyes. In addition, quinophthalone dyes are often proposed. Of those conventional dyes, quinophthalone dyes have good hue especially in point of the tailing profile on the long wave side in the absorption spectral pattern but most of them are not fast to ozone and light, while azobenzene dyes are fast to them but their tailing profile on the long wave side is not good. To that effect, dyes satisfying the two requirements of good hue and good fastness are not available at present.

For obtaining fast full-color images of good color reproducibility, dyes to constitute the images are desired to satisfy the following requirements:

Dyes of three primary colors all have good absorption characteristics.
Dyes of three primary colors are optimally combined to realize a broad color reproduction area.
Dyes of three primary colors all have high fastness.
The fastness of dyes is not worsened through interaction thereof.
Dyes of three primary colors are well balanced in point of their fastness.

However, there is no report at all relating to the fastness of dyes to oxidizing gas such as ozone, which is discussed these days as a serious problem in the art of inkjet printing, especially relating to the properties of dyes as to what structures and what properties of dyes are effective for ozone fastness thereof. At present, therefore, it is not possible to obtain a guideline for selecting dyes. Further, it is extremely difficult to select dyes that are fast to light as well.

Even though dyes of good ozone fastness are combined and used in forming full-color images, the images formed will be discolored if the combined dyes differ too much in point of their ozone fastness. Therefore, it is a matter of importance that the combined dyes, especially the combined magenta and cyan dyes are well balanced in point of their ozone fastness. If so and even when the full-color images formed are attacked by ozone, the constitutive dyes may be faded while being well balanced in point of the degree of fading of the individual dyes, and, as a result, the images may be prevented from being fatally damaged.

Depending on the type of the mordant to be combined therewith, dyes may be excessively flocculated to lower the density of the images formed. An inkjet recording method is therefore desired that enables formation of images of good fastness, high density and good glossiness.

SUMMARY OF THE INVENTION

The present invention is to solve the problems in the related art as above and to attain the objects mentioned below. Specifically, the invention is to provide an inkjet recording method capable of giving color images that are fast to ozone gas and are well balanced in point of the degree of fading of the constitutive dyes. The invention is also to provide an inkjet recording method capable of giving color images that are fast to ozone gas and have high color density and good glossiness.

We, the present inventors, have studied to achieve an inkjet recording method capable of giving color images that have good hue and are fast to light and gas (especially to ozone gas), and have found that the problems mentioned above can be solved by a combination of an inkjet recording sheet that has an inorganic mordant-containing, colorant-receiving layer and an ink set that comprises specific dyes not heretofore known in point of their oxidation potential. This is the first aspect of the invention.

Specifically, the first aspect of the invention provides an inkjet recording method of forming an image on an inkjet recording sheet that has, on a support, a colorant-receiving layer which contains at least one inorganic mordant, by using an inkjet recording ink set that comprises, as minimum constituent elements thereof, a yellow ink which contains at least one yellow dye, a magenta ink which contains at least one magenta dye and a cyan ink which contains at least one cyan dye, wherein an oxidation potential of the magenta dye and an oxidation potential of the cyan dye are each nobler than 0.8 V (vs SCE).

Preferably, the inorganic mordant is selected from aluminium-containing compounds and zirconium-containing compounds.

Also having studied to achieve an inkjet recording method capable of giving color images that have good hue and are fast to light and gas (especially to ozone gas), we, the present inventors, have found that the problems mentioned above can be solved by a combination of an inkjet recording sheet that has a particulate alumina or alumina hydrate-containing, colorant-receiving layer and an ink set that comprises specific dyes not heretofore known in point of their oxidation potential. This is the second aspect of the invention.

Specifically, the second aspect of the invention provides an inkjet recording method of forming an image on an inkjet recording sheet that has, on a support, a colorant-receiving layer which contains at least alumina particles or alumina hydrate, by using an inkjet recording ink set that comprises, as minimum constituent elements thereof, a yellow ink which contains at least one yellow dye, a magenta ink which contains at least one magenta dye and a cyan ink which contains at least one cyan dye, wherein an oxidation potential of the magenta dye and an oxidation potential of the cyan dye are each nobler than 0.8 V (vs SCE).

Also having studied to achieve an inkjet recording method capable of giving color images that are fast to ozone gas and have high density and good glossiness, we, the present inventors, have found that the problems mentioned above can be solved by a combination of an inkjet recording sheet that has a colorant-receiving layer containing a cationic polymer having at least any of primary, secondary or tertiary amino groups, and an ink set that comprises specific dyes not heretofore known in point of their oxidation potential. This is the third aspect of the invention.

Specifically, the third aspect of the invention provides an inkjet recording method of forming an image on an inkjet recording sheet that has, on a support, a colorant-receiving layer which contains a cationic polymer having at least any one of primary, secondary or tertiary amino groups, by using an inkjet recording ink set that comprises, as minimum constituent elements thereof, a yellow ink which contains at least one yellow dye, a magenta ink which contains at least one magenta dye and a cyan ink which contains at least one cyan dye, wherein an oxidation potential of the magenta dye and an oxidation potential of the cyan dye are each nobler than 0.8 V (vs SCE).

The cationic polymer preferably has at least one primary amine.

Also preferably, the cationic polymer is at least one of polyallylamine, polyvinylamine and their derivatives.

Also preferably, the colorant-receiving layer is formed by applying a coating liquid that contains at least fine particles and water-soluble resin, onto the support followed by crosslinking and curing the coating layer. Still preferably, the coating layer is crosslinked and cured as follows: a basic solution having pH of at least 7.1 is applied onto the coating layer, with a crosslinking agent being added to the coating liquid and/or to the basic solution, either (1) at the same time that the coating liquid is applied onto the support to form the coating layer or (2) in the course of drying the coating layer formed by applying the coating liquid onto the support before the coating layer exhibits a falling rate of drying.

Also having studied to achieve an inkjet recording method capable of giving color images that are fast to ozone gas and have high density, We, the present inventors, have found that the problems mentioned above can be solved by a combination of an inkjet recording sheet that has a colorant-receiving layer containing a quaternary cationic polymer having an aromatic group in a partial structure thereof, and an ink set that comprises specific dyes not heretofore known in point of their oxidation potential. This is the fourth aspect of the invention.

Specifically, the fourth aspect of the invention provides an inkjet recording method of forming an image on an inkjet recording sheet that has, on a support, a colorant-receiving layer which contains a quaternary cationic polymer having at least one aromatic group in a partial structure thereof, by using an inkjet recording ink set that comprises, as minimum constituent elements thereof, a yellow ink which contains at least one yellow dye, a magenta ink which contains at least one magenta dye and a cyan ink which contains at least one cyan dye, wherein an oxidation potential of the magenta dye and an oxidation potential of the cyan dye are each nobler than 0.8 V (vs SCE).

The cationic polymer preferably has a benzyl bond in a partial skeleton thereof.

According to the first to fourth aspect of the present invention, we have found that, when the dyes of three primary colors satisfy the potential characteristics, then not only the reactivity of the respective dyes to ozone is significantly retarded but also the light fastness thereof is improved and the dyes of different colors do not interact each other, therefore having no problem of fading in the area where they are mixed. We have further found that, when dyes, especially magenta dyes or cyan dyes not satisfying the specific potential condition are used as opposed to the above, then the images formed lose their overall color balance and the full-color image quality thereof is greatly lowered. Further our findings are as follows: even when inks of different densities are used as in the recent technique employed for increasing color reproducibility, pale color inks are free from a problem of light fastness. In addition, since the stability of the dyes themselves is improved, the oxidation stability of inks is also improved and the warranty period of the commercial products of inks can be prolonged.

DETAILED DESCRIPTION OF THE INVENTION

The first to fourth aspects of the present invention are described in detail hereinunder.

First described is the first aspect of the invention.

<Inkjet Recording Ink>

(Dye)

Magenta dye and cyan dye of which the oxidation potential is nobler than 0.8 V (vs SCE) are used in the invention. The dyes of which the oxidation potential is further nobler are more preferred. More preferably, the oxidation potential of the dyes is nobler than 1.0 V (vs SCE), even more preferably nobler than 1.1 V (vs SCE), still more preferably nobler than 1.15 V (vs SCE), most preferably nobler than 1.2 V (vs SCE).

The value of oxidation potential of a sample indicates the degree of transferability of electrons from the sample to an electrode. The sample having a larger value of oxidation potential (having a nobler oxidation potential) means that electrons are harder to be transferred from the sample to an electrode, or in other words, the sample is harder to be oxidized. As to the structure of a compound, the oxidation potential of the compound is nobler when an electron-attracting group is introduced thereinto, but is baser when an electron-donating group is introduced thereinto.

The value of oxidation potential will be described in detail hereinunder. Briefly, it means that the potential at which electrons are drawn off from a compound when the compound forms an anode in voltammetry, and it is believed that the oxidation potential of a compound is approximately the same as the energy level of ground-state HOMO of the compound.

We, the present inventors, have studied the ozone fastness of color images, and have found that there is a correlation between the oxidation potential of the compound in a color image and the ozone fastness of the color image, and, when a compound of which the oxidation potential is nobler than saturated calomel electrode (SCE) is used in forming a color image, the ozone fastness of the color image increases.

The reason why the ozone fastness of the color image is improved may be clarified from the relationship between HOMO (highest occupied molecular orbital) and LUMO (lowest unoccupied molecular orbital) of the compound and ozone gas. Specifically, it is believed that a colorant is oxidized through reaction of HOMO of the colorant with LUMO of ozone gas, and, as a result, the ozone fastness of a color image will be thereby lowered. Therefore, for improving the ozone fastness of color images, HOMO of the colorant shall be lowered to thereby lower the reactivity thereof with ozone gas.

The value of oxidation potential (Eox) may be readily measured by anyone skilled in the art. For example, methods of measuring it are described in *New Instrumental Methods in Electrochemistry* by P. Delahay (1954, Interscience Publishers); *Electrochemical Methods* by A. J. Bard et al. (1980, John Wiley & Sons); and *Electrochemical Measurement Methods* by A. Fujishima et al. (1984, Gihodo Publishing).

Measurement of oxidation potential is described materially. A sample to be analyzed is dissolved in a solvent such as dimethylformamide or acetonitrile that contains a supporting electrolyte such as sodium perchlorate or tetrapropylammonium perchlorate to have a concentration of from $1\times10^{-6}$ to $1\times10^{-4}$ mol·dm$^{-3}$, and its value of oxidation potential versus SCE (saturated calomel electrode) is measured through cyclic voltammetry or DC polarography.

For the supporting electrolyte and the solvent, suitable compounds may be selected depending on the oxidation potential and the solubility therein of the sample to be analyzed. Examples of usable supporting electrolytes and solvents are described in *Electrochemical Measurement Methods* by A. Fujishima et al. (1984, Gihodo Publishing, pp. 101–118).

The value of oxidation potential may deviate by tens millivolts or so, owing to the influence of the liquid junction potential or the sample solution resistance thereon, but it may be calibrated with a standard sample (e.g., hydroquinone). In that manner, the reproducibility of the thus-measured potential value is ensured.

In the invention, the oxidation potential of a compound is measured in N,N-dimethylformamide (in this, the concentration of the compound is $1\times10^{-3}$ mol·dm$^{-3}$) that contains 0.1 mol·dm$^{-3}$ of a supporting electrolyte, tetrapropylammonium perchlorate through DC polarography using SCE (saturated calomel electrode) as the reference electrode, a graphite electrode as the working electrode and a platinum electrode as the counter electrode.

Dyes of any structure satisfying the above-mentioned requirement for the oxidation potential thereof may be used in the invention. In particular, since yellow dyes are naturally noble in point of oxidation potential (having low HOMO), there is not so much limitation on their structure. The structure of the dyes necessary for satisfying the above-mentioned requirement for the oxidation potential thereof is described in detail hereinunder.

In the invention, for lowering the reactivity of dye with ozone, a type of electrophile, it is desirable to introduce an electron-attracting group into the skeleton of dye to thereby make the oxidation potential of dye nobler. This is described with reference to the Hammett's substituent constant, σp, a criterion of the degree of electrophilicity or electron-donability of substituents. Concretely, when a substituent having a large σp value such as nitro, cyano, sulfinyl, sulfonyl or sulfamoyl group is introduced into dye, then the oxidation potential of the thus-modified dye may be nobler.

The Hammett's substituent constant σp is described briefly. The Hammett's rule is a rule of thumb proposed by L. P. Hammett in 1935 for quantitatively discussing the influence of substituents on the reaction or equilibrium of benzene derivatives, and its reasonableness is widely admitted in the art. The substituent constant to be obtained by the Hammett's rule includes two values σp and σm, and these are seen in many ordinary documents. For example, their details are in *Lange's Handbook of Chemistry* by J. A. Dean (Ed. 12, 1979, McGraw-Hill); and extra issue of *Chemical Region* (Kagaku no Ryoiki) (No. 122, pp. 96–103, 1979, Nanko-do).

In addition to the above-mentioned substituents, in general, those having a larger number of atoms of higher electronic negativity as the constituent atoms of chromophores are more effective for making the oxidation potential of dye nobler. Therefore, for example, unsaturated hetero rings are preferred to aryl groups for the constitutive elements of chromophores as they are more effective for making the oxidation potential of dye nobler. Heteroatoms of higher electronic negativity are, for example, nitrogen, oxygen and sulfur atoms, and nitrogen atom is especially preferred.

Accordingly, dyes in which the chromophore includes a heteroatom or contains an unsaturated hetero ring or an electron-attracting group are preferred for use in the invention.

Preferred examples of chromophores that include a heteroatom are azo dyes, azomethine dyes and phthalocyanine dyes. Azo dyes are especially preferred.

The unsaturated hetero ring is preferably a 5- or 6-membered unsaturated hetero ring, including, for example, thiophene, furan, pyrrole, thiazole, oxazole, imidazole, isothiazole, isoxazole, pyrazole, thiadiazole, oxadiazole, triazole, pyridine, pyridazine, pyrimidine and pyrazine rings. The unsaturated hetero ring may form a condensed ring with a hydrocarbon ring and/or an additional hetero ring. In a nitrogen-containing hetero ring, the nitrogen atom may be quaternated. In the case where only one tautomer of a tautomeric hetero ring is described, it means to include the other tautomer. Of those mentioned above, preferred are thiazole, isothiazole, pyrazole, thiadiazole, pyridine, pyrimidine and pyrazine rings. Most preferred are isothiazole, pyrazole, 1,2,4-thiadiazole, 1,3,4-thiadiazole and pyridine rings.

Preferably, the Hammett's σp of the electron-attracting substituent is at least 0.40, more preferably at least 0.45, most preferably at least 0.50. In the case where one chromophore in dye has multiple electron-attracting groups, the sum total of σp of all the groups is preferably at least 0.50, more preferably at least 0.60, most preferably at least 0.70. Examples of the electron-attracting group having σp of at least 0.40 are described in above-mentioned *Lange's Handbook of Chemistry* by J. A. Dean (Ed. 12, 1979, McGraw-Hill), and extra issue of *Chemical Region* (Kagaku no Ryoiki) (No. 122, pp. 96–103, 1979, Nanko-do).

Preferred dyes used in the invention are combination of the following general formula (I):

(Ch)-(EWG)$_n$    General Formula (I)

wherein Ch represents an unsaturated hetero ring-containing chromophore; EWG represents an electron-attracting substituent with σp of at least 0.40, mentioned hereinunder; n indicates an integer of from 1 to 8.

Ch includes various chromophores of azo dyes, phthalocyanine dyes, azomethine dyes, quinone dyes (e.g., anthraquinone dyes, anthrapyridone dyes), carbonium dyes (e.g., triphenylmethane dyes, xanthene dyes, acridine dyes) and azine dyes (e.g., oxazine dyes, thiazine dyes) that have an unsaturated hetero ring-containing chromophore. Preferred are azo dyes, phthalocyanine dyes, azomethine dyes and anthrapyridone dyes that have an unsaturated hetero ring-containing chromophore; and most preferred are azo dyes and phthalocyanine dyes that have an unsaturated hetero ring-containing chromophore.

Azo dyes preferred for magenta and yellow dyes in the invention are represented by the following general formula (II):

Het(A)-N=N-Het(B)    General Formula (II)

wherein Het(A) and Het(B) each represent a 5- or 6-membered unsaturated hetero ring.

Examples of the unsaturated hetero ring for Het(A) and Het(B) are thiophene, furan, pyrrole, thiazole, oxazole, imidazole, isothiazole, isoxazole, pyrazole, thiadiazole, oxadiazole, triazole, pyridine, pyridazine, pyrimidine and pyrazine rings. These unsaturated hetero rings have an additional substituent. The substituents on the unsaturated hetero ring may bond to each other to form a condensed ring with a hydrocarbon ring or an additional unsaturated hetero ring, and the condensed ring may have an additional substituent. In a nitrogen-containing unsaturated hetero ring, the nitrogen atom may be quaternated. In the case where only one tautomer of a tautomeric unsaturated hetero ring is described, it means to include the other tautomer.

In the case where the dye is a water-soluble dye, it preferably has an additional ionic hydrophilic substituent. The ionic hydrophilic substituent includes a sulfo group, a carboxyl group, a phosphono group, a quaternary ammonium group, etc.

The hetero ring for Het(A) and Het(B) is preferably any of thiazole, isothiazole, pyrazole, thiadiazole, pyridine and pyrazine rings. More preferably, it is any of isothiazole, pyrazole, thiadiazole and pyridine ring; and most preferably it is any of pyrazole, 1,2,4-thiadiazole and pyridine rings.

Het(A) and Het(B) may have a substituent. The substituent includes, for example, a halogen atom, an alkyl group (including a cycloalkyl group), an alkenyl group (including a cycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkyl and arylsulfonylamino group, a mercapto group, an alkylthio group, an arylthio group, a heterocyclic-thio group, a sulfamoyl group, a sulfo group, an alkyl and arylsulfinyl group, an alkyl and arylsulfonyl group, an acyl group, an aryloxycarbonyl group, an alkoxycarbonyl group, a carbamoyl group, an aryl and heterocyclic-azo group, an imido group, a phosphino group, a phosphono group, a phosphinyl group, a phosphinyloxy group, a phosphinylamino group, and a silyl group. Above all, preferred are substituents of a halogen atom, a heterocyclic group, a cyano group, a nitro group, a carboxyl group, an acyloxy group, a carbamoyloxy group, an alkoxycarbonyloxy group, an aryloxycarbonyloxy group, a sulfamoyl group, a sulfo group, an alkyl and arylsulfinyl group, an alkyl and arylsulfinyl group, an acyl group, an aryloxycarbonyl group, an alkoxycarbonyl group, a carbamoyl group, an imido group, a phosphoryl group, a phosphono group, a phosphinoyl group, a phosphonyl group, a phosphonoyloxy group, and a phosphinoylamino group. In particular, especially preferred are electron-attracting groups, and more preferred are those having cup of at least 0.40. Examples of the substituents having σp of at least 0.40 are a cyano group, a nitro group, a carboxyl group, a sulfamoyl group, an alkyl and arylsulfinyl group, an alkyl and arylsulfonyl group, an acyl group, an aryloxycarbonyl group, an alkoxycarbonyl group, a carbamoyl group, an imido group, a phosphono group, a phosphoryl group, as well as an alkyl group substituted with an electron-attracting group (e.g., trihalomethyl, perfluoroalkyl, dicyanomethyl, iminomethyl), an alkenyl group substituted with an electron-attracting group (e.g., tricyanovinyl), and a quaternary salt substituent (e.g., sulfonium, ammonium, phosphonium). Of the functional groups mentioned above, those having a hydrogen atom may be further substituted by removing the hydrogen atom and substituting it with any of the above-mentioned groups. Examples of the substituents are an alkylcarbonylaminosulfonyl group, an arylcarbonylaminosulfonyl group, an alkylsulfonylaminocarbonyl group, and an arylsulfonylaminocarbonyl group.

The substituents on the hetero ring may bond to each other to form a condensed ring with the heteroatom, and the condensed ring may further have an additional substituent.

Preferred examples of the magenta dyes for use herein are those represented by the following general formula (M-I):

General Formula (M-I)

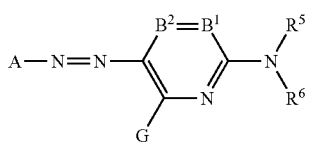

In general formula (M-I), A represents a residue of a 5-membered heterocyclic diazo component A-NH$_2$; B$^1$ and B$^2$ represent —CR$^2$= and —CR$^2$=, respectively, or any one of them represents a nitrogen atom and the other represents —CR$^1$= or —CR$^2$=; R$^5$ and R$^6$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group, which may have an additional substituent.

G, R$^1$ and R$^2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group (including a heterocyclic amino group and an anilino group), an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, an alkyl or arylsulfonyl group, a heterocyclic sulfonyl group, an alkyl or arylsulfinyl group, a heterocyclic sulfinyl group, a sulfamoyl group, a sulfo group or a heterocyclic-thio group, which may be optionally substituted. R$^1$ and R$^5$, or R$^5$ and R$^6$ may bond to each other to form a 5- or 6-membered ring.

In general formula (M-I), A represents a residue of a 5-membered heterocyclic diazo component A-NH$_2$. Examples of the heteroatom of the hetero ring are N, O and S. Preferably, the hetero ring is a nitrogen-containing 5-membered hetero ring. The hetero ring may be condensed with an aliphatic ring, an aromatic ring or any other hetero ring. Preferred examples of the hetero ring for A are pyrazole, imidazole, thiazole, isothiazole, thiadiazole, benzothiazole, benzoxazole and benzisothiazole rings. These hetero rings may be further substituted. Above all, pyrazole, imidazole, isothiazole, thiadiazole and benzothiazole rings represented by the following general formula (a) to (f) are preferred.

General Formula (a)

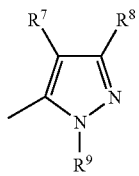

(b)

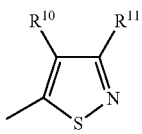

(c)

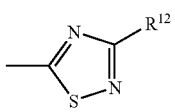

(d)

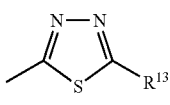

(e)

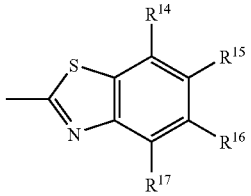

(f)

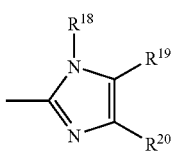

In general formulae (a) to (f), R$^7$ to R$^{20}$ represent the same substituents as those described for G, R$^1$ and R$^2$. Of formulae (a) to (f), preferred are pyrazole and isothiazole rings of formulae (a) and (b); and most preferred is the pyrazole ring of formula (a).

In general formula (M-I), B$^1$ and B$^2$ represent —CR$^1$= and —CR$^2$=, respectively, or any one of them represents a nitrogen atom and the other represents —CR$^1$= or —CR$^2$=. Preferably, they represent —CR$^1$= and —CR$^2$=.

R$^5$ and R$^6$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group, which may have an additional substituent. Preferably, R$^5$ and R$^6$ each are any of a hydrogen atom, an aliphatic group, an aromatic group, a heterocyclic group, an acyl group, or an alkyl or arylsulfonyl group; more preferably, any of a hydrogen atom, an aromatic group, a heterocyclic group, an acyl group, or an alkyl or arylsulfonyl group; most preferably, any of a hydrogen atom, an aryl group or a heterocyclic group. The groups may be further substituted. However, R$^5$ and R$^6$ are not hydrogen atoms at the same time.

G, R$^1$ and R$^2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, a heterocyclic-thio group, an alkyl or arylsulfonyl group, a heterocyclic sulfonyl group, an alkyl or arylsulfinyl group, a heterocyclic sulfinyl group, a sulfamoyl group or a sulfo group, which may be optionally substituted.

Preferably, G is any of a hydrogen atom, a halogen atom, an aliphatic group, an aromatic group, a hydroxyl group, an alkoxy group, an aryloxy group, an acyloxy group, a heterocyclic-oxy group, an amino group (including an anilino group and a heterocyclic amino group), an acylamino group, an ureido group, a sulfamoylamino group, an alkoxycarbonylamino group, an aryloxycarbonylamino group, an alkyl or arylthio group or a heterocyclic-thio group; more preferably any of a hydrogen atom, a halogen atom, an alkyl group, a hydroxyl group, an alkoxy group, an aryloxy group, an acyloxy group, an amino group (including an anilino group and a heterocyclic amino group) or an acylamino group; most preferably any of a hydrogen atom, an anilino group or an acylamino group. The groups may be further substituted.

Also preferably, $R^1$ and $R^2$ each are any of a hydrogen atom, an alkyl group, a halogen atom, an alkoxycarbonyl group, a carboxyl group, a carbamoyl group, a hydroxyl group, an alkoxy group or a cyano group. These groups may be further substituted. $R^1$ and $R^5$, or $R^5$ and $R^6$ may bond to each other to form a 5- or 6-membered ring.

In the case where the groups of A, $R^1$, $R^2$, $R^5$, $R^6$ and G are further substituted, the substituents mentioned above for G, $R^1$ and $R^2$ are referred to for the substituents of the substituted groups.

In the case where the dyes of the invention are soluble in water, it is desirable that any of A, $R^1$, $R^2$, $R^5$, $R^6$ and G has an additional substituent of an ionic hydrophilic group. The ionic hydrophilic group for the substituent includes a sulfo group, a carboxyl group, a phosphono group and a quaternary ammonium group. For the ionic hydrophilic group, preferred are a carboxyl group, a phosphono group and a sulfo group; and more preferred are a carboxyl group and a sulfo group. The carboxyl, phosphono and sulfo groups may be in the form of salts. Examples of the counter ion to form the salts are ammonium ions, alkali metal ions (e.g., lithium, sodium and potassium ions), and organic cations (e.g., tetramethylammonium tetramethylguanidium and tetramethylphosphonium ions).

The aliphatic group as referred to herein means to include an alkyl group, a substituted alkyl group, an alkenyl group, a substituted alkenyl group, an alkynyl group, a substituted alkynyl group, an aralkyl group and a substituted aralkyl group. The aliphatic group may be branched or may be cyclic. Preferably, the aliphatic group has from 1 to 20 carbon atoms, more preferably from 1 to 16 carbon atoms. The aryl moiety of the aralkyl group and the substituted aralkyl group is preferably a phenyl or naphthyl group, more preferably a phenyl group. Examples of the aliphatic group are methyl, ethyl, butyl, isopropyl, t-butyl hydroxyethyl, methoxyethyl, cyanoethyl, trifluoromethyl, 3-sulfopropyl, 4-sulfobutyl, cyclohexyl, benzyl, 2-phenethyl, vinyl and allyl groups.

The aromatic group as referred to herein means to include an aryl group and a substituted aryl group. The aryl group is preferably a phenyl or naphthyl group, more preferably a phenyl group. The aromatic group preferably has from 6 to 20 carbon atoms, more preferably from 6 to 16 carbon atoms. Examples of the aromatic group are phenyl, p-tolyl, p-methoxyphenyl, o-chlorophenyl and m-(3-sulfopropylamino)phenyl groups.

The heterocyclic group means to include a substituted heterocyclic group and an unsubstituted heterocyclic group. The hetero ring may be condensed with an aliphatic ring, an aromatic or any other hetero ring. The heterocyclic group is preferably a 5- or 6-membered heterocyclic group. Examples of the substituent of the substituted heterocyclic group are an aliphatic group, a halogen atom, an alkyl and arylsulfonyl group, an acyl group, an acylamino group, a sulfamoyl group, a carbamoyl group, and an ionic hydrophilic group. Examples of the heterocyclic group are 2-pyridyl, 2-thienyl, 2-thiazolyl, 2-benzothiazolyl, 2-benzoxazolyl and 2-furyl groups.

The alkyl and arylsulfonyl group means to include a substituted alkyl and arylsulfonyl group, and an unsubstituted alkyl and arylsulfonyl group. Examples of the alkyl and arylsulfonyl group are methylsulfonyl and phenylsulfonyl groups.

The alkyl and arylsulfinyl group means to include a substituted alkyl and arylsulfinyl group, and an unsubstituted alkyl and arylsulfinyl group. Examples of the alkyl and arylsulfinyl group are methylsulfinyl and phenylsulfinyl groups.

The acyl group means to include a substituted acyl group and an unsubstituted acryl group. The acyl group preferably has from 1 to 20 carbon atoms. One example of the substituent of the substituted acyl group is an ionic hydrophilic group. Examples of the acyl group are acetyl and benzoyl groups.

The halogen atom includes fluorine, chlorine and bromine atoms.

The amino group includes an amino group substituted with an alkyl, aryl or heterocyclic group. The alkyl, aryl and heterocyclic groups may be further substituted. The alkylamino group preferably has from 1 to 20 carbon atoms. One example of the substituent of the substituted groups is an ionic hydrophilic group. Examples of the alkylamino group are methylamino and diethylamino groups.

The arylamino group means to include a substituted arylamino group and an unsubstituted arylamino group. The arylamino group preferably has from 6 to 20 carbon atoms. Examples of the substituent of the substituted arylamino group are a halogen atom and an ionic hydrophilic group. Examples of the arylamino group are phenylamino and 2-chlorophenylamino groups.

The heterocyclic amino group means to include a substituted heterocyclic amino group and an unsubstituted heterocyclic amino group. The heterocyclic amino group preferably has from 2 to 20 carbon atoms. Examples of the substituent of the substituted group are an alkyl group, a halogen atom and an ionic hydrophilic group.

The alkoxy group means to include a substituted alkoxy group and an unsubstituted alkoxy group. The alkoxy group preferably has from 1 to 20 carbon atoms. Examples of the substituent of the substituted alkoxy group are an alkoxy group, a hydroxyl group, and an ionic hydrophilic group. Examples of the alkoxy group are methoxy, ethoxy, isopropoxy, methoxyethoxy, hydroxyethoxy and 3-carboxypropoxy groups.

The aryloxy group means to include a substituted aryloxy group and an unsubstituted aryloxy group. The aryloxy group preferably has from 6 to 20 carbon atoms. Examples of the substituent for the substituted aryloxy group are an alkoxy group and an ionic hydrophilic group. Examples of the aryloxy group are phenoxy, p-methoxyphenoxy and o-methoxyphenoxy groups.

The silyloxy group is preferably substituted with an aliphatic and/or aromatic group having from 1 to 20 carbon atoms. Examples of the silyloxy group are trimethylsilyloxy and diphenylmethylsilyloxy groups.

The heterocyclic-oxy group means to include a substituted heterocyclic-oxy group and an unsubstituted heterocyclic-oxy group. The heterocyclic-oxy group preferably has from 2 to 20 carbon atoms. Examples of the substituent of the substituted heterocyclic-oxy group are an alkyl group, an alkoxy group, and an ionic hydrophilic group. Examples of the heterocyclic-oxy group are 3-pyridyloxy and 3-thienyloxy groups.

The alkoxycarbonyloxy group means to include a substituted alkoxycarbonyloxy group and an unsubstituted alkoxycarbonyloxy group. The alkoxycarbonyloxy group preferably has from 2 to 20 carbon atoms. Examples of the alkoxycarbonyloxy group are methoxycarbonyloxy and isopropoxycarbonyloxy groups.

The aryloxycarbonyloxy group means to include a substituted aryloxycarbonyloxy group and an unsubstituted aryloxycarbonyloxy group. The aryloxycarbonyloxy group preferably has from 7 to 20 carbon atoms. One example of the aryloxycarbonyloxy group is a phenoxycarbonyloxy group.

The acylamino group means to include a substituted acylamino group and an unsubstituted acylamino group. The acylamino group preferably has from 2 to 20 carbon atoms. One example of the substituent of the substituted acylamino group is an ionic hydrophilic group. Examples of the acylamino group are acetylamino, propionylamino, benzoylamino, N-phenylacetylamino and 3,5-disulfobenzoylamino groups.

The ureido group means to include a substituted ureido group and an unsubstituted ureido group. The ureido group preferably has from 1 to 20 carbon atoms. Examples of the substituent of the substituted ureido group are an alkyl group and an aryl group. Examples of the ureido group are 3-methylureido, 3,3-dimethylureido and 3-phenylureido groups.

The sulfamoylamino group means to include a substituted sulfamoylamino group and an unsubstituted sulfamoylamino group. One example of the substituent of the substituted sulfamoylamino group is an alkyl group. One example of the sulfamoylamino group is an N,N-dipropylsulfamoylamino group.

The alkoxycarbonylamino group means to include a substituted alkoxycarbonylamino group and an unsubstituted alkoxycarbonylamino group. The alkoxycarbonylamino group preferably has from 2 to 20 carbon atoms. One example of the substituent of the substituted alkoxycarbonylamino group is an ionic hydrophilic group. One example of the alkoxycarbonylamino group is an ethoxycarbonylamino group.

The alkyl and arylsulfonylamino group means to include a substituted alkyl and arylsulfonylamino group and an unsubstituted alkyl and arylsulfonylamino group. The sulfonylamino group preferably has from 1 to 20 carbon atoms. One example of the substituent of the substituted alkyl and arylsulfony group is an ionic hydrophilic group. Examples of the sulfonylamino group are methylsulfonylamino, N-phenyl-methylsulfonylamino, phenylsulfonylamino and 3-carboxyphenylsulfonylamino groups.

The carbamoyl group means to include a substituted carbamoyl group and an unsubstituted carbamoyl group. One example of the substituent of the substituted carbamoyl group is an alkyl group. Examples of the carbamoyl group are methylcarbamoyl and dimethylcarbamoyl groups.

The sulfamoyl group means to include a substituted sulfamoyl group and an unsubstituted sulfamoyl group. One example of the substituent of the substituted sulfamoyl group is an alkyl group. Examples of the sulfamoyl group are dimethylsulfamoyl and di(2-hydroxyethyl)sulfamoyl groups.

The alkoxycarbonyl group means to include a substituted alkoxycarbonyl group and an unsubstituted alkoxycarbonyl group. The alkoxycarbonyl group preferably has from 2 to 20 carbon atoms. One example of the substituent of the substituted alkoxycarbonyl group is an ionic hydrophilic group. Examples of the alkoxycarbonyl group are methoxycarbonyl and ethoxycarbonyl groups.

The acyloxy group means to include a substituted acyloxy group and an unsubstituted acyloxy group. The acyloxy group preferably has from 1 to 20 carbon atoms. One example of the substituent of the substituted acyloxy group is an ionic hydrophilic group. Examples of the acyloxy group are acetoxy and benzoyloxy groups.

The carbamoyloxy group means to include a substituted carbamoyloxy group and an unsubstituted carbamoyloxy group. One example of the substituent of the substituted carbamoyloxy group is an alkyl group. One example of the carbamoyloxy group is an N-methylcarbamoyloxy group.

The aryloxycarbonyl group means to include a substituted aryloxycarbonyl group and an unsubstituted aryloxycarbonyl group. The aryloxycarbonyl group preferably has from 7 to 20 carbon atoms. One example of the substituent of the substituted aryloxycarbonyl group is an ionic hydrophilic group. One example of the aryloxycarbonyl group is a phenoxycarbonyl group.

The aryloxycarbonylamino group means to include a substituted aryloxycarbonylamino group and an unsubstituted aryloxycarbonylamino group. The aryloxycarbonylamino group preferably has from 7 to 20 carbon atoms. One example of the substituent of the substituted aryloxycarbonylamino group is an ionic hydrophilic group. One example of the aryloxycarbonylamino group is a phenoxycarbonylamino group.

The alkyl, aryl and heterocyclic-thio group means to include a substituted alkyl, aryl and heterocyclic-thio group and an unsubstituted alkyl, aryl and heterocyclic-thio group. The alkyl, aryl and heterocyclic-thio group preferably has from 1 to 20 carbon atoms. One example of the substituent of the substituted alkyl, aryl and heterocyclic-thio group is an ionic hydrophilic group. Examples of the alkyl, aryl and heterocyclic-thio group are methylthio, phenylthio and 2-pyridylthio groups.

The heterocyclic-oxycarbonyl group means to include a substituted heterocyclic-oxycarbonyl group and an unsubstituted heterocyclic-oxycarbonyl group. The heterocyclic-oxycarbonyl group preferably has from 2 to 20 carbon atoms. One example of the substituent of the substituted group is an ionic hydrophilic group. One example of the heterocyclic-oxycarbonyl group is a 2-pyridyloxycarbonyl group.

The heterocyclic sulfonylamino group means to include a substituted heterocyclic sulfonylamino group and an unsubstituted heterocyclic sulfonylamino group. The heterocyclic sulfonylamino group preferably has from 1 to 12 carbon atoms. One example of the substituent of the substituted heterocyclic sulfonylamino group is an ionic hydrophilic group. Examples of the heterocyclic sulfonylamino group are 2-thiophenesulfonylamino and 3-pyridinesulfonylamino groups.

The heterocyclic sulfonyl group means to include a substituted heterocyclic sulfonyl group and an unsubstituted heterocyclic sulfonyl group. The heterocyclic sulfonyl group preferably has from 1 to 20 carbon atoms. One example of the substituent of the substituted heterocyclic sulfonyl group is an ionic hydrophilic group. Examples of the heterocyclic sulfonyl group are 2-thiophenesulfonyl and 3-pyridinesulfonyl groups.

The heterocyclic sulfinyl group means to include a substituted heterocyclic sulfinyl group and an unsubstituted heterocyclic sulfinyl group. The heterocyclic sulfinyl group preferably has from 1 to 20 carbon atoms. One example of the substituent of the substituted group is an ionic hydrophilic group. One example of the heterocyclic sulfinyl group is a 4-pyridinesulfinyl group.

The dyes of formula (M-I) used in the invention are preferably those represented by the following general formula (M-II):

General Formula (M-II)

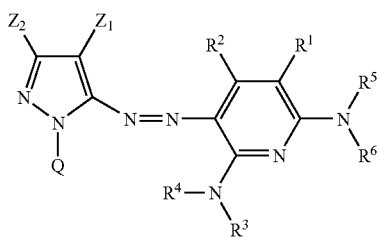

In general formula (M-II), $Z_1$ represents an electron-attracting group having a Hammett's substituent constant σp of at least 0.20. Preferably, $Z_1$ is an electron-attracting group having σp of at least 0.30, more preferably at least 0.45, further preferably at least 0.60, but not exceeding 1.0. Preferred examples of the electron-attracting group for $Z_1$ are mentioned below. Above all, $Z_1$ is preferably any of an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, or a halogenoalkyl group having from 1 to 20 carbon atoms; more preferably any of a cyano group, an alkylsulfonyl group having from 1 to 20 carbon atoms, or an arylsulfonyl group having from 6 to 20 carbon atoms; most preferably a cyano group.

$R^1$, $R^2$, $R^5$ and $R^6$ have the same meanings as those in formula (M-I). $R^3$ and $R^4$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group. Above all, they are preferably any of a hydrogen atom, an aromatic group, a heterocyclic group, an acyl group, or an alkyl or arylsulfonyl group; more preferably any of a hydrogen atom, an aromatic group, or a heterocyclic group. $Z_2$ represents a hydrogen atom, an aliphatic group, an aromatic group or a heterocyclic group. Q represents a hydrogen atom, an aliphatic group, an aromatic group or a heterocyclic group. Above all, Q is preferably a group that comprises non-metallic atoms necessary for forming a 5- to 8-membered ring. The 5- to 8-membered ring may be substituted, and may be a saturated ring or may have an unsaturated bond. Above all, it is more preferably an aromatic group or a heterocyclic group. Preferred non-metallic atoms for it are nitrogen, oxygen, sulfur and carbon atoms. Examples of the cyclic structure are benzene, cyclopentane, cyclohexane, cycloheptane, cyclooctane, cyclohexene, pyridine, pyrimidine, pyrazine, pyridazine, triazine, imidazole, benzimidazole, oxazole, benzoxazole, thiazole, benzothiazole, oxane, sulforane and thian rings.

The substituents in general formula (M-II) may be further substituted. In the case where they are further substituted, the substituents described for the groups in formula (M-I) and the groups hereinabove mentioned for G, $R^1$ and $R^2$ and also ionic hydrophilic groups are referred to for the additional substituents for them.

The electron-attracting group having a Hammett's substituent constant σp of at least 0.60 includes, for example, a cyano group, a nitro group, an alkylsulfonyl group (e.g., methanesulfonyl group), and an arylsulfonyl group (e.g., benzenesulfonyl group).

Examples of the electron-attracting group having a Hammett's substituent constant σp of at least 0.45 are, in addition to the groups mentioned above, an acyl group (e.g., acetyl group), an alkoxycarbonyl group (e.g., dodecyloxycarbonyl group), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl), and a halogenoalkyl group (e.g., trifluoromethyl).

Examples of the electron-attracting group having a Hammett's substituent constant σp of at least 0.30 are, in addition to the groups mentioned above, an acyloxy group (e.g., acetoxy), a carbamoyl group (e.g., N-ethylcarbamoyl, N,N-dibutylcarbamoyl), a halogenoalkoxy group (e.g., trifluoromethoxy), a halogenoaryloxy group (e.g., pentafluorophenyloxy), a sulfonyloxy group (e.g., methylsulfonyloxy), a halogenoalkylthio group (e.g., difluoromethylthio), an aryl group substituted with at least two electron-attracting groups each having σp of at least 0.15 (e.g., 2,4-dinitrophenyl, pentachlorophenyl), and a heterocyclic group (e.g., 2-benzoxazolyl, 2-benzothiazolyl, 1-phenyl-2-benzimidazolyl). Examples of the electron-attracting group having σp of at least 0.20 are, in addition to the groups mentioned above, a halogen atom.

Especially preferred combinations of the substituents of the azo dyes of formula (M-I) are mentioned below. $R^5$ and $R^6$ are preferably any of a hydrogen atom, an alkyl group, an aryl group, a heterocyclic group, a sulfonyl group or an acyl group; more preferably any of a hydrogen atom, an aryl group, a heterocyclic group or a sulfonyl group; most preferably any of a hydrogen atom, an aryl group or a heterocyclic group. However, $R^5$ and $R^6$ must not be hydrogen atoms at the same time.

G is preferably a hydrogen atom, a halogen atom, an alkyl group, a hydroxyl group, an amino group or an acylamino group, more preferably a hydrogen atom, a halogen atom, an amino group or an acylamino group, most preferably a hydrogen atom, an amino group or an acylamino group.

A is preferably a pyrazole ring, an imidazole ring, an isothiazole ring, a thiadiazole ring or a benzothiazole ring, more preferably a pyrazole ring or an isothiazole ring, most preferably a pyrazole ring.

Also preferably, $B^1$ and $B^2$ are —CR$^1$= and —CR$^2$=, respectively; and $R^1$ and $R^2$ are preferably any of a hydrogen atom, an alkyl group, a halogen atom, a cyano group, a carbamoyl group, a carboxyl group, a hydroxyl group, an alkoxy group or an alkoxycarbonyl group, more preferably any of a hydrogen atom, an alkyl group, a carboxyl group, a cyano group or a carbamoyl group.

Preferred cyan dyes for use herein are those represented by the following general formula (C-I):

General Formula (C-I)

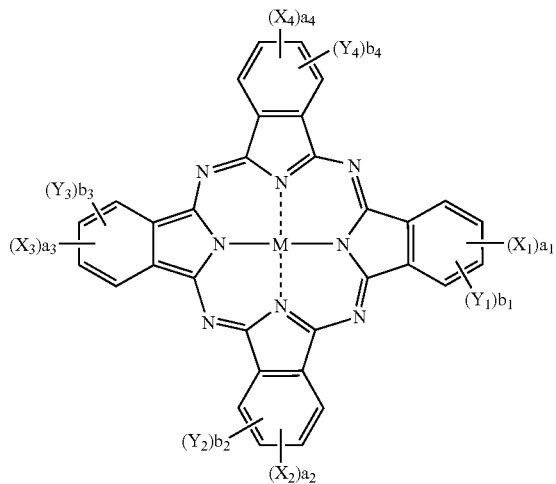

In general formula (C-I), $X_1$, $X_2$, $X_3$ and $X_4$ each independently represent an electron-attracting group having σp of at least 0.40. $Y_1$, $Y_2$, $Y_3$ and $Y_4$ each independently represent a monovalent substituent. M represents a hydrogen atom, a metal element or its oxide, hydroxide or halide. $a_1$ to $a_4$, and $b_1$ to $b_4$ each indicate the number of the substituents of $X_1$ to $X_4$ and $Y_1$ to $Y_4$, respectively. $a_1$ to $a_4$ each are independently an integer of from 0 to 4, and $b_1$ to $b_4$ each are independently an integer of from 0 to 4. However, the sum total of $a_1$ to $a_4$ is at least 2, preferably at least 3. Most preferably, $a_1=a_2=a_3=a_4=1$. In the case where the dyes are soluble in water, they preferably have an ionic hydrophilic substituent in any site of $X_1$, $X_2$, $X_3$, $X_4$, $Y_1$, $Y_2$, $Y_3$ and $Y_4$. The ionic hydrophilic substituent includes, for example, a sulfo group, a carboxyl group, a phosphono group and a quaternary ammonium group.

Of the phthalocyanine dyes of formula (C-I), more preferred are those represented by the following general formula (C-II). The phthalocyanine dyes of formula (C-II) used in the invention are described in detail hereinunder.

General Formula (C-II)

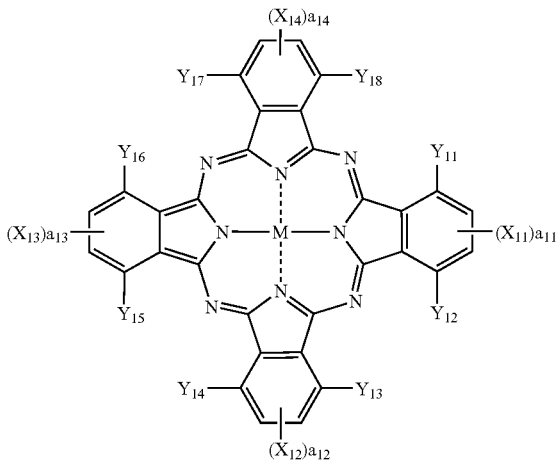

In general formula (C-II), $X_{11}$ to $X_{14}$ each independently represent —SO-Z, —$SO_2$-Z, —$SO_2NR_1R_2$, a sulfo group, —$CONR_1R_2$ or —$CO_2R_1$. $Y_{11}$ to $Y_{18}$ each independently represent a monovalent substituent. M represents a hydrogen atom, a metal atom or its oxide, hydroxide or halide. $a_{11}$ to $a_{14}$ each indicate the number of the substituents of $X_{11}$ to $X_{14}$, respectively; and they are independently an integer of 1 or 2.

Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. $R_1$ and $R_2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group.

In general formula (C-II), $a_{11}$ to $a_{14}$ are independently an integer of 1 or 2. More preferably, $4 \leq a_{11}+a_{12}+a_{13}+a_{14} \leq 6$; and even more preferably $a_{11}=a_{12}=a_{13}=a_{14}=1$.

$X_{11}$, $X_{12}$, $X_{13}$ and $X_{14}$ may be entirely the same, or may be partly the same. For example, $X_{11}$, $X_{12}$, $X_{13}$ and $X_{14}$ are all —$SO_2$-Z, in which, however, Z may differ among them. In other words, they may be the substituents of the same type but may differ in point of the partial structure. Further, they may include different substituents. For example, they may include different substituents of —$SO_2$-Z and —$SO_2NR_1R_2$ at the same time.

Especially preferred combinations of the substituents in the phthalocyanine dyes of formula (C-II) are mentioned below.

Preferably, $X_{11}$ to $X_{14}$ are each independently —SO-Z, —$SO_2$-Z, —$SO_2NR_1R_2$ or —$CONR_1R_2$; more preferably —$SO_2$-Z or —$SO_2NR_1R_2$; most preferably —$SO_2$-Z.

Also preferably, Z is independently a substituted or unsubstituted alkyl group, a substituted or unsubstituted aryl group, or a substituted or unsubstituted heterocyclic group; most preferably a substituted alkyl group, a substituted aryl group or a substituted heterocyclic group. In particular, for increasing the dye solubility and the ink stability, it is desirable that the substituent has an asymmetric carbon (and the dye is in the form of racemate). For enhancing the degree of association of the dye to improve the fastness thereof, it is also desirable that the substituent has any of a hydroxyl group, an ether group, an ester group, a cyano group, an amido group or a sulfonamido group.

Preferably, $R_1$ and $R_2$ are independently a hydrogen atom, a substituted or unsubstituted alkyl group, a substituted or unsubstituted aryl group, or a substituted or unsubstituted heterocyclic group; most preferably a hydrogen atom, a substituted alkyl group, a substituted aryl group or a substituted heterocyclic group. However, it is undesirable that $R_1$ and $R_1$ are both hydrogen atoms. In particular, for increasing the dye solubility and the ink stability, it is desirable that the substituent has an asymmetric carbon (and the dye is in the form of racemate). For enhancing the degree of association of the dye to improve the fastness thereof, it is also desirable that the substituent has any of a hydroxyl group, an ether group, an ester group, a cyano group, an amido group or a sulfonamido group.

Preferably, $Y_{11}$ to $Y_{18}$ each are a hydrogen atom, a halogen atom, an alkyl group, an aryl group, a cyano group, an alkoxy group, an amido group, an ureido group, a sulfonamido group, a carbamoyl group, a sulfamoyl group, an alkoxycarbonyl group, a carboxyl group, or a sulfo group; more preferably a hydrogen atom, a halogen atom, a cyano group, a carboxyl group, or a sulfo group; most preferably a hydrogen atom. Also preferably, $a_{11}$ to $a_{14}$ are independently 1 or 2, more preferably they are all 1. M is a hydrogen atom, a metal element or its oxide, hydroxide or halide, and is preferably Cu, Ni, Zn or Al, most preferably Cu.

In the case where the phthalocyanine dyes of formula (C-I) or (C-II) are soluble in water, they preferably have an ionic hydrophilic group. The ionic hydrophilic group includes, for example, a sulfo group, a carboxyl group, a phosphono group and a quaternary ammonium group. For the ionic hydrophilic group for the dyes, preferred are a carboxyl group, a phosphono group and a sulfo group; and more preferred are a carboxyl group and a sulfo group. The carboxyl, phosphono and sulfo groups may be in the form of salts. Examples of the counter ion to form the salts are ammonium ions, alkali metal ions (e.g., lithium, sodium and potassium ions), and organic cations (e.g., tetramethylammonium, tetramethylguanidium and tetramethylphosphonium ions). For the counter ion, especially preferred are alkali metal salts, and more preferred are lithium salts as increasing the dye solubility and enhancing the ink stability.

Regarding the number of the ionic hydrophilic groups, it is desirable that the phthalocyanine dye has at least two ionic hydrophilic groups in one molecule, more preferably at least two sulfo and/or carboxyl groups.

Regarding the preferred combinations of the substituents to be in the compounds of formula (C-II), it is desirable that at least one substituent of the compound falls within the preferred range mentioned hereinabove; more preferably a larger number of substituents fall within the preferred range; most preferably all substituents fall within the preferred range.

Regarding the chemical structure of the phthalocyanine dyes that are preferred for use in the invention, it is desirable that at least one electron-attracting group such as a sulfinyl group, a sulfonyl group or a sulfamoyl group is introduced into all the four benzene rings of the phthalocyanine skeleton so that the total of σp of all these substituents in the phthalocyanine skeleton may be at least 1.6.

The phthalocyanine derivatives of formula (C-I) are generally in the form of a mixture of analogues thereof in which the position and the number of the substituents Xn (n=1 to 4) and Ym (m=1 to 4) inevitably differ depending on the method of producing them. In most cases, therefore, the general formula for them is to indicate the statistic average of the mixture of analogues of the derivatives. Having grouped the mixture of analogues into three types mentioned below, we, the present inventors, have found that a specific type of the mixture is especially preferred in the invention. Specifically, the mixture of phthalocyanine dye analogues of formulae (C-I) and (C-II) is grouped into the following three types, depending on the position of the substituents in the analogues, and each type is defined as in the following:

(1) β-substituted type: phthalocyanine dyes having a specific substituent at 2- and/or 3-position, 6 and/or 7-position, 10- and/or 11-position, and 14- and/or 15-position.
(2) α-substituted type: phthalocyanine dyes having a specific substituent at 1- and/or 4-position, 5 and/or 8-position, 9- and/or 12-position, and 13- and/or 16-position.
(3) α,β-substituted type: phthalocyanine dyes having a specific substituent at any of 1- to 16-positions with no regularity.

When phthalocyanine dye derivatives of different structures (especially in point of the position of substitution) are described herein, they are referred to as any of the above-mentioned, β-substituted, α-substituted, or α,β-substituted type.

The phthalocyanine derivatives used in the invention may be produced, for example, according to the methods described or referred to in, *Phthalocyanines—Chemistry and Function*, by Shirai & Kobayashi (pp. 1–62, IPC), and *Phthalocyanines—Properties and Applications*, by C. C. Lenznoff & A. B. P. Lever (pp. 1–54, VCH), or according to methods similar to those methods.

The phthalocyanine compounds of formula (C-I) used in the invention may be produced, for example, through sulfonation, sulfonylchloridation or amidation of unsubstituted phthalocyanine compounds, as in WO 00/ 17275, 00/ 08103, 00/ 08101, 98/ 41853, and JP-A 10-36471. In this case, sulfonation occurs at any position of the phthalocyanine nucleus and the number of the positions for sulfonation is difficult to control. Accordingly, in the case where the sulfo group is introduced under the reaction condition of the process, the position and the number of the sulfo groups introduced could not be identified, and the process inevitably gives a mixture of analogues that differ in the position and the number of the substituents. Therefore, in the case where the compounds used in the invention are produced from the products produced according to the process, the number and the position of the heterocyclic substituted sulfamoyl groups introduced in the compound cannot be identified, and the compound thus produced for use in the invention shall be in the form of a mixture of some α,β-substituted types that differ in the number and the position of the substituents therein.

For example, when a large number of electron-attracting groups such as sulfamoyl groups are introduced into the phthalocyanine nucleus, the oxidation potential of the resulting dye is nobler and the ozone resistance thereof therefore increases, as mentioned hereinabove. However, according to the production process mentioned above, it is inevitable that the products contain phthalocyanine dyes which have fewer electron-attracting groups introduced therein and of which the oxidation potential is baser. Accordingly, for improving the ozone resistance of the dyes, it is desirable to employ a production process in which the production of the compounds having a baser oxidation potential is retarded.

On the other hand, the phthalocyanine compounds of formula (C-II) used in the invention may be derived from tetrasulfophthalocyanine compounds that are obtained, for example, through reaction of a phthalonitrile derivative (compound P) and/or a diiminoisoindoline derivative (compound Q) with a metal derivative of formula (C-III) mentioned below, or through reaction of a 4-sulfophthalic acid derivative (compound R) with the metal derivative of formula (C-III).

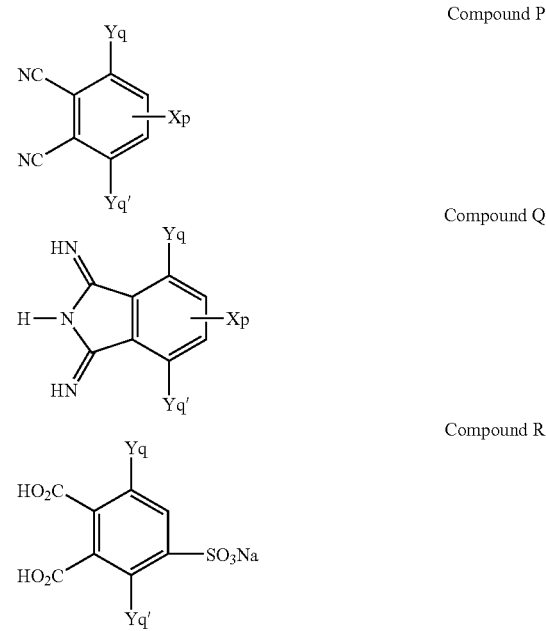

Compound P

Compound Q

Compound R

In the above formulae, Xp corresponds to $X_{11}$, $X_{12}$, $X_{13}$ or $X_{14}$ in formula (C-II); Yq and Yq' correspond to any of $Y_{11}$, $Y_{12}$, $Y_{13}$, $Y_{14}$, $Y_{15}$, $Y_{16}$, $Y_{17}$ or $Y_{18}$ in formula (C-II).

$$M-(Y)d \quad \text{(C-III)}$$

In general formula (C-III), M is the same as that in formula (C-II); Y represents a monovalent or divalent ligand such as a halogen atom, a acetate anion, an acetylacetonate group or an oxygen atom; and d indicates an integer of from 1 to 4.

According to the production process mentioned above, therefore, it is possible to introduce a desired number of desired substituents into the dyes. In particular, when a large number of electron-attracting groups are desired to be introduced into the dyes so that the oxidation potential of the dyes may be noble as in the invention, the above-mentioned production process is far superior to the production process of producing the compounds of formula (C-I).

The phthalocyanine compounds of formula (C-II) thus obtained are generally in the form of a mixture of compounds of formulae (a)-1 to (a)-4 mentioned below which are isomers in point of the substitution position of Xp therein, or that is, in the form of the β-substituted type.

(a)-1

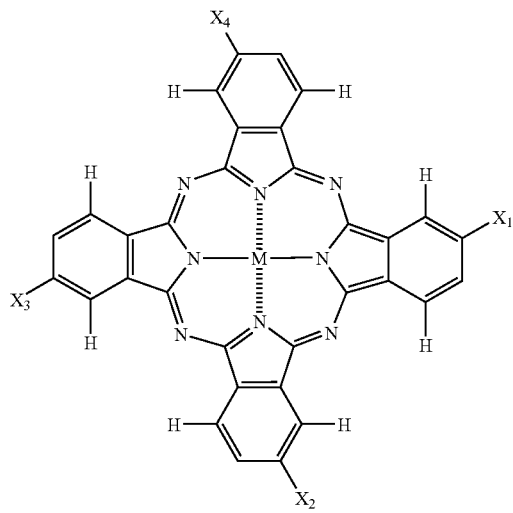

(a)-3

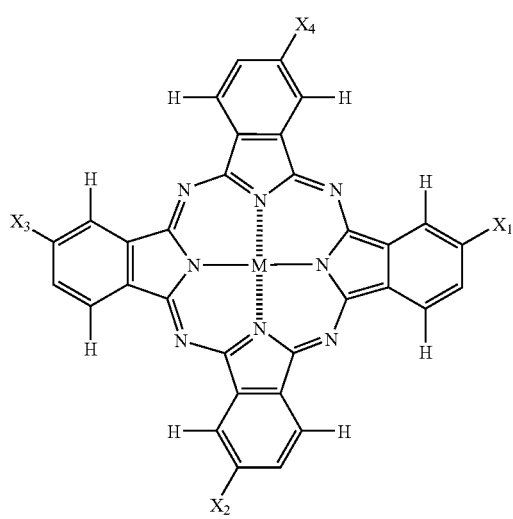

(a)-2

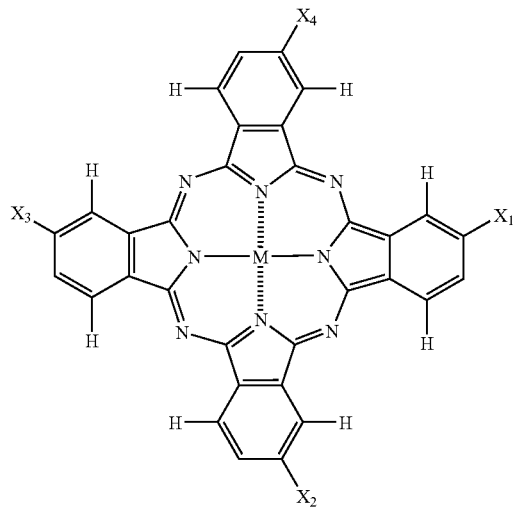

(a)-4

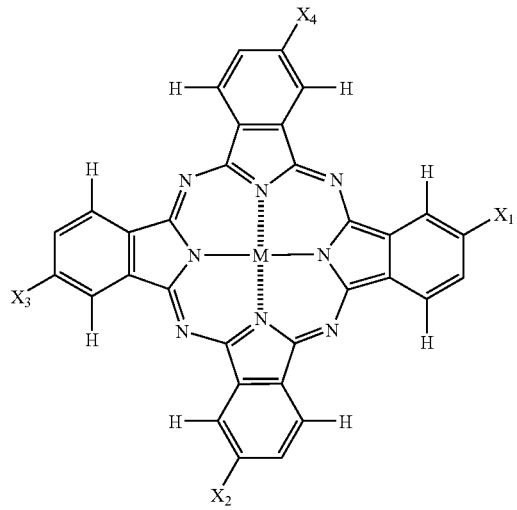

When Xp's in the starting compounds in the above-mentioned process are all the same, then β-substituted type phthalocyanine dyes are obtained in which $X_{11}$, $X_{12}$, $X_{13}$ and $X_{14}$ are all the same substituents. On the other hand, when starting compounds that differ in point of Xp are combined and used in the process, dyes in which the substituents are of the same type but partially differ or dyes having different substituents can be obtained. Of the dyes of formula (C-II), those having different electron-attracting groups are especially preferred as their solubility, associability, and the storage stability of ink containing the dye can be controlled.

We, the present inventors, have found that the oxidation potential nobler than 1.0 V (vs SCE) of the dyes of any substitution type is extremely important for improving the fastness of the dyes, and the level of the effect could not be anticipated at all from the above-mentioned related art technique. Though the detailed reason is not clear, the dyes of the β-substituted type tend to be superior to the dyes of α,β-substituted type in point of the hue, the light fastness and the ozone gas resistance thereof.

The phthalocyanine dyes of formulae (C-I) and (C-II) can be produced according to the above-mentioned patent publications, or they may also be produced according to the methods described in Japanese Patent Application Nos. 2001-226275, 2001-96610, 2001-47013 and 2001-193638. However, the starting materials, the intermediates and the production routes for the dyes are not limited to these.

The magenta dye and the cyan dye used in the invention are characterized in that their oxidation potential is nobler than 0.8 V. Phthalocyanines that are widely used for cyan dye generally form associates, and therefore, even when their oxidation potential is low in some degree, it can compensate for their fastness. However, since magenta dyes do not form associates, it is desirable that the oxidation potential of magenta dyes is set further nobler as compared with that of cyan dyes for ensuring high fastness of the dyes.

Preferred examples of the dyes used in the invention are mentioned below, but these are to describe in detail the invention and are not intended to restrict the scope of the invention. The parenthesized numeral after each dye is the oxidation potential of the dye.

First described are specific examples [Y-1 to Y-35] of the yellow dye used in the invention.

Y-1 (1.17)

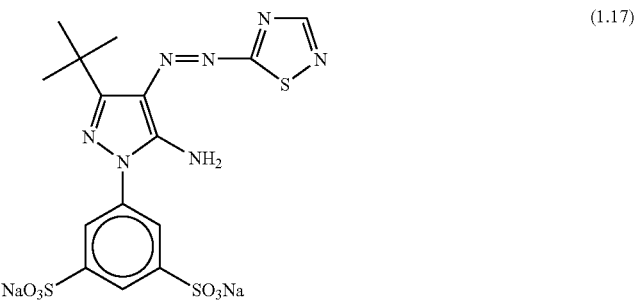

Y-2 (1.28)

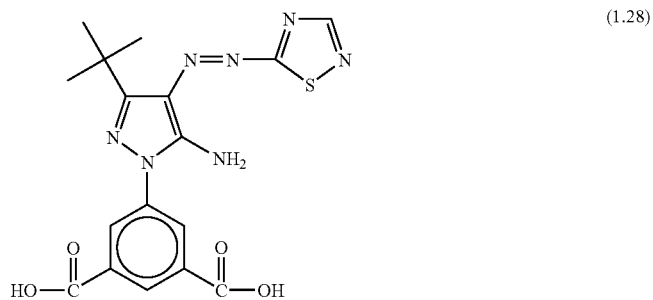

Y-3 (1.20)

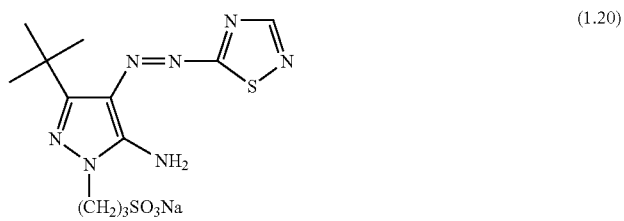

Y-4 (1.27)

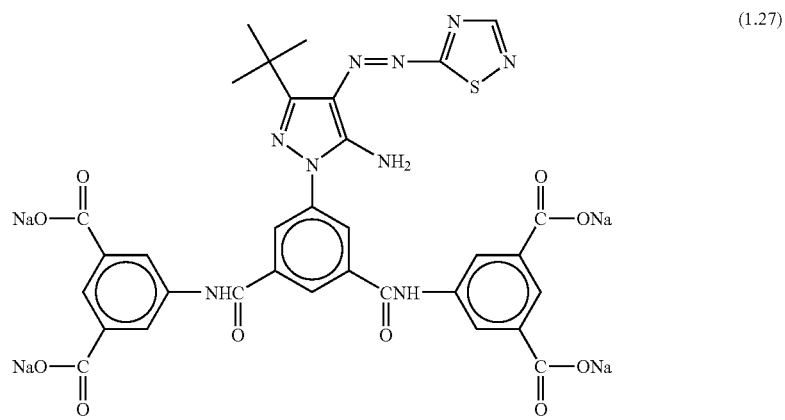

-continued
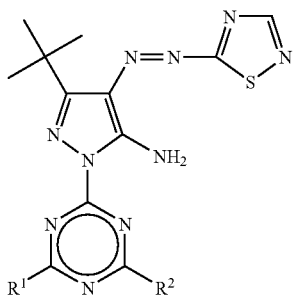
| Compound No. | R¹ | R² | Oxidation Potential (V) |
|---|---|---|---|
| Y-5 | ![3,5-bis(COK)aniline] | ![3,5-bis(COK)aniline] | 1.37 |
| Y-6 | —NH(CH$_2$)$_2$SO$_3$Li | —NH(CH$_2$)$_2$SO$_3$Li | 1.34 |
| Y-7 | ![2,5-bis(SO$_3$K)aniline] | ![2,5-bis(SO$_3$K)aniline] | 1.35 |
| Y-8 | ![4-SO$_3$Na aniline] | ![3,5-bis(CONa)aniline] | 1.36 |
| Y-9 | —NH(CH$_2$)$_2$SO$_3$Li | ![3,5-bis(COLi)aniline] | 1.35 |
| Y-10 | ![pyrazole-thiadiazole azo group] | ![2,5-bis(SO$_3$K)aniline] | 1.39 |

-continued
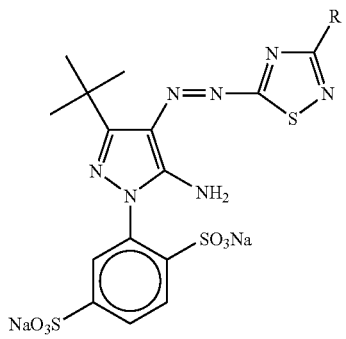
| | | |
|---|---|---|
| Y-11 | R = —S(CH$_2$)$_2$SO$_3$Na | (1.20) |
| Y-12 | R = —Me | (1.19) |
| Y-13 | R = —H | (1.20) |
| Y-14 | R = —Ph | (1.18) |
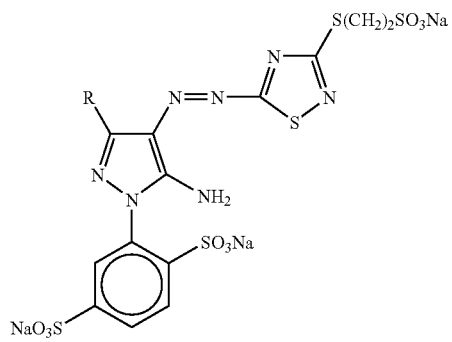
| | | |
|---|---|---|
| Y-15 | R = —Ph | (1.16) |
| Y-16 | R = —OC$_2$H$_5$ | (1.16) |
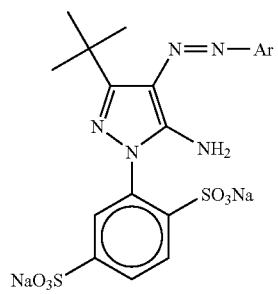
Y-17   Ar = [2,5-dimethyl-1,3,4-thiadiazol-yl]   (1.14)
Y-18   Ar = [5-H-1,3,4-thiadiazol-2-yl methyl]   (1.20)
Y-19   Ar = [thiazol-2-yl]   (1.05)
Y-20   Ar = [3-methyl-isothiazol-5-yl]   (1.09)

-continued
Y-21  Ar = 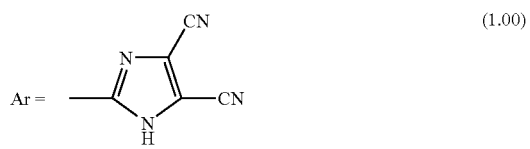  (1.00)
Y-22  Ar = 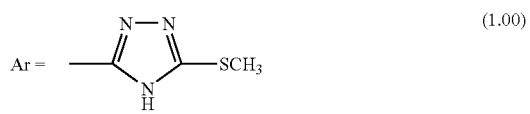  (1.00)
Y-23 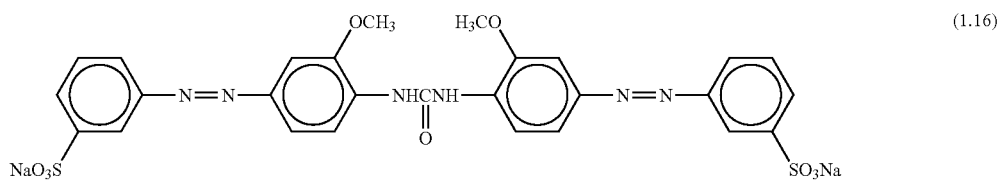 (1.16)
Y-24 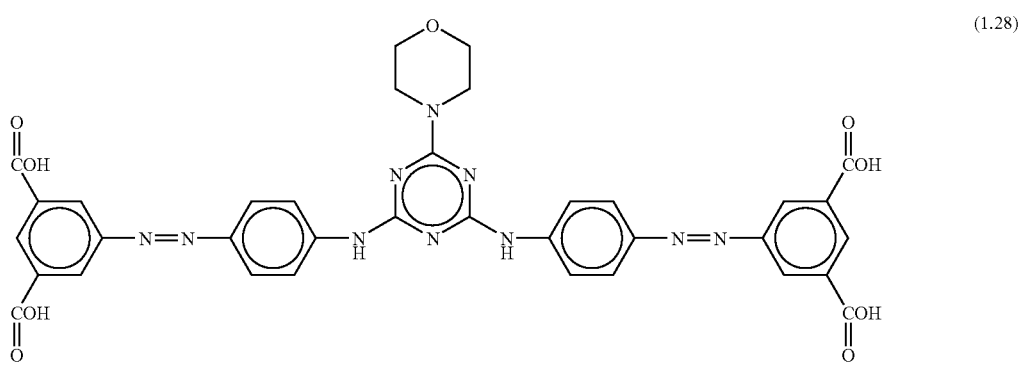 (1.28)
Y-25 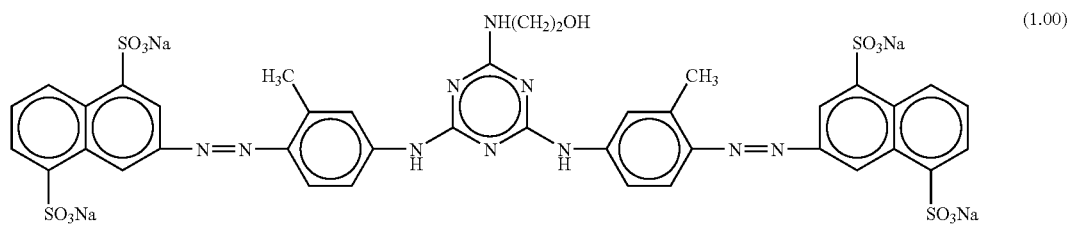 (1.00)
Y-26 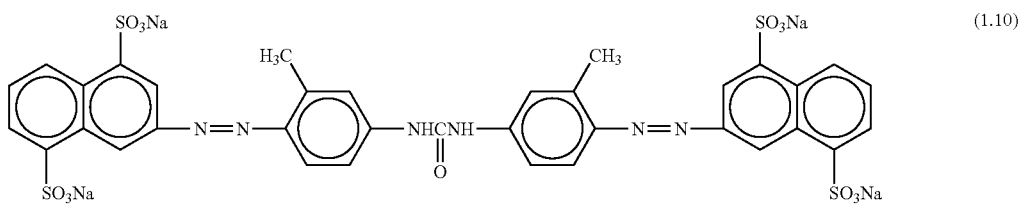 (1.10)

-continued
Y-27 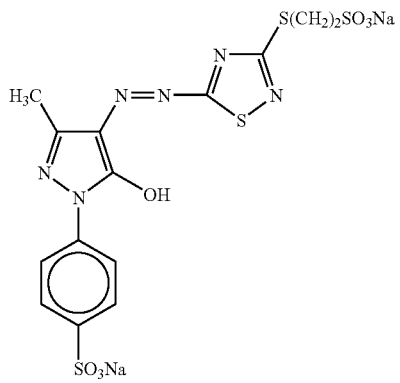 (1.01)
Y-28 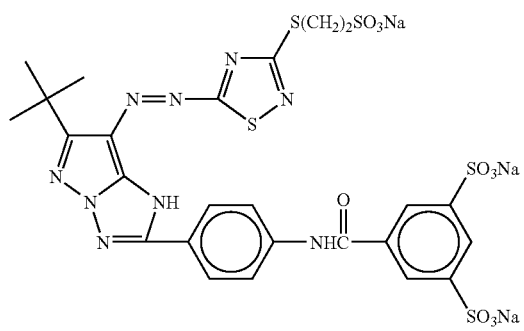 (1.32)
Y-29 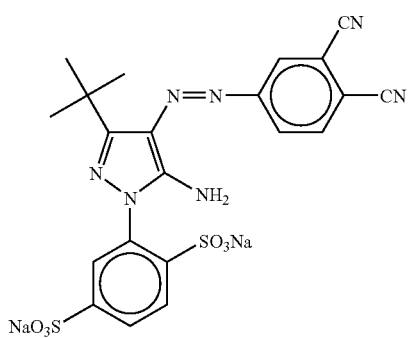 (1.01)
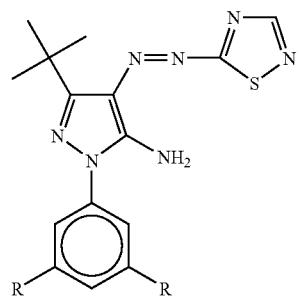
| | | |
|---|---|---|
| Y-30 | R = —CON(C₄H₉)₂ | (1.20) |
| Y-31 | R = —CO₂C₈H₁₇ | (1.21) |

| Y-32 | 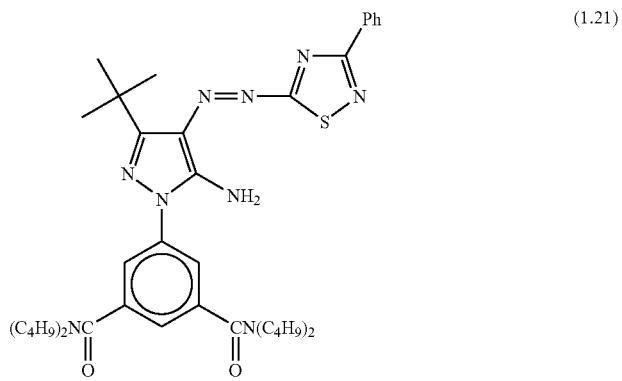 | (1.21) |
| Y-33 | 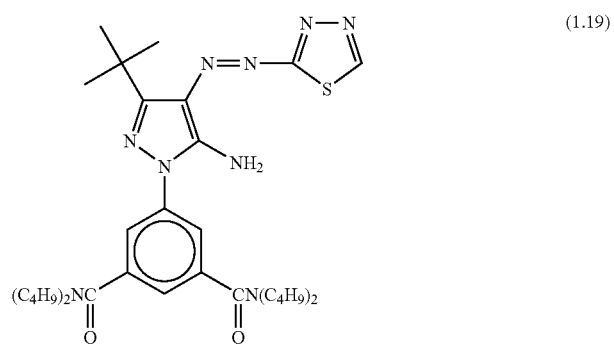 | (1.19) |
|  | 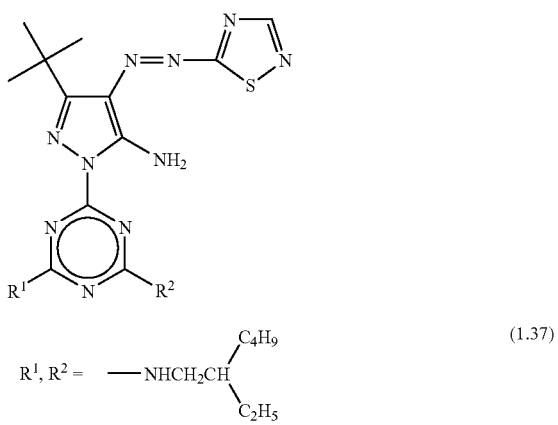 |  |
| Y-34 | $R^1, R^2 = $ —NHCH$_2$CH$\begin{matrix}C_4H_9\\C_2H_5\end{matrix}$ | (1.37) |
| Y-35 | 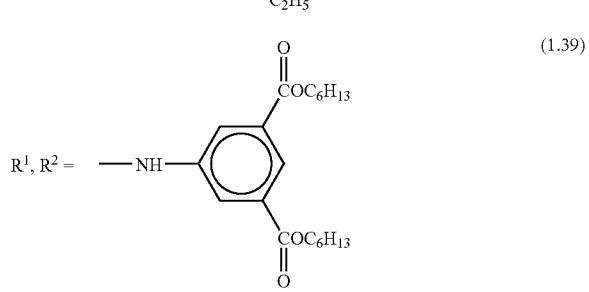 | (1.39) |
Next described are specific examples [M-1 to M-26] of the magenta dye used in the invention.

M-1 (1.15)
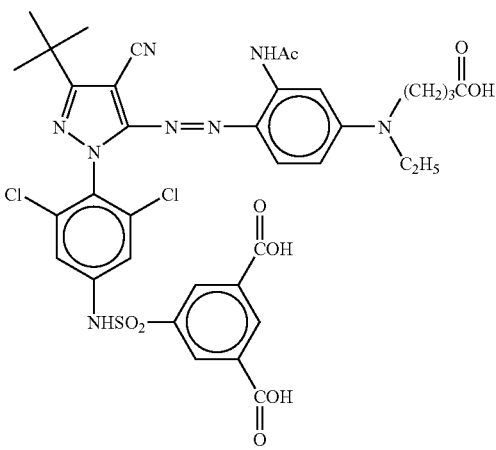
M-2 (1.15)
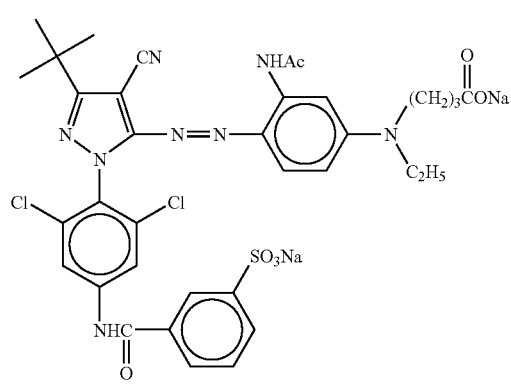
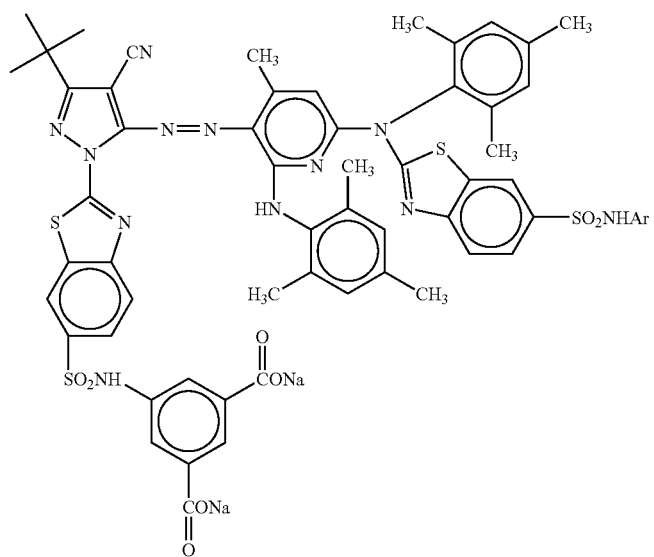

-continued
M-3 (1.36)
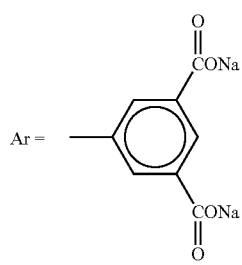
M-4 (1.37)
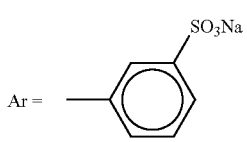
M-5 (1.35)
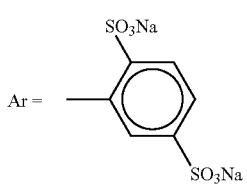
M-6 (1.37)
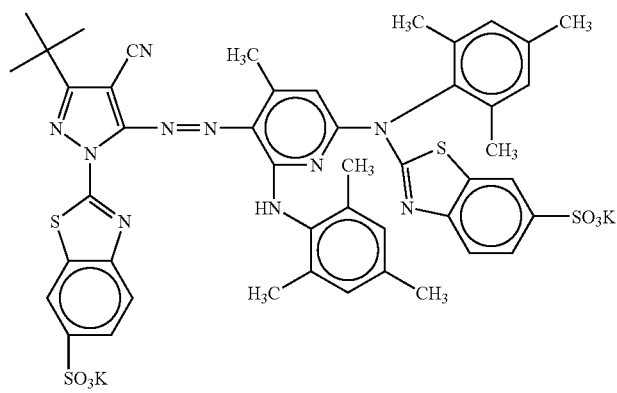
M-7 (1.32)
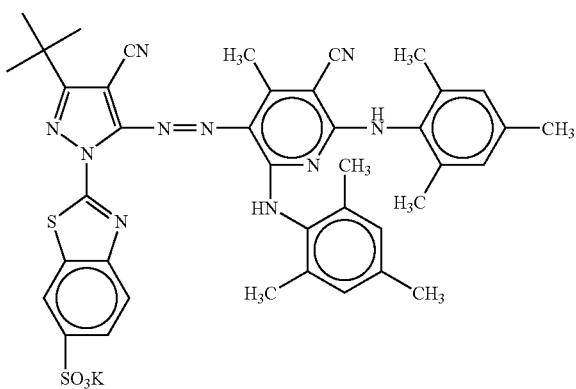

-continued
M-8 (1.27)
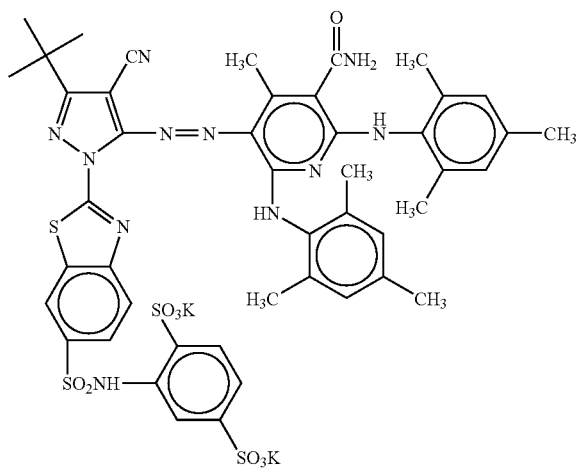
M-9 (1.38)
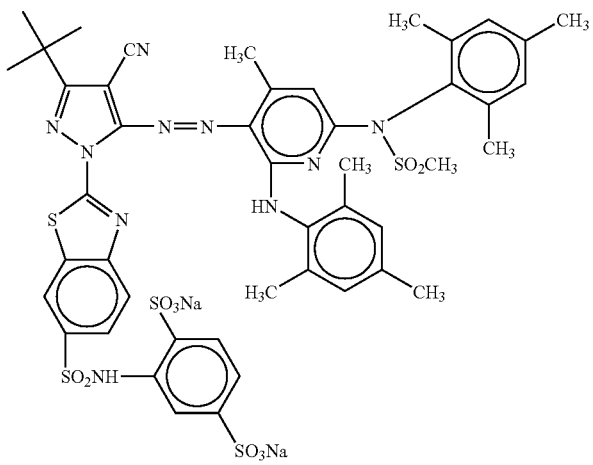
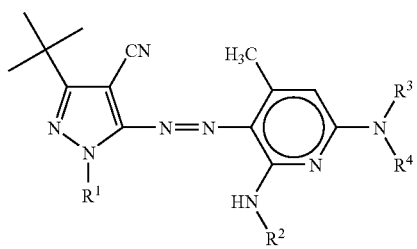
| Compound No. | R¹ | R² | R³ | R⁴ | Oxidation Potential (V) |
|---|---|---|---|---|---|
| M-10 | 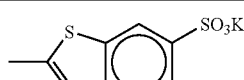 | 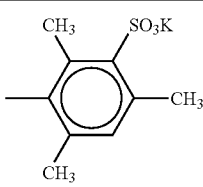 |  | 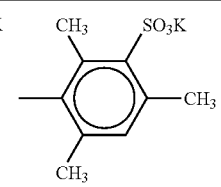 | 1.38 |
| M-11 | 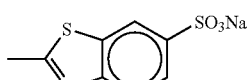 | 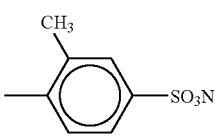 | 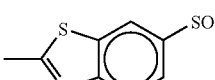 | 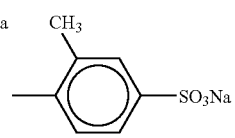 | 1.39 |

-continued
| | | | | | |
|---|---|---|---|---|---|
| M-12 | 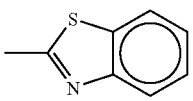 | 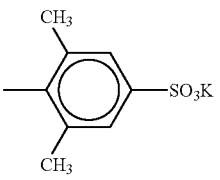 | 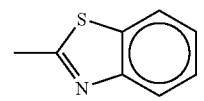 | 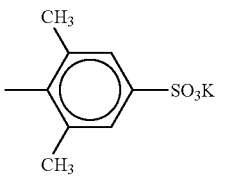 | 1.40 |
| M-13 | 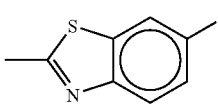 | 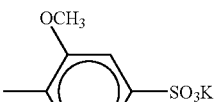 | 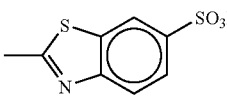 | 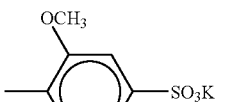 | 1.39 |
| M-14 | 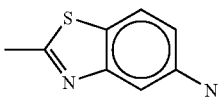 | 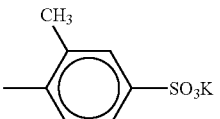 | 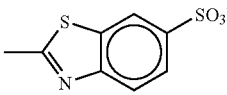 | 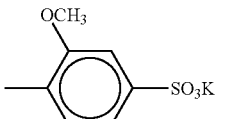 | 1.40 |
| M-15 | 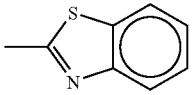 | 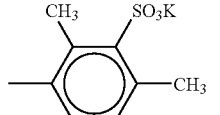 | 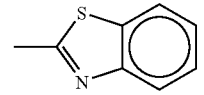 | 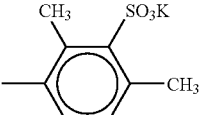 | 1.37 |
| M-16 | 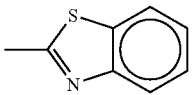 | 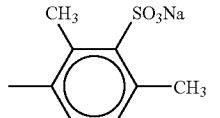 | 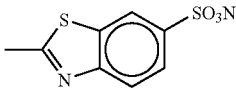 | 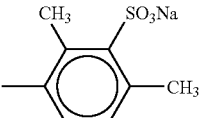 | 1.36 |
| M-17 | 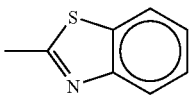 | 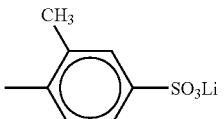 | 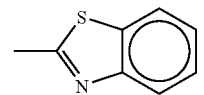 | 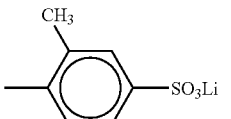 | 1.38 |
| M-18 | 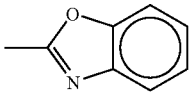 | 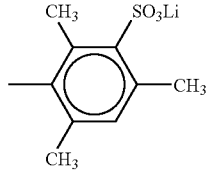 | 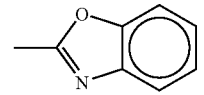 | 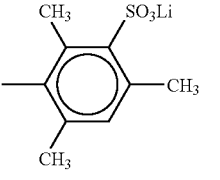 | 1.35 |
| M-19 | 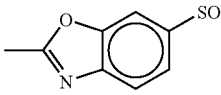 | 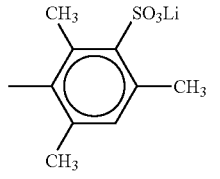 | 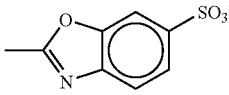 | 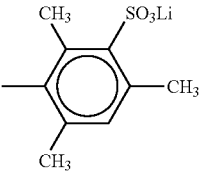 | 1.37 |
| M-20 | 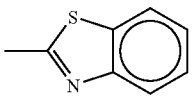 | 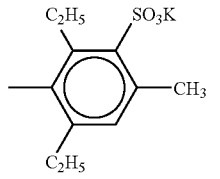 | —SO$_2$CH$_3$ | 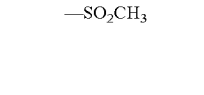 | 1.38 |

-continued
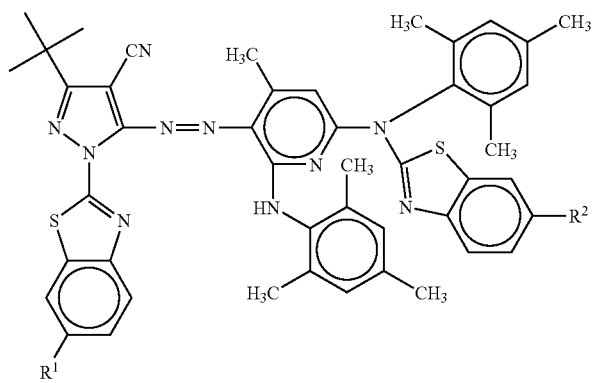
M-21 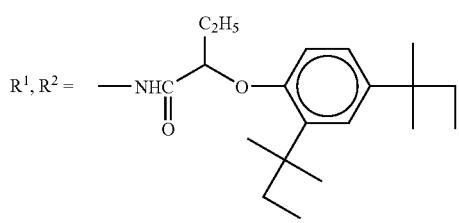 (1.41)
M-22 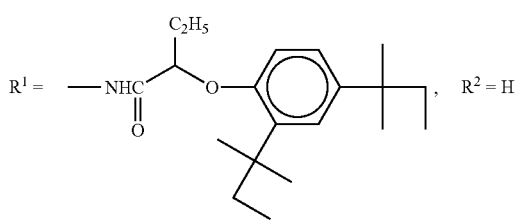 (1.38)
M-23 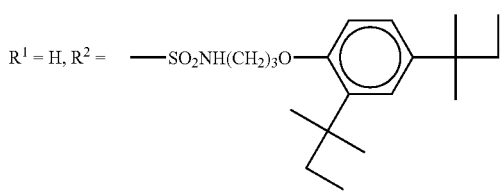 (1.41)
M-24 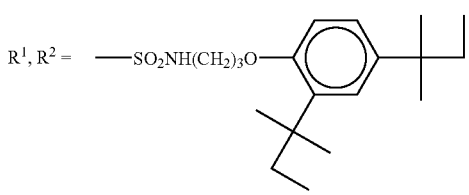 (1.43)
M-25 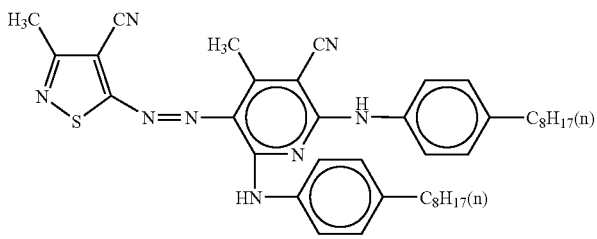 (1.35)

-continued
M-26 (1.39)
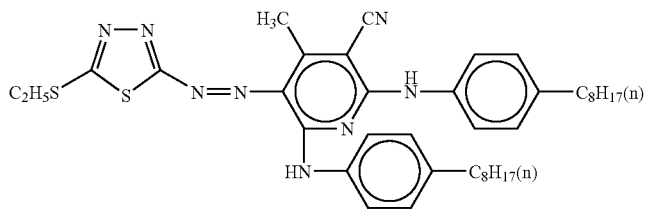
Further described are specific examples [C-1 to C-50] of the cyan dye used in the invention.
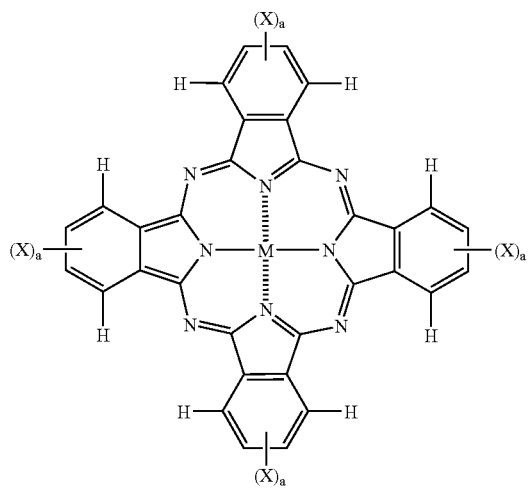
| Compound No. | M | X | ($\sigma_p$) | a | Oxidation Potential (V) |
|---|---|---|---|---|---|
| C-1 | Cu | —SO$_2$NH—C$_6$H$_3$(NHCO—C$_6$H$_4$—SO$_3$Na)— | (0.65) | 1 | 1.24 |
| C-2 | Cu | —SO$_2$N(CH$_3$)—C$_6$H$_4$—SO$_3$Na | (0.65) | 1 | 1.19 |
| C-3 | Cu | —SO$_2$NH—CH$_2$CH$_2$—SO$_3$K | (0.65) | 1 | 1.18 |
| C-4 | Cu | —SO$_2$NH(CH$_2$)$_3$N(CH$_2$CH$_2$OH)$_2$·HCl | (0.65) | 1 | 1.29 |

| | | | | | |
|---|---|---|---|---|---|
| C-5 | Cu | —SO₂NH−CH₂CH₂−OC₂H₅ | (0.65) | 1 | 1.23 |
| C-6 | Cu | —SO₂NH−(phenyl with 2 CO₂Na groups) | (0.65) | 1 | 1.21 |
| C-7 | Cu | —SO₂NH−CH₂CH₂−CO₂K | (0.65) | 1 | 1.19 |
| C-8 | Cu | —SO₂(CH₂)₃SO₂NH−(phenyl)−SO₃K | (0.77) | 1 | 1.35 |
| C-9 | Cu | —SO₂−(benzothiazole)−SO₃K | (—) | 1 | 1.36 |
| C-10 | Cu | —SO₂−CH₂CH₂CH₂−SO₃Na | (0.77) | 2 | 1.39 |
| C-11 | Cu | —SO₂−CH₂CH₂CH₂−SO₃Li | | 1 | 1.29 |
| C-12 | Cu | —SO₂−CH₂CH₂CH₂−SO₃K | | 1 | 1.29 |
| C-13 | Cu | —SO₂−(phenyl)−O−(CH₂)₄−SO₃K | (0.68) | 1 | 1.29 |
| C-14 | Cu | —SO₂−(phenyl)−CO₂Na | (0.68) | 1 | 1.27 |

-continued

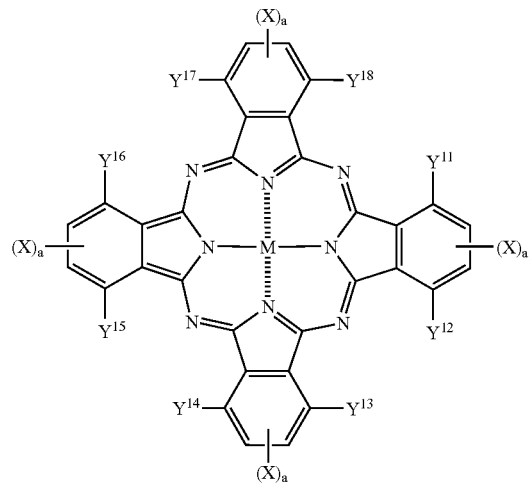

In the table, there is no special order for the combinations of $(Y^{11}, Y^{12})$, $(Y^{13}, Y^{14})$, $(Y^{15}, Y^{16})$ and $(Y^{17}, Y^{18})$, and the combinations are independent of each other.

| Compound No. | M | X | $[\sigma_p]$ | $Y^{11}, Y^{12}$ | $Y^{13}, Y^{14}$ | $Y^{15}, Y^{16}$ | $Y^{17}, Y^{18}$ | a | Oxidation Potential (V) |
|---|---|---|---|---|---|---|---|---|---|
| C-15 | Cu | —SO₂NH—C₆H₄(NHSO₂—C₆H₄—SO₃K)— | (0.65) | H, Cl | H, Cl | H, Cl | H, Cl | 1 | 1.24 |
| C-16 | Cu | —SO₂—(CH₂)₃—SO₃K | (0.77) | H, Cl | H, Cl | H, Cl | H, Cl | 1 | 1.38 |

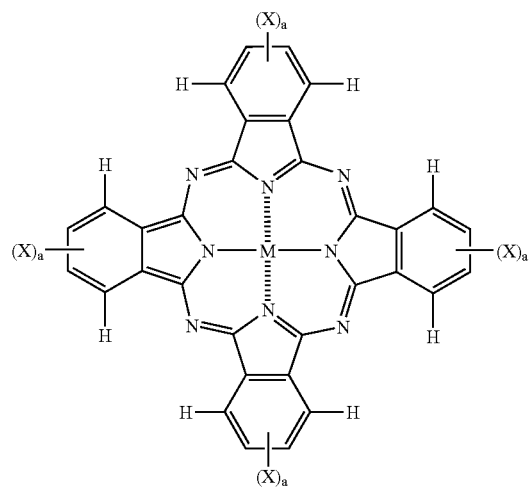

| Compound No. | M | X | $[\sigma_p]$ | a | Oxidation Potential (V) |
|---|---|---|---|---|---|
| C-17 | Cu | —SO₂NH—C₆H₄—C₈H₁₇-n | (0.65) | 1 | 1.23 |

-continued

| Compound No. | | R | ($\sigma_P$) | m | Oxidation Potential (V) |
|---|---|---|---|---|---|
| C-18 | Cu | —SO$_2$NH—⟨benzene with 2×CO$_2$C$_6$H$_{13}$-n⟩ | (0.65) | 1 | 1.25 |
| C-19 | Cu | —SO$_2$NH—C(CH$_3$)$_2$—CH$_2$—C(CH$_3$)$_3$ | (0.65) | 1 | 1.22 |
| C-20 | Cu | —SO$_2$N(C$_4$H$_9$-n)(phenyl) | (0.65) | 1 | 1.21 |
| C-21 | Cu | —SO$_2$NH—(4-Br-3-t-Bu-pyrazol-5-yl) | (0.65) | 1 | 1.25 |
| C-22 | Cu | —SO$_2$(CH$_2$)$_3$SO$_2$NH(CH$_2$)$_3$OCH(CH$_3$)$_2$ | | 1 | 1.27 |
| C-23 | Cu | —SO$_2$—⟨2-OC$_4$H$_9$, 5-C$_8$H$_{17}$-t phenyl⟩ | (0.68) | 1 | 1.28 |
| C-24 | Cu | —SO$_2$(CH$_2$)$_3$CO$_2$CH(CH$_3$)CH$_2$OCH$_3$ | | 1 | 1.29 |
| C-25 | Cu | —SO$_2$—C$_{12}$H$_{25}$-n | (0.77) | 1 | 1.28 |
| C-26 | Cu | —SO$_2$—(CH$_2$)$_2$NHC(O)CH(C$_2$H$_5$)(C$_4$H$_9$) | (0.77) | 1 | 1.28 |
| C-27 | Cu | —SO$_2$—(CH$_2$)$_2$CO$_2$C$_6$H$_{13}$-n | (0.77) | 1 | 1.31 |
| C-28 | Cu | —SO$_2$—C$_8$H$_{17}$-n | (0.77) | 2 | 1.36 |

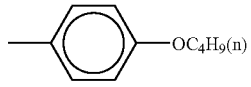

| Compound No. | R$^1$ | ($\sigma_P$) | R$^2$ | ($\sigma_P$) | m:n | Oxidation Potential (V) |
|---|---|---|---|---|---|---|
| C-29 | —C$_{12}$H$_{25}$(n) | (0.77) | —C$_8$H$_{17}$(n) | | 1:3 | 1.28 |
| C-30 | —C$_8$H$_{17}$(n) | (0.77) | —⟨C$_6$H$_4$-OC$_4$H$_9$(n)⟩ | (0.68) | 2:2 | 1.29 |

-continued

| Compound No. | R¹ | (σp) | (second group) | (σp) | m:n | Oxidation Potential (V) |
|---|---|---|---|---|---|---|
| C-31 | —(CH₂)₂CO₂C₆H₁₃(n) | (0.77) | (2-methyl-4-methyl-OC₄H₉ phenyl) | (0.68) | 1:3 | 1.30 |
| C-32 | (2-methyl-4-C₈H₁₇(t)-OC₄H₉ phenyl) | (0.68) | (4-OCH₃ phenyl with methyl) | (0.68) | 3:1 | 1.32 |
| C-33 | (4-C₁₂H₂₅ phenyl) | (0.68) | —C₄H₉(n) | (0.77) | 2:2 | 1.30 |
| C-34 | (4-C₁₂H₂₅ phenyl) |  | —C₄H₉(n) |  | 1:3 | 1.30 |

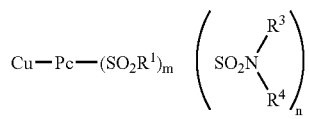

| Compound No. | R¹ | (σp) | $-N\begin{smallmatrix}R^3\\R^4\end{smallmatrix}$ | (σp) | m:n | Oxidation Potential (V) |
|---|---|---|---|---|---|---|
| C-35 | —C₈H₁₇(n) | (0.77) | —NHCH₂CH(C₄H₉(n))(C₂H₅) | (0.65) | 3:1 | 1.29 |
| C-36 | —C₈H₁₇(n) |  | —N(C₆H₁₃(n))₂ | (0.65) | 1:3 | 1.25 |
| C-37 | —C₈H₁₇(n) |  | —NH(CH₂)₃O-(2,4-di-tert-butylphenyl) | (0.65) | 3:1 | 1.28 |
| C-38 | (2-methyl-4-C₈H₁₇(t)-OC₄H₉ phenyl) | (0.68) | —NH(CH₂)₂OC₂H₅ | (0.65) | 1:3 | 1.26 |
| C-39 | (2-methyl-4-C₈H₁₇(t)-OC₄H₉ phenyl) |  | —NHCH₂CO₂C₈H₁₇(n) | (0.65) | 2:2 | 1.28 |

-continued $$Cu-Pc-(SO_2R^1)_m(SO_2R^2)_n$$

| Compound No. | $R^1$ | $(\sigma_p)$ | $R^2$ | $(\sigma_p)$ | m:n | Oxidation Potential (V) |
|---|---|---|---|---|---|---|
| C-40 | —(CH$_2$)$_3$SO$_3$Li | | —(CH$_2$)$_3$SO$_2$NHCH$_2$CH(OH)CH$_3$ | | 3:1 | 1.31 |
| C-41 | —(CH$_2$)$_3$SO$_3$Li | | —(CH$_2$)$_3$SO$_2$NHCH$_2$CH(OH)CH$_3$ | | 2:2 | 1.31 |
| C-42 | —(CH$_2$)$_3$SO$_2$Li | | —(CH$_2$)$_3$SO$_2$NH(CH$_2$)$_2$O(CH$_2$)$_2$OH | | 2:2 | 1.30 |
| C-43 | —(CH$_2$)$_3$SO$_3$K | | (4-methylphenyl)-CO$_2$K | | 1:3 | 1.32 |
| C-44 | —(CH$_2$)$_3$SO$_3$K | | (4-methylphenyl)-CO$_2$K | | 3.5:0.5 | 1.30 |
| C-45 | —(CH$_2$)$_2$NHCO(CH$_2$)$_2$CO$_2$Na | (0.77) | —(CH$_2$)$_3$SO$_3$Na | (0.77) | 2:2 | 1.30 |
| C-46 | —(CH$_2$)$_2$NHCO(CH$_2$)$_2$CO$_2$Na | | —(CH$_2$)$_3$SO$_3$Na | | 1:3 | 1.30 |
| C-47 | —(CH$_2$)$_2$NHSO$_2$-C$_6$H$_4$-CO$_2$Na | (0.77) | —(CH$_2$)$_3$SO$_3$Na | | 1:3 | 1.31 |
| C-48 | —(CH$_2$)$_2$N(CH$_2$CO$_2$Na)$_2$ | | —(CH$_2$)$_3$SO$_3$Na | | 2:2 | 1.32 |

$$Cu-Pc-(SO_2R^1)_m\left(SO_2N\begin{matrix}R^3\\R^4\end{matrix}\right)_n$$

| Compound No. | $R^1$ | $-N(R^3)(R^4)$ | $(\sigma_p)$ | m:n | Oxidation Potential (V) |
|---|---|---|---|---|---|
| C-49 | —(CH$_2$)$_3$SO$_3$K | —NH(CH$_2$)$_2$SO$_3$K | (0.65) | 3:1 | 1.29 |
| C-50 | —(CH$_2$)$_3$SO$_3$K | —NH(CH$_2$)$_2$SO$_3$K | | 2:2 | 1.28 |

In addition to the above, other examples of the compounds also usable in the invention are described in Japanese Patent Application Nos. 2001-96610, 2001-24352, 2001-47013, 2001-57063, 2001-76689, 2001-193638, 2001-15614, 2001-110457, and 2001-110335, to which, however, the invention is not limited. The compounds mentioned hereinabove may be readily produced according to the methods described in the patent publications referred to herein.

(Ink Composition for Inkjet Recording)

The inkjet recording ink set used in the invention comprises, as minimum constituent elements thereof, a yellow ink that contains at least one yellow dye, a magenta ink that contains at least one magenta dye and a cyan ink that contains at least one cyan dye. For the dye in each ink, employable is any of the above-mentioned various dyes. In general, the ink may be prepared by dissolving and/or dispersing the dye in an oleophilic medium or aqueous medium. Preferably, an aqueous medium is used for it.

If desired, any other additive may be added to the ink set, not detracting from the effect of the invention. The additive may be any known one, including, for example, drying inhibitor (moisturizer), fading inhibitor, emulsion stabilizer, penetration promoter, UV absorbent, preservative, antifungal agent, pH-controlling agent, surface tension-controlling agent, defoaming agent, viscosity-controlling agent, dispersant, dispersion stabilizer, rust inhibitor, chelating agent, etc. These additives may be directly added to aqueous inks. On the other hand, when oily dyes are used in the form of their dispersion, the additives are generally added to the dye dispersions. As the case may be, however, the additives may be added to the oily phase or the aqueous phase while the dye dispersions are prepared.

The drying inhibitor is favorably used for preventing the inkjet ink from drying at the inkjet nozzle orifice used for inkjet recording and for preventing the nozzle from being clogged.

For the drying inhibitor, preferred is a water-soluble organic solvent having a lower vapor pressure than water. Its concrete examples are polyalcohols such as typically ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylolpropane; polyalcohol lower alkyl ethers such as ethylene glycol monomethyl (or ethyl) ether, diethylene glycol monomethyl (or ethyl) ether, triethylene glycol monoethyl (or butyl) ether; heterocyclic compounds such as 2-pyrrolidone, N-methyl-2-pyrrolidone, 1,3-dimethyl-2-imidazolidine, N-ethylmorpholine; sulfur-containing compounds such as sulforane, dimethyl sulfoxide, 3-sulforene; polyfunctional compounds such as diacetone alcohol, diethanolamine; and urea derivatives. Of those, more preferred are polyalcohols such as glycerin and diethylene glycol. One or more of these drying inhibitors may be used either singly or as combined. Preferably, the drying inhibitor content of the ink is from 10 to 50% by weight.

The penetration promoter is favorably used for promoting the penetration of the inkjet ink into paper. For the penetration promoter, for example, herein usable are alcohols such as ethanol, isopropanol, butanol, di(tri)ethylene glycol monobutyl ether, 1,2-hexanediol; sodium laurylsulfate, sodium oleate and nonionic surfactants. In general, the penetration promoter is effective enough when its amount in the ink is from 5 to 30% by weight. However, its amount is preferably so controlled that the ink does not cause bleeding and print-through.

The UV absorbent is for improving the image stability. For the UV absorbent, herein usable are benzotriazole compounds as in JP-A 58-185677, 61-190537, 2-782, 5-197075, 9-34057; benzophenone compounds as in JP-A 46-2784, 5-194483, and U.S. Pat. No. 3,214,463; cinnamate compounds as in JP-B 48-30492, 56-21141, and JP-A 10-88106; triazine compounds as in JP-A 4-298503, 8-53427, 8-239368, 10-182621, and JP-T 8-501291 (the term "JP-T" as used herein means a published Japanese translation of a PCT patent application); compounds as in Research Disclosure No. 24239; and other compounds capable of absorbing UV rays to emit fluorescence, or that is, fluorescent brighteners such as typically stilbene compounds and benzoxazole compounds.

The fading inhibitor is for improving the image stability. For it, herein usable are various organic or metal complex-type fading inhibitors. The organic fading inhibitors include hydroquinones, alkoxyphenols, dialkoxyphenols, phenols, anilines, amines, indanes, chromans, alkoxyanilines, and heterocyclic compounds; and the metal complexes include nickel complexes and zinc complexes. More concretely, herein usable are the compounds described in the patent publications that are referred to in Research Disclosure No. 17643, Items VII-I to J, No. 15162, No. 18716, page 650, left column, No. 36544, page 527, No. 307105, page 872, and No. 15162, as well as the compounds that falls within the range of the general formula to indicate the typical compounds and the examples of the compounds described in pp. 127–137 of JP-A 62-215272.

The antifungal agent includes sodium dehydroacetate, sodium benzoate, sodium pyridinethione-1-oxide, ethyl p-hydroxybenzoate, 1,2-benzisothiazolin-3-one and its salts. Preferably, its amount in the ink is from 0.02 to 1.00% by weight.

For the pH-controlling agent, usable are neutralizing agents (organic bases, inorganic alkalis). The pH-controlling agent is for improving the storage stability of the inkjet ink, and this is added to the inkjet ink so that the ink may have a pH of preferably from 6 to 10, more preferably from 7 to 10.

For the surface tension-controlling agent, usable are nonionic, cationic or anionic surfactants. Preferably, the surface tension of the inkjet ink used in the invention is from 25 and 70 mPa·s, more preferably from 25 to 60 mN/m. Also preferably, the viscosity of the inkjet ink used in the invention is at most 30 mPa·s. More preferably, it is controlled to be at most 20 mPa·s. Preferred examples of the surfactants are anionic surfactants such as salts of fatty acids, salts of alkylsulfates, salts of alkylbenenesulfonates, salts of alkylnaphthalenesulfonates, salts of dialkylsulfosuccinates, salts of alkylphosphates, naphthalenesulfonic acid-formalin condensates, salts of polyoxyethylene-alkylsulfates; and nonionic surfactants such as polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters, oxyethylene-oxypropylene block copolymers. Also preferred are SURFYNOLS (Air Products & Chemicals), acetylene-type polyoxyethylene oxide surfactants. Still preferred are amine-oxide type ampholytic surfactants such as N,N-dimethyl-N-alkylamine oxides. Also usable are the surfactants described in JP-A 59-157636, pp. 37–38, and Research Disclosure No. 308119 (1989).

For the defoaming agent, optionally used herein is any of fluorine-containing compounds, silicone compounds and chelating agents such as typically EDTA.

In the case where the dye used in the invention is soluble in oil, it may be dispersed in an aqueous medium, preferably as follows: colorant particles that contain the dye and an oil-soluble polymer are dispersed in an aqueous medium, as in JP-A 11-286637, 2001-240763, 2001-262039, 2001-247788; or the dye of the present invention is dissolved in a high-boiling-point organic solvent and then dispersed in an aqueous medium, as in JP-A 2001-262018, 2001-240763, 2001-335734 or in Japanese Patent Application No. 2000-203857. Regarding the concrete method, and the oil-soluble polymer, the high-boiling-point organic solvent, the additive and their amounts to be used in the process of dispersing the dye of the present invention in an aqueous medium, referred to are those described in the above-mentioned patent publications. If desired, the dye may be directly dispersed in solid particles. In this stage, a dispersant or a surfactant may be used. The dispersing apparatus may be any of simple stirrers, impeller-assisted stirrers, in-line stirrers, mills (e.g., colloid mills, ball mills, sand mills, attritors, roll mills, agitator mills), ultrasonic stirrers, and high-pressure emulsifying dispersers (high-pressure homogenizers, such as commercially-available Gaulin homogenizer, microfluidizer, DeBEE2000). The method of preparing the inkjet recording ink is described in detail also in JP-A 5-148436, 5-295312, 7-97541, 7-82515, 7-118584, 11-286637 and Japanese Patent Application No. 2000-87539, in addition to the above-mentioned patent publications, and the descriptions in these may apply to the preparation of inkjet recording ink in the invention.

The aqueous medium comprises water as the essential ingredient, and it may be a mixture that contains a water-miscible organic solvent. Examples of the water-miscible organic solvent are alcohols (e.g., methanol, ethanol, propanol, isopropanol, butanol, isobutanol, sec-butanol, t-butanol, pentanol, hexanol, cyclohexanol, benzyl alcohol), polyalcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethylenimine, tetramethylpropylenediamine), and other polar solvents (e.g., formamide, N,N-dimethylformamide, N,N-dimethylacetamide, dimethylsulfoxide, sulforane, 2-pyrrolidone, N-methyl-2-pyrrolidone, N-vinyl-2-pyrrolidone, 2-oxazolidone, 1,3-dimethyl-2-imidazolidinone, acetonitrile, acetone). Two or more of the above-mentioned water-miscible organic solvents may be used as combined.

Preferably, the dye content of the ink for the ink set used in the invention is from 0.1 to 20 parts by weight per 100 parts by weight of the ink. In each ink of yellow, magenta and cyan, two or more different types of dyes may be combined so far as the oxidation potential of the combination is nobler than 0.8 V. In the case where two or more different types of dyes are combined, it is desirable that the amount of all the dyes combined falls within the defined range as above.

In the recent imaging technology, two or more inks that have different dye concentrations are combined for each of yellow, magenta and cyan inks to obtain high-quality images. In the invention, it is desirable that all the dyes in such thick and thin inks have an oxidation potential nobler than 0.8 V.

In the case where two or different types of inks are used for the same color in the invention, it is desirable that the ink concentration of one ink is from 0.05 to 0.5 times that of the other ink.

The ink set in the invention is for forming full-color images. For further toning the images, black ink may be additionally used in the ink set. The black colorant usable in it includes disazo dyes, trisazo dyes, tetrazo dyes, and carbon black dispersion.

<Inkjet Recording Sheet>

The inkjet recording sheet used in the invention has at least a colorant-receiving layer on a support, and the colorant-receiving layer contains at least one inorganic mordant.

The inorganic mordant includes polyvalent water-soluble metal salt and hydrophobic metal salt compounds.

Examples of the inorganic mordant are salts and complexes with a metal selected from magnesium, aluminium, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten and bismuth.

Concretely, for example, they are calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupric chloride, copper(II)ammonium chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidosulfate tetrahydrate, aluminium sulfate, aluminium alum, aluminium chloro hydrate, aluminium sulfite, aluminium thiosulfate, aluminium sesquichloro hydrate, aluminium nitrate 9-hydrate, aluminium chloride hexahydrate, basic aluminium lactate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium acetylacetonate, zirconyl acetate, zirconyl sulfate, ammonium zirconium carbonate, zirconyl lactate, zirconyl succinate, zirconyl oxalate, zirconyl stearate, zirconyl octylate, zirconyl nitrate, ammonium zirconium acetate, potassium zirconium carbonate, sodium zirconium lactate, basic zirconium glycinate, basic aluminium sulfate, basic aluminium nitrate, basic aluminium sulfamate, basic aluminium formate, basic aluminium acetate, basic aluminium glycinate, zirconium oxychloride, zirconium hydroxychloride, chromium acetate, chromium sulfate, magnesium sulfate, magnesium chloride hexahydrate, magnesium citrate 9-hydrate, sodium phosphotungstate, sodium tungsten citrate, 12-tungstophosphoric acid n-hydrate, 12-tungstosilicic acid 26-hydrate, molybdenum chloride, 12-molybdophosphoric acid n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride, bismuth nitrate, etc.

For the inorganic mordant used in the invention, preferred are aluminium-containing compounds, titanium-containing compounds, zirconium-containing compounds, and metal compounds (salts or complexes) of the Group IIIB series of the Periodic Table of Elements.

Especially preferred are aluminium-containing compounds and zirconium-containing compounds.

More preferred are water-soluble aluminium compounds (e.g., aluminium sulfate, aluminium alum, aluminium chloro hydrate, aluminium sulfite, aluminium thiosulfate, aluminium sesquichloro hydrate, aluminium nitrate 9-hydrate, aluminium chloride hexahydrate), and water-soluble zirconium compounds (e.g., zirconyl acetate, zirconyl sulfate, zirconium ammonium carbonate, zirconyl nitrate, zirconium oxychloride, zirconium hydroxychloride). Even more preferred is aluminium chloro hydrate.

One or more of these inorganic mordants may be used either singly or as combined. When used as combined, it is preferred to include at least an aluminium-containing compound or a zirconium-containing compound. It is more preferred to use an aluminium-containing compound and a zirconium-containing compound as combined.

The amount of the mordant to be in the ink-receiving layer in the invention is preferably from 0.01 g/m$^2$ to 5 g/m$^2$, more preferably from 0.1 g/m$^2$ to 3 g/m$^2$.

Preferably, the inkjet recording sheet used in the invention contains a water-soluble resin.

(Water-Soluble Resin)

The water-soluble resin includes, for example, polyvinyl alcohol resins in which the hydroxyl groups are hydrophilic structural units [e.g., polyvinyl alcohol (PVA), acetoacetyl-modified polyvinyl alcohol, cation-modified polyvinyl alcohol, anion-modified polyvinyl alcohol, silanol-modified polyvinyl alcohol, polyvinylacetal], cellulose resins [methyl cellulose (MC), ethyl cellulose (EC), hydroxyethyl cellulose (HEC), carboxymethyl cellulose (CMC), hydroxypropyl cellulose (HPC), hydroxyethylmethyl cellulose, hydroxypropylmethyl cellulose], chitins, chitosans, starches, ether bond-having resins [polyethylene oxide (PEO), polypropylene oxide (PPO), polyethylene glycol (PEG), polyvinyl ether (PVE)], and carbamoyl group-having resins [polyacrylamide (PAAM), polyvinylpyrrolidone (PVP), polyacrylic hydrazide].

It further includes polyacrylic acid salts in which the carboxyl group is a dissociable group, maleic acid resins, alginic acid salts, and gelatins.

Of the above, especially preferred are polyvinyl alcohol resins. Examples of polyvinyl alcohol usable herein are described in JP-B 4-52786, 5-67432, 7-29479; Japanese Patent No. 2,537,827; JP-B 7-57553; Japanese Patent Nos. 2,502,998, 3, 053, 231; JP-A 63-176173; Japanese Patent No. 2,604,367; JP-A 7-276787, 9-207425, 11-58941, 2000-135858, 2001-205924, 2001-287444, 62-278080, 9-39373; Japanese Patent No. 2,750,433; and JP-A 2000-158801, 2001-213045, 2001-328345, 8-324105, 11-348417, 58-181687, 10-259213, 2001-72711, 2002-103805, 2000-63427, 2002-308928, 2001-205919, and 2002-264489.

Examples of other water-soluble resins than polyvinyl alcohol resins that are also usable herein are the compounds described in JP-A 2001-205919, 2002-264489, and paragraphs [0011] to [0014] of JP-A 11-165461.

One or more of these water-soluble resins may be used herein either singly or as combined.

The water-soluble resin content of the colorant-receiving layer in the invention is preferably from 9 to 40% by weight, more preferably from 12 to 33% by weight of the total solid content of the layer.

(Particles)

Preferably, the colorant-receiving layer of the inkjet recording sheet used in the invention contains particles. More preferably, the particles are combined with the above-mentioned water-soluble resin in the layer.

Containing particles, the colorant-receiving layer may have a porous structure, and its ink absorbability thereby increases. In particular, when the solid content of the particles in the colorant-receiving layer is at least 50% by weight, more preferably at least 60% by weight, then the layer may have a better porous structure and the inkjet recording sheet may have good ink absorbability. The solid content of the particles in the colorant-receiving layer is obtained through calculation on the basis of the components except water that constitute the composition of the colorant-receiving layer.

The particles in the invention may be any of organic particles and inorganic particles. In view of the ink absorbability and the image stability thereof, the sheet preferably contains inorganic particles.

The organic particles are preferably polymer particles that are obtained, for example, through emulsion polymerization, microemulsion polymerization, soap-free polymerization, seed polymerization, dispersion polymerization or suspension polymerization. They are powdery, latex or emulsion polymer particles of, for example, polyethylene, polypropylene, polystyrene, polyacrylate, polyamide, silicone resin, phenolic resin or natural polymers.

The inorganic particles are, for example, silica particles, colloidal silica, titanium dioxide, barium sulfate, calcium silicate, zeolite, kaolinite, halloysite, mica, talc, calcium carbonate, magnesium carbonate, calcium sulfate, pseudo-boehmite, zinc oxide, zinc hydroxide, alumina, aluminium silicate, calcium silicate, magnesium silicate, zirconium oxide, zirconium hydroxide, cerium oxide, lanthanum oxide and yttrium oxide. Of those, preferred are silica particles, colloidal silica, alumina particles and pseudo-boehmite, as they form better porous structures. When used herein, the particles may be primary particles directly as they are, or they may form secondary particles. Preferably, the particles have an average primary particle diameter of at most 2 µm, more preferably at most 200 nm.

More preferred for use in the invention are silica particles having an average primary particle diameter of at most 30 nm, colloidal silica having an average primary particle diameter of at most 30 nm, alumina particles having an average primary particle diameter of at most 20 nm, or pseudo-boehmite having a mean pore radius of from 2 to 15 nm; and even more preferred are such silica particles, alumina particles or pseudo-boehmite.

Generally depending on their production method, silica particles are grouped into two types, wet-process particles and dry-process (fumed) particles. In the wet process, active silica is formed through acidolysis of silicates, and this is polymerized to a suitable degree and flocculated to obtain hydrous silica. This is the mainstream of the process. On the other hand, a vapor-phase process includes two types; one comprises high-temperature vapor-phase hydrolysis of silicon halide to obtain anhydrous silica (flame hydrolysis), and the other comprises thermal reduction vaporization of silica sand and coke in an electric furnace followed by oxidizing it in air to also obtain anhydrous silica (arc process). These two are the main stream of the vapor-phase process. The "fumed silica" means to indicate anhydrous silica particles obtained in the vapor-phase process. For the silica particles used in the invention, especially preferred are the fumed silica particles.

The fumed silica differs from hydrous silica in point of the density of the surface silanol group and of the presence or absence of pores therein, and the two different types of silica have different properties. The fumed silica is suitable for forming a three-dimensional structure of high porosity. Though not clear, the reason may be because the silanol group density in the surfaces of the particles of hydrous silica is high, concretely from 5 to 8/nm$^2$, and the silica particles may readily densely aggregate, while, on the other hand, the silanol group density in the surfaces of the fumed silica particles is low, concretely from 2 to 3/nm$^2$, and the particles sparsely flocculate, therefore forming a structure of high porosity.

Since the fumed silica has an especially large specific surface area, its ink absorption and retention is high. In addition, since its refractive index is large, the colorant-receiving layer that contains it can be kept transparent so far as the silica particles are dispersed to fall within a suitable particle size range, and the layer may form good color images of high color density. The transparency of the colorant-receiving layer is a matter of importance not only for OHP sheets that require transparency but also for other recording sheets such as photographic glossy paper, for forming good color images of high color density and glossiness.

Preferably, the fumed silica has an average primary particle diameter of at most 30 nm, more preferably at most 20 nm, even more preferably at most 10 nm, most preferably from 3 to 10 nm. The fumed silica particles readily aggregate through hydrogen bonding at the silanol groups therein. Therefore, when their mean primary particle size is not larger than 30 nm, the silica particles may form a structure of high porosity, and effectively increase the ink absorbability of the layer containing them.

If desired, the silica particles may be combined with any other particles mentioned above. In the case where the fumed silica is combined with any other particles, the ratio of the fumed silica is preferably at least 30% by weight, more preferably at least 50% by weight of all the particles to be in the layer.

For the inorganic particles used in the invention, also preferred are alumina particles, alumina hydrate and their mixtures or composites. Of those, alumina hydrate is preferred as it well absorbs and fixes ink, and pseudo-boehmite ($Al_2O_3 \cdot nH_2O$) is more preferred. The alumina hydrate of any morphology may be used herein, but boehmite sol is more preferred as it readily forms a smooth layer.

Regarding the microstructure of pseudo-boehmite for use herein, the mean pore radius thereof is preferably from 1 to 30 nm, more preferably from 2 to 15 nm. Also preferably, the pore volume thereof is from 0.3 to 2.0 cc/g, more preferably from 0.5 to 1.5 cc/g. The pore radius and the pore volume are measured through nitrogen adsorption/desorption, using, for example, a gas adsorption/desorption analyzer (e.g., Coulter's trade name, OMNISORP 369).

In particular, fumed alumina particles are especially preferred for use herein as their specific surface area is large. Also preferably, the fumed alumina particles have an average primary particle diameter of at most 30 nm, more preferably at most 20 nm.

In the case where the particles mentioned above are used in the inkjet recording sheet in the invention, for example, the embodiments disclosed in JP-A 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777 and 2001-301314 are preferably employed.

The above-mentioned water-soluble resin that is the essential ingredient of the colorant-receiving layer in the invention may be the same as the material of the particles to be in the layer, or alternatively, a mixed system of different materials may be used in forming the layer.

For making the colorant-receiving layer transparent, the type of the water-soluble resin to be combined with the particles, especially the silica particles in the layer is a matter of importance. In the case where the above-mentioned, fumed silica is used for the particles, the water-soluble resin to form the layer is preferably polyvinyl alcohol resin, more preferably polyvinyl alcohol resin having a degree of saponification of from 70 to 100%, even more preferably from 80 to 99.5%.

The above-mentioned polyvinyl alcohol resin has a hydroxyl group in its structural units, and the hydroxyl group therein forms a hydrogen bond with the silanol group in the surfaces of the silica particles, therefore facilitating the formation of a three-dimensional network structure of the chain units of secondary silica particles. It is believed that the three-dimensional network structure thus formed will make the colorant-receiving layer have a porous structure of high porosity.

During inkjet recording, the porous colorant-receiving layer thus formed in the manner as above rapidly absorbs ink through the capillaries therein, and forms ink dots of good circularity with no bleeding.

The polyvinyl alcohol resin may be combined with any other water-soluble resin. In the case where the polyvinyl alcohol resin is combined with some additional water-soluble resin, the polyvinyl alcohol resin content is preferably at least 50% by weight, more preferably at least 70% by weight of all the combined water-soluble resin.

(Content Ratio of Particles to Water-Soluble Resin)

The content ratio by weight of the particles (x) to the water-soluble resin (y), PB ratio x/y, has some significant influence on the film structure and the film strength of the colorant-receiving layer. Concretely, if the content ratio by weight, PB ratio, is large, the porosity, the pore volume and the surface area (per the unit weight) of the layer are all high but the density and the strength thereof tend to decrease.

In the colorant-receiving layer in the invention, the content ratio by weight, PB ratio x/y, is preferably from 1.5/1 to 10/1 for the following reasons: if the PB ratio is too large, the film strength of the layer is low and the layer readily cracks in dry; but if too small, the resin will fill up the pores in the layer to lower the layer porosity, and the ink absorbability of the layer will be thereby lowered. To evade the problems, the PB ratio is preferably within the range as above.

While running through the conveyor system in an inkjet printer, the recording sheet may receive stress, and therefore the strength of its colorant-receiving layer must be high. In addition, when the sheet is cut, its colorant-receiving layer should not crack or peel, and therefore the strength of the layer must be high. Taking these into consideration, the ratio by weight, x/y, is preferably at most 5/1. In order that the layer has the ability to rapidly absorb ink in inkjet printers, the ratio is more preferably at least 2/1.

For example, when a coating liquid prepared by completely dispersing the fumed silica particles having an average primary particle diameter of at most 20 nm and the water-soluble resin in an aqueous solution in a ratio, x/y, by weight of from 2/1 to 5/1 is applied onto a support and dried thereon, then a three-dimensional network structure of the chain units of secondary silica particles is formed and a transparent porous film having a mean pore size of at most 30 nm, a porosity of from 50% to 80%, a relative pore volume of at least 0.5 ml/g and a specific surface area of at least 100 $m^2$/g is readily formed.

(Crosslinking Agent)

The colorant-receiving layer in the inkjet recording sheet in the invention is a coating layer that contain the above-mentioned water-soluble resin, and it is desirable that the layer further contains a crosslinking agent capable of crosslinking the water-soluble resin therein. More preferably, the layer contains both the above-mentioned particles and the above-mentioned water-soluble resin, and it is cured through crosslinking of the water-soluble resin with the crosslinking agent therein to form a porous layer.

A boron compound is favorable for crosslinking the water-soluble resin, especially polyvinyl alcohol in the layer. The boron compound includes, for example, borax, boric acids, borates (e.g., orthoborates, $InBO_3$, $ScBO_3$, $YBO_3$, $LaBO_3$, $Mg_3(BO_3)_2$, $Co_3(BO_3)_2$), diborates (e.g., $Mg_2B_2O_5$, $Co_2B_2O_5$), metaborates (e.g., $LiBO_2$, $Ca(BO_2)_2$, $NaBO_2$, $KBO_2$), tetraborates (e.g., $Na_2B_4O_7 \cdot 10H_2O$), pentaborates (e.g., $KB_5O_8 \cdot 4H_2O$, $Ca_2B_6O_{11} \cdot 7H_2O$, $CsB_5O_5$). Above all, borax, boric acids and borates are preferred as they rapidly start crosslinking reaction, and boric acids are more preferred.

The following compounds except boron compounds may also be used as the crosslinking agent for the water-soluble resin.

For example, they are aldehyde compounds such as formaldehyde, glyoxal, glutaraldehyde; ketone compounds such as diacetyl, cyclopentanedione; active halogen compounds such as bis(2-chloroethylurea)-2-hydroxy-4,6-dichloro-1,3,5-triazine, 2,4-dichloro-6-S-triazine sodium salt; active vinyl compounds such as divinylsulfonic acid, 1,3-vinylsulfonyl-2-propanol, N,N'-ethylenebis(vinylsulfonylacetamide), 1,3,5-triacryloyl-hexahydro-S-triazine; N-methylol compounds such as dimethylolurea, methyloldimethylhydantoin; melamine resins such as methylolmelamine, alkylated methylolmelamine; epoxy resins; isocyanate compounds such as 1,6-hexamethylene diisocyanate; aziridine compounds described in U.S. Pat. Nos. 3,017,280, 2,983,611; carboximide compounds described in U.S. Pat. No. 3,100,704; epoxy compounds such as glycerol triglycidyl ether; ethylenimino compounds such as 1,6-hexamethylene-N,N'-bisethyleneurea; halogenocarboxyaldehyde compounds such as mucochloric acid, mucophenoxychloric acid; dioxane compounds such as 2,3-dihydroxydioxane; metal-containing compounds such as titanium lactate, aluminium sulfate, chromium alum, potassium alum, zirconyl acetate, chromium acetate; polyamine compounds such as tetraethylpentamine; hydrazide compounds such as adipic dihydrazide; and low-molecular or polymer compounds having at least two oxazoline groups.

One or more of the above-mentioned crosslinking agents may be used herein either singly or as combined.

Preferably, the colorant-receiving layer is crosslinked and cured in the manner as follows: a basic solution having pH of at least 7.1 (hereinafter referred to as "coating liquid B") is applied onto the coating layer, with a crosslinking agent being added to the coating liquid that contains particles and a water-soluble resin (hereinafter referred to as "coating liquid A") and/or to the basic solution, either (1) at the same time that the coating liquid A is applied onto the support to form the coating layer or (2) in the course of drying the coating layer formed by applying the coating liquid A onto the support before the coating layer exhibits a falling rate of drying. The pH of the basic solution is preferably at least 7.5 and more preferably at least 8.

One preferred embodiment of using a boron compound for the crosslinking agent is described. In the case where the colorant-receiving layer is formed by crosslinking and curing a coating layer formed of the coating liquid A that contains particles and a water-soluble resin such as polyvinyl alcohol, the basic solution, coating liquid B having pH of at least 7.1 is applied to the coating layer either (1) at the same time that the coating liquid A is applied onto the support to form the coating layer or (2) in the course of drying the coating layer formed by applying the coating liquid A onto the support before the coating layer exhibits a falling rate of drying, and the coating layer is crosslinked and cured to be the colorant-receiving layer. The boron compound for the crosslinking agent may be in any of the coating liquid A or the coating liquid B, or may be in both the two. The pH of the basic solution is preferably at least 7.5 and more preferably at least 8.

The amount of the crosslinking agent to be used is preferably from 1 to 50% by weight, more preferably from 5 to 40% by weight of the water-soluble resin in the layer.

(Mordant)

In the colorant-receiving layer in the invention, the inorganic mordant may be combined with an organic mordant for improving the waterproofness and the bleeding resistance in storage of the images formed therein.

The organic mordant is preferably a cationic polymer (cationic mordant). The mordant in the colorant-receiving layer interacts with the colorant, anionic dye in liquid ink and stabilizes the colorant, and therefore improves the waterproofness and the bleeding resistance in storage of the formed images. Different types of the organic mordant and the inorganic mordant may be combined for use herein.

The mordant may be added to the coating liquid A that contains particles and a water-soluble resin. However, in the case where the mordant may react with the particles in the liquid to form aggregates, it may be added to the coating liquid B.

For the cationic mordant, a polymer mordant having, as a cationic group, a primary to tertiary amino group or a quaternary ammonium base is preferably used, but a cationic non-polymer mordant may also be used.

For the polymer mordant, homopolymers of a monomer having a primary to tertiary amino group or its salt or a quaternary ammonium base (mordant monomer), and copolymers or polycondensates of the mordant monomer with any other monomer (hereinafter referred to as "non-mordant monomer") are preferred. These polymer mordants may be used in any form of water-soluble polymers or water-dispersible latex particles.

The monomer (mordant monomer) includes, for example, trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride, trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl)ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl-N-2-(4-vinylphenyl)ethylammonium acetate; quaternates with methyl chloride, ethyl chloride, methyl bromide, ethyl bromide, methyl iodide or ethyl iodide of N,N-dimethylaminoethyl (meth)acrylate, N,N-diethylaminoethyl (meth)acrylate, N,N-dimethylaminopropyl (meth)acrylate, N,N-diethylaminopropyl(meth)acrylate, N,N-dimethylaminoethyl(meth) acrylamide, N,N-diethylaminoethyl(meth)acrylamide, N,N-dimethylaminopropyl (meth) acrylamide, N,N-diethylaminopropyl(meth)acrylamide; and their anion-substituted sulfonates, alkylsulfonates, acetates and alkylcarboxylates.

Concretely, for example, there are mentioned monomethyldiallylammonium chloride, trimethyl-2-(methacryloyloxy)ethylammonium chloride, triethyl-2-(methacryloyloxy)ethylammonium chloride, trimethyl-2-(acryloyloxy) ethylammonium chloride, triethyl-2-(acryloyloxy) ethylammonium chloride, trimethyl-3-(methacryloyloxy) propylammonium chloride, triethyl-3-(methacryloyloxy) propylammonium chloride, trimethyl-2-(methacryloylamino)ethylammonium chloride, triethyl-2-

(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino)propylammonium chloride, triethyl-3-(acryloylamino)propylammonium chloride, N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino) propylammonium chloride, trimethyl-2-(methacryloyloxy) ethylammonium bromide, trimethyl-3-(acryloylamino) propylammonium bromide, trimethyl-2-(methacryloyloxy) ethylammonium sulfonate and trimethyl-3-(acryloylamino) propylammonium acetate.

In addition, N-vinylimidazole and N-vinyl-2-methylimidazole are also copolymerizable monomers for use herein.

Also usable are allylamine, diallylamine and their derivatives and salts. Examples of the compounds are allylamine, allylamine hydrochloride, allylamine acetate, allylamine sulfate, diallylamine, diallylamine hydrochloride, diallylamine acetate, diallylamine sulfate, diallylmethylamine and its salts (e.g., its hydrochloride, acetate, sulfate), and diallylethylamine and its salts (e.g., its hydrochloride, acetate, sulfate), diallyldimethylammonium salt (its counter anion includes chloride, sulfate and acetate ions). These allylamine and diallylamine derivatives are poorly polymerizable when they are in the form of free amines. In general, therefore, their salts are polymerized and the resulting polymers are optionally desalted.

Further, units of N-vinylacetamide or N-vinylformamide may also be used, and the polymers formed are hydrolyzed to form vinylamine units, and they may be further converted into their salts for use herein.

The non-mordant monomer does not contain a basic or cationic moiety of primary to tertiary amino groups and their salts or quaternary ammonium bases, and does not interact with dye in inkjet ink or substantially interacts little with it.

The non-mordant monomer includes, for example, alkyl (meth)acrylates; cycloalkyl (meth)acrylates such as cyclohexyl (meth)acrylate; aryl (meth)acrylates such as phenyl (meth)acrylate; aralkyl esters such as benzyl (meth)acrylate; aromatic vinyl compounds such as styrene, vinyltoluene and α-methylstyrene; vinyl esters such as vinyl acetate, vinyl propionate, vinyl versatate; allyl esters such as allyl acetate; halogen-containing monomers such as vinylidene chloride, vinyl chloride; vinyl cyanides such as (meth)acrylonitrile; olefins such as ethylene and propylene.

Of the alkyl (meth)acrylates, those in which the alkyl moiety has from 1 to 18 carbon atoms are preferred. They include, for example, methyl (meth)acrylate, ethyl (meth) acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate and stearyl (meth)acrylate.

Of those, more preferred are methyl acrylate, ethyl acrylate, methyl methacrylate, ethyl methacrylate and hydroxyethyl methacrylate.

One or more of the non-mordant monomers may be used singly or as combined.

Other preferred examples of the polymer mordant include polydiallyldimethylammonium chloride, copolymers of diallyldimethylammonium chloride and other monomer (mordant monomer and non-mordant monomer), diallydimethylammonium chloride-$SO_2$ copolymer, cyclic amine resin and derivatives thereof such as typically polydiallylmethylamine hydrochloride and polydiallyl hydrochloride (including copolymers thereof; secondary amino, tertiary amino or quaternary ammonium salt substituted alkyl(meth) acrylate polymers and their copolymers with other monomer such as typically polydiethylmethacryloyloxyethylamine, polytrimethylmethacryloyloxyethylammonium chloride, and polydimethylbenzylmethacryloyloxyethylammonium chloride; polyamine resin such as typically polyethylenimine and its derivatives, polyallylamine and its derivatives, and polyvinylamine and its derivatives; polyamide resin such as typically polyamide-polyamine resin and polyamidepichlorohydrine resin; polysaccharide such as typically cationated starch, chitosan and its derivatives; dicyandiamide derivatives such as typically dicyandiamide-formalin polycondensate, and dicyandiamide-diethylenetriamine polycondensate; polyamidine and its derivatives; dialkylamine-epichlorohydrin addition polymer products such as typically dimethylamine-epichlorohydrin addition polymer products; and polystyrene having a quaternary ammonium salt-substituted alkyl group and its copolymers with other monomer.

For the polymer mordant, for example, herein usable are those concretely described in JP-A 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236; U.S. Pat. Nos. 2,484,430, 2,548,564, 3,148,061, 3,309,690, 4,115,124, 4,124,386, 4,193,800, 4,273,853, 4,282,305, 4,450,224; JP-A 1-161236, 10-81064, 10-157277, 10-217601, 2001-138621, 2000-211235, 2001-138627, 8-174992; JP-B 5-35162, 5-35163, 5-35164, 5-88846; and Japanese Patents 2,648,847, 2,661,677.

In the case where the inorganic mordant is combined with the organic mordant for use herein, the blend ratio of the two may be determined depending on the balance of the storability and the bleeding resistance. Preferably, the blend ratio of the inorganic mordant in the mixture is at least 5%, more preferably at least 10%. The amount of the mordant to be in the layer is preferably from 0.01 $g/m^2$ to 5 $g/m^2$, more preferably from 0.1 $g/m^2$ to 3 $g/m^2$.

(Other Components)

If desired, the inkjet recording sheet in the invention may further contain various known additives such as acid, UV absorbent, antioxidant, fluorescent brightener, monomer, polymerization initiator, polymerization inhibitor, bleeding inhibitor, preservative, viscosity stabilizer, defoaming agent, surfactant, antistatic agent, matting agent, curl inhibitor and water-proofing agent.

In the invention, the colorant-receiving layer may contain acid. Containing acid, the surface of the colorant-receiving layer is controlled to have a pH of from 3 to 8, preferably from 4 to 6. This is favorable since the yellowing resistance of the white background of the sheet is improved. The surface pH may be measured according to the surface pH measurement method A (coating method) defined by the Technical Association of the Pulp and Paper Industry of Japan (J. TAPPI). For example, a paper surface pH meter, Kyoritsu Rikagaku Institute's Model MPC for the method A is used.

Examples of the acid are formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, metal salicylates (with Zn, Al, Ca or Mg), methanesulfonic acid, itaconic acid, benzenesulfonic acid, toluenesulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, sulfanilic acid, sulfamic acid, $\alpha$-resorcinolic acid, $\beta$-resorcinolic acid, $\gamma$-resorcinolic acid, gallic acid, phloroglucine, sulfosalicylic acid, ascorbic acid, erysorbic acid, bisphenolic acid, hydrochloric acid, nitric acid, sulfuric acid, phosphoric acid polyphosphoric acid, boric acid and boronic acid. The amount of the acid to be added may be so determined that the surface pH of the colorant-receiving layer may be from 3 to 8.

The acid may be used in the form of its metal salt (for example, with any of sodium, potassium, calcium, cesium, zinc, copper, iron, aluminium, zirconium, lanthanum, yttrium, magnesium, strontium and cerium) or amine salt (for example, with any of ammonia, triethylamine, tributylamine, piperazine, 2-methylpiperazine and polyallylamine). The examples of metal salt include aluminium chloro hydrate, zirconium oxychloride, and zirconyl acetate.

Preferably, the colorant-receiving layer in the invention contains storability improver such as UV absorbent, antioxidant and bleeding inhibitor.

For the UV absorbent, antioxidant and bleeding inhibitor, for example, usable are alkylated phenol compounds (including hindered phenol compounds), alkylthiomethylphenol compounds, hydroquinone compounds, alkylated hydroquinone compounds, tocopherol compounds, aliphatic compounds, aromatic compounds, and/or heterocyclic compounds having thioether bonds, bisphenol compounds, O—, N—and S—benzyl compounds, hydroxybenzyl compounds, triazine compounds, phosphonate compounds, acylaminophenol compounds, ester compounds, amide compounds, ascorbic acid, amine-type antioxidants, 2-(2-hydroxyphenyl)benzotriazole compounds, 2-hydroxybenzophenone compounds, acrylates, water-soluble or hydrophobic metal salts, organic metal compounds, metal complexes, hindered amine compounds (including TEMPO compounds), 2-(2-hydroxyphenyl)-1,3,5-triazine compounds, metal inactivators, phosphite compounds, phosphonite compounds, hydroxyamine compounds, nitroso compounds, peroxide scavengers, polyamide stabilizers, polyether compounds, basic assistant stabilizers, nucleating agents, benzofuranone compounds, indolinone compounds, phosphine compounds, polyamine compounds, thiourea compounds, urea compounds, hydrazide compounds, amidine compounds, saccharide compounds, hydroxybenzoic acid compounds, dihydroxybenzoic acid compounds and trihydroxybenzoic acid compounds.

Of those, preferred are alkylated phenol compounds, compounds having at least two thioether bonds, bisphenol compounds, ascorbic acid, amine-type antioxidants, water-soluble or hydrophobic metal salts, organic metal compounds, metal complexes, hindered amine compounds, hydroxyamine compounds, polyamine compounds, thiourea compounds, hydrazide compounds, hydroxybenzoic acid compounds, dihydroxybenzoic acid compounds and trihydroxybenzoic acid compounds.

Examples of the compounds are described in Japanese Patent Application No. 2002-13005; JP-A 10-182621, 2001-260519; JP-B 4-34953, 4-34513; JP-A 11-170686; JP-B 4-34512; EP 1138509; JP-A 60-67190, 7-276808, 2001-94829, 47-10537, 58-111942, 58-212844, 59-19945, 59-46646, 59-109055, 63-53544; JP-B 36-10466, 42-26187, 48-30492, 48-31255, 48-41572, 48-54965, 50-10726; U.S. Pat. Nos. 2,719,086, 3,707,375, 3,754,919, 4,220,711; JP-B 45-4699, 54-5324; EP-A 223739, 309401, 309402, 310551, 310552, 459416; GP-A 3435443; JP-A 54-48535, 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 66-88381, 63-113536, 63-163351, 63-203372, 63-224989, 63-251282, 63-267594, 63-182484, 1-239282, 2-262654, 2-71262, 3-121449, 4-291685, 4-291684, 5-61166, 5-119449, 5-188687, 5-188686, 5-110490, 5-170361; JP-B 48-43295, 48-33212; and U.S. Pat. Nos. 4,814,262, 4,980, 275.

One or more of the above-mentioned additive components may be used singly or as combined. These additive components may be in any form of aqueous solution, dispersion, polymer dispersion, emulsion or oil drops, or may be encapsulated into microcapsules. In the inkjet recording sheet in the invention, the amount of the additive components is preferably from 0.01 to 10 g/m$^2$.

For increasing the dispersibility of inorganic particles, their surfaces may be processed with a silane coupling agent. Preferably, the silane coupling agent has an organic functional group (e.g., vinyl group, amino group (primary to tertiary amino group, quaternary ammonium salt group), epoxy group, mercapto group, chloride group, alkyl group, phenyl group and ester group), in addition to the coupling-active site thereof.

The coating liquid for the colorant-receiving layer in the invention preferably contains a surfactant. The surfactant may be any of cationic, anionic, nonionic, ampholytic, fluorine-containing or silicone-type surfactants.

The nonionic surfactant includes, for example, polyoxyalkylene alkyl ethers and polyoxyalkylene alkylphenyl ethers (e.g., diethylene glycol monoethyl ether, diethylene glycol diethyl ether, polyoxyethylene lauryl ether, polyoxyethylene stearyl ether, polyoxyethylene nonylphenyl ether), oxyethylene-oxypropylene block copolymers, sorbitan fatty acid esters (e.g., sorbitan monolaurate, sorbitan monooleate, sorbitan trioleate), polyoxyethylene-sorbitan fatty acid esters (e.g., polyoxyethylene-sorbitan monolaurate, polyoxyethylene-sorbitan monooleate, polyoxyethylene-sorbitan trioleate), polyoxyethylene-sorbitol fatty acid esters (e.g., polyoxyethylene-sorbitol tetraoleate), glycerin fatty acid esters (e.g., glycerol monooleate), polyoxyethylene-glycerin fatty acid esters (e.g., polyoxyethylene-glycerin monostearate, polyoxyethylene-glycerin monooleate), polyoxyethylene fatty acid esters (e.g., polyethylene glycol monolaurate, polyoxyethylene glycol monooleate), polyoxyethylene alkylamines, acetylene glycols (e.g., 2,4,7,9-tetramethyl-5-decyne-4,7-diol, and ethylene oxide adducts and propylene oxide adducts to the diol). Preferred are polyoxyalkylene alkyl ethers. The nonionic surfactant may be added to the first and second coating liquids. One or more of these nonionic surfactants may be used herein either singly or as combined.

The ampholytic surfactant includes, for example, amino acid-type, carboxyammonium betaine-type, sulfonammonium betaine-type, ammonium sulfate betaine-type and imidazolium betaine-type compounds. For example, those described in U.S. Pat. No. 3,843,368, JP-A 59-49535, 63-236546, 5-303205, 8-262742, 10-282619, Japanese Patents 2,514,194, 2,759,795, and JP-A 2000-351269 are preferably used herein. Of the ampholytic surfactants, more preferred are amino acid-type, carboxyammonium betaine-type and sulfonammonium betaine-type compounds. One or more such ampholytic surfactants may be sued herein either singly or as combined.

The anionic surfactant includes, for example, salts of fatty acid (e.g., sodium stearate, potassium oleate), salts of alkylsulfates (e.g., sodium laurylsulfate, laurylsulfate triethanolamine), salts of sulfonic acids (e.g., sodium dodecylbenzenesulfonate), salts of alkylsulfosuccinates (e.g., sodium dioctylsulfosuccinate), salts of alkyldiphenyl ether disulfonates and salts of alkylphosphates.

The cationic surfactant includes, for example, alkylamine salts, quaternary ammonium salts, pyridinium salts and imidazolium salts.

The fluorine-containing surfactant may be a compound derived from a perfluoroalkyl group-having intermediate through electrolytic fluorination, telomerization or oligomerization.

For example, it includes salts of perfluoroalkylsulfonates, salts of perfluoroalkylcarboxylic acids, perfluoroalkyl-ethylene oxide adducts, perfluoroalkyl-trialkylammonium salts, perfluoroalkyl group-having oligomers and perfluoroalkylphosphates.

For the silicone-containing surfactant, preferred is silicone oil modified with an organic group. The side branches of the siloxane structure of the compound may be modified with an organic group; or both ends or one end thereof may be modified with it. The organic group modification includes, for example, amino modification, polyether modification, epoxy modification, carboxyl modification, carbinol modification, alkyl modification, aralkyl modification, phenol modification and fluorine modification.

In the invention, the amount of the surfactant to be in the coating liquid for the colorant-receiving layer is preferably from 0.001 to 2.0%, more preferably from 0.01 to 1.0% of the liquid. In the case where two or more coating liquids are used for forming the colorant-receiving layer, it is desirable that the surfactant is added to every coating liquid.

For preventing it from curling, the colorant-receiving layer in the invention preferably contains a high-boiling-point organic solvent. The high-boiling-point organic solvent is an organic compound having a boiling point at normal pressure of not lower than 150° C., and it is a water-soluble or hydrophobic compound. It may be liquid or solid at room temperature, and may be a low-molecular or high-molecular compound.

Concretely, for example, it includes aromatic carboxylates (e.g., dibutyl phthalate, diphenyl phthalate, phenyl benzoate), aliphatic carboxylates (e.g., dioctyl adipate, dibutyl sebacate, methyl stearate, dibutyl maleate, dibutyl fumarate, triethyl acetylcitrate), phosphates (e.g., trioctyl phosphate, tricresyl phosphate), epoxy compounds (e.g., epoxidated soybean oil, methyl esters of epoxydated fatty acids), alcohols (e.g., stearyl alcohol, ethylene glycol, propylene glycol, diethylene glycol, triethylene glycol, glycerin, diethylene glycol monobutyl ether (DEGMBE), triethylene glycol monobutyl ether, glycerin monomethyl ether, 1,2,3-butanetriol, 1,2,4-butanetriol, 1,2,4-pentanetriol, 1,2,6-hexanetriol, thiodiglycol, triethanolamine, polyethylene glycol), vegetable oils (e.g., soybean oil, sunflower oil) and higher aliphatic carboxylic acids (e.g., linolic acid, oleic acid).

(Support)

For the support, any of transparent supports of a transparent material such as plastics, and opaque supports of an opaque material such as paper may be used in the invention. For making the best use of the transparency of the colorant-receiving layer, transparent supports or opaque supports of high glossiness are preferably used.

For the transparent supports, transparent materials that are resistant to radiation heat in OHP or backlight displays are preferred. The materials are, for example, polyesters such as polyethylene terephthalate (PET); and polysulfones, polyphenylene oxides, polyimides, polycarbonates and polyamides. Above all, polyesters are preferred, and polyethylene terephthalate is more preferred.

Though not specifically defined, the thickness of the transparent support is preferably from 50 to 200 μm in view of the handlability thereof.

For the opaque supports of high glossiness, those having a glossiness of at least 40% on the surface to be coated with the colorant-receiving layer are preferred. The glossiness is obtained according to the method of JIS P-8142 (method of measuring the 75-degree mirror surface glossiness of paper and paper boards). Concretely, the following supports are mentioned.

For example, they are paper supports of high glossiness, such as art paper, coated paper, cast-coated paper, or baryta paper for silver-salt photographic supports; glossy plastic films of polyesters such as polyethylene terephthalate (PET), cellulose esters such as nitrocellulose, cellulose acetate or cellulose acetate butyrate, polysulfones, polyphenylene oxides, polyimides, polycarbonates or polyamides, which are made opaque by adding a white pigment thereto (their surface may be calendered); and supports prepared by coating the above-mentioned various types of paper supports, transparent supports or white pigment-containing films of high glossiness, with a polyolefin layer containing or not containing a white pigment.

White pigment-containing foamed polyester films (for example, foamed PET containing polyolefin particles and stretched to form pores therein) are also preferred for use herein. In addition, resin-coated paper for silver-salt photographic printing paper is also preferred.

Though not specifically defined, the thickness of the opaque support is preferably from 50 to 300 μm in view of the handlability thereof.

The supports may be treated with corona discharge, glow discharge, flames, or UV irradiation for improving the wettability and the adhesiveness thereof.

The base paper for resin-coated paper is described in detail.

The main material of the base paper is wood pulp. Synthetic pulp of polypropylene or synthetic fiber of nylon or polyester is optionally added to wood pulp, and this is made into paper. The wood pulp may be any of LBKP, LBSP, NBKP, NBSP, LDP, NDP, LUKP or NUKP, but it is desirable to use a larger amount of LBKP, NBSP LBSP, NDP or LDP containing much short fiber.

However, the proportion of LBSP and/or LDP is preferably from 10% by weight to 70% by weight.

The pulp is preferably chemical pulp (sulfate pulp or sulfite pulp) containing few impurities, and it may be bleached to have an increased degree of whiteness. The bleached pulp is also useful herein.

A sizing agent such as higher fatty acids, alkylketene dimers; a white pigment such as calcium carbonate, talc, titanium oxide; a paper reinforcing agent such as starch, polyacrylamide, polyvinyl alcohol; a fluorescent brightener; a water-retaining agent such as polyethylene glycols; a dispersant; and a softener such as quaternary ammoniums may be optionally added to the base paper.

The freeness of the pulp to be made into the base paper is preferably from 200 to 500 ml in terms of CSF. Regarding the fiber length of the pulp after beaten, it is desirable that the total of the 24-mesh residue and the 42-mesh residue defined in JIS P-8207 is from 30 to 70% by weight. Also preferably, the 4-mesh residue is at most 20% by weight.

The unit weight of the base paper is preferably from 30 to 250 g, more preferably from 50 to 200 g. The thickness of the base paper is preferably from 40 to 250 µm. While or after prepared, the base paper may be calendered to have an increased smoothness. The density of the base paper is generally from 0.7 to 1.2 g/m$^2$ (JIS P-8118).

Further, the toughness of the base paper is preferably from 20 to 200 g under the condition of JIS P-8143.

The surface of the base paper may be coated with a surface-sizing agent. The surface-sizing agent may be the same as that capable of being added to the base paper as above.

The pH of the base paper is preferably from 5 to 9, measured in a hot water extraction method of JIS P-8113.

Polyethylene to coat the face and the back of the base paper is generally low-density polyethylene (LDPE) and/or high-density polyethylene (HDPE), but other LLDPE and polypropylene may be partly used.

Preferably, the polyethylene layer on which the colorant-receiving layer is formed contains rutile or anatase-type titanium oxide, fluorescent brightener or ultramarine added to polyethylene so as to improve the opacity, the whiteness and the color of the layer, like in most photographic printing paper. The titanium oxide content of the polyethylene layer is preferably from approximately 3 to 20% by weight, more preferably from 4 to 13% by weight of polyethylene. Though not specifically defined, the thickness of the polyethylene layer is preferably from 10 to 50 µm for both the face and back layers. A subbing layer may be formed on the polyethylene layer for enhancing the adhesion to the colorant-receiving layer. For the subbing layer, aqueous polyesters, gelatin and PVA are preferred. The thickness of the subbing layer is preferably from 0.01 to 5 µm.

The polyethylene-coated paper may be glossy paper, or may be mat or silky paper finely embossed while polyethylene is melt-extruded onto the base paper to coat it, like ordinary photographic printing paper.

The support may be coated with a back coat layer, to which white pigment, aqueous binder and other components may be added.

The white pigment that may be in the back coat layer includes, for example, inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminium silicate, diatomaceous earth, calcium silicate, magnesium silicate, synthetic amorphous silica, colloidal silica, colloidal alumina, pseudo-boehmite, aluminium hydroxide, alumina, lithopone, zeolite, hydrated halloysite, magnesium carbonate, magnesium hydroxide; and organic pigments such as styrenic plastic pigment, acrylic plastic pigment, polyethylene microcapsules, urea resin and melamine resin.

The aqueous binder that may be in the back coat layer includes, for example, water-soluble polymers such as styrene/maleic acid salt copolymer, styrene/acrylic acid salt copolymer, polyvinyl alcohol, silanol-modified polyvinyl alcohol, starch, cationated starch, casein, gelatin, carboxymethyl cellulose, hydroxyethyl cellulose, polyvinylpyrrolidone; and water-dispersible polymers such as styrene-butadiene latex, acrylic emulsion.

The other components that may be in the back coat layer are defoaming agent, antifoaming agent, dye, fluorescent brightener, preservative, waterproofing agent, etc.

(Fabrication of Inkjet Recording Sheet)

In the invention, the colorant-receiving layer may be formed on the inkjet recording sheet in any known coating method, not specifically defined. For it, for example, usable is any of an extrusion die coater, an air doctor coater, a blade coater, a rod coater, a knife coater, a squeeze coater, a reverse roll coater or a bar coater. One or more colorant-receiving layers may be formed on the support, having a single-layered or multi-layered structure. In addition, the sheet may additionally have an ink solvent absorbent layer, an interlayer, a protective layer and others. In the invention, the inorganic mordant shall be in every colorant-receiving layer or around the ink-receiving face of the sheet.

Specifically, it is desirable that the colorant-receiving layer is formed by applying a first coating liquid (hereinafter this will be referred to as "coating liquid (A1)") that contains at least particles and a water-soluble resin, onto a support, applying a second coating liquid (hereinafter this will be referred to as "coating liquid (B1)") that contains at least a mordant and has a pH of 7.1 or more, onto the coating layer either (1) simultaneously with the coating or (2) while the coating layer formed is dried but before it exhibits a falling rate of drying, and crosslinking and curing the coating layer having the second coating liquid applied thereonto (wet-on-wet method). In the method, the inorganic mordant to be in the colorant-receiving layer in the invention is preferably in at least either of the coating liquid (A1) or the coating liquid (B1). It is more preferably in the coating liquid (A1). Also preferably, a crosslinking agent for crosslinking the water-soluble resin is at least in either of the coating liquid (A1) or the coating liquid (B1).

Forming the crosslinked and cured, colorant-receiving layer in the sheet is preferred in view of the ink absorbability and the cracking resistance of the layer.

In the invention, the coating liquid (A1) for forming the colorant-receiving layer that contains at least particles (for example, fumed silica) and a water-soluble resin (e.g., polyvinyl alcohol) may be prepared, for example, as follows.

Particles of fumed silica and a dispersant are added to water (for example, silica particles in water account for from 10 to 20% by weight), dispersed therein with a high-revolution wet colloid mill (e.g., M Technic's CLEAMIX), under a high revolution condition, for example, at 10,000 rpm (preferably from 5,000 to 20,000 rpm) for 20 minutes (preferably from 10 to 30 minutes), then a crosslinking agent (boron compound) and an aqueous polyvinyl alcohol (PVA) solution are added thereto (for example, so that the amount of PVA added may be around ⅓ by weight of the fumed silica), and when the coating liquid for the colorant-receiving layer shall contain an inorganic mordant of the invention, the mordant is added to it, and this is dispersed under the same revolution condition as previously to prepare the intended coating liquid for the colorant-receiving layer. Thus prepared, the coating liquid is in the form of a uniform sol, and this is applied onto a support according to the coating method mentioned below, and dried to form thereon the intended, porous colorant-receiving layer having a three-dimensional network structure.

For preparing the aqueous dispersion of the above-mentioned fumed silica and dispersant, an aqueous dispersion of the fumed silica is first prepared, and the resulting aqueous dispersion may be added to an aqueous solution of dispersant, or an aqueous solution of dispersant may be added to the aqueous dispersion of fumed silica, or they may be mixed all at a time. If desired, not the aqueous dispersion of fumed silica but the powdery fumed silica itself may be directly added to an aqueous solution of dispersant.

After the fumed silica and the dispersant have been mixed, the resulting mixture is further dispersed by using a disperser to obtain an aqueous dispersion having a mean particle size of from 50 to 300 nm. For obtaining the aqueous dispersion, various conventional dispersing machines such as high-revolution dispersers, medium-assisted stirring dispersers (e.g., ball mills, sand mills), ultrasonic dispersers, colloid mill dispersers and high-pressure dispersers may be used. In the invention, for efficiently dispersing lumps of particles that may be formed, stirring dispersers, colloid mill dispersers or high-pressure dispersers are preferably used.

The solvent in each step may be any of water, organic solvents or their mixed solvents. The organic solvents usable for the coating operation are, for example, alcohols such as methanol, ethanol, n-propanol, i-propanol and methoxypropanol; ketones such as acetone, methyl ethyl ketone; and tetrahydrofuran, acetonitrile, ethyl acetate and toluene.

For the dispersant, usable are cationic polymers. The cationic polymers are, for example, those mentioned hereinabove for the organic mordant. For the dispersant, also usable are silane coupling agents.

The amount of the dispersant is preferably from 0.1% to 30%, more preferably from 1% to 10% of the particles.

After formed on the support, the colorant-receiving layer may be calendered. For example, using a super calender or gloss calender, it is passed through roll nips under heat and pressure. Thus calendered, the surface smoothness, the glossiness, the transparency and the strength of the layer are increased. However, since the calendering treatment will often lower the porosity of the layer (namely, the ink absorbability of the layer will be lowered), its condition must be so controlled that the porosity of the layer does not much lowered after the calendering treatment.

The roll temperature in the calendering treatment is preferably from 30 to 150° C., more preferably from 40 to 100° C.

The linear pressure between the rolls in the calendering treatment is preferably from 50 to 400 kg/cm, more preferably from 100 to 200 kg/cm.

Regarding its thickness, the colorant-receiving layer must have an absorption capacity capable of absorbing all liquid drops in inkjet recording. Therefore, the thickness of the layer must be determined in relation to the porosity thereof. For example, when the amount of ink to be applied to the layer is 8 nl/mm$^2$ and the porosity of the layer is 60%, the thickness of the layer must be at least about 15 µm.

In consideration of this, the thickness of the colorant-receiving layer for inkjet recording is preferably from 10 to 50 µm.

Preferably, the pore size of the colorant-receiving layer is from 0.005 to 0.030 µm, more preferably from 0.01 to 0.025 µm, in terms of the median diameter thereof.

The porosity and the pore median diameter may be measured with a mercury porosimeter (PORESIZER 9320-PC2, trade name by Shimadzu Corporation).

Preferably, the colorant-receiving layer has high transparency. For its criterion, the haze of the colorant-receiving layer formed on a transparent film support is preferably at most 30%, more preferably at most 20%.

The haze may be measured with a haze meter (HGM-2DP by Suga Test Instruments Co., Ltd.).

A dispersion of polymer particles may be added to the constitutive layers (e.g., colorant-receiving layer, back layer) of the inkjet recording sheet in the invention. The dispersion of polymer particles is for improving the physical properties of the coating film, for example, for improving the dimensional stability of the film and for preventing the film from curling, blocking and cracking. The dispersion of polymer particles is described in, for example, JP-A 62-245258, and 10-228076. When a dispersion of polymer particles having a low glass transition temperature (not higher than 40° C.) is added to the mordant-containing layer, then it is effective for preventing the layer from cracking and curling. When a dispersion of polymer particles having a high glass transition point is added to the back layer, it is also effective for preventing the layer from curling.

The inkjet recording sheet in the invention may be fabricated as well, according to the methods described in JP-A 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091 and 8-2093.

A subbing layer may be formed on the support for enhancing the adhesiveness between the colorant-receiving layer and the support and for suitably controlling the electric resistance of the support.

The colorant-receiving layer may be on one surface of the support, or on both surfaces thereof for preventing curling and deformation of the support. In the case where the colorant-receiving layer is formed on one surface of the support for OHP or the like, an antireflection layer may be formed on the opposite surface or both surfaces of the support for increasing the light transmittance through the support.

Boric acid or boron compound may be applied onto the surface of the support which is to be coated with the colorant-receiving layer, and then the colorant-receiving layer is formed thereon to ensure the surface glossiness and smoothness of the colorant-receiving layer, whereby the images formed may be prevented from bleeding in high-temperature high-humidity conditions.

<Inkjet Recording Method>

The system for the inkjet recording method of the invention is not specifically defined, for which any known system is employable. For example, employable is any of a charge control system of jetting out ink through electrostatic attractive force; a drop-on-demand system (pressure pulse system) of using the oscillation pressure of a piezoelectric device; an acoustic inkjet system of converting an electric signal into an acoustic beam, applying it to ink, and jetting out the ink under radiation pressure; or a thermal inkjet system of heating ink to form bubbles and utilizing the resulting pressure. The inkjet recording system includes a system of jetting a large number of small-volume drops of photoink of low concentration, a system of using multiple inks of substantially the same color which, however, differ in concentration to improve the image quality, and a system of using colorless transparent ink.

Next described is the second aspect of the invention.

<Inkjet Recording Ink>

The inkjet recording ink for use in the second aspect of the invention is the same as that for use in the first aspect thereof described hereinabove.

<Inkjet Recording Sheet>

The inkjet recording sheet in this aspect has a colorant-receiving layer at least on a support, and the colorant-receiving layer contains at least alumina particles or alumina hydrate.

The alumina particles used in the invention is crystalline particles of aluminium oxide; and α-alumina, δ-alumina, γ-alumina, θ-alumina and κ-alumina are known. Of those, preferred for use in the invention are δ-alumina and γ-alumina. In view of the production method thereof, more preferred are alumina particles produced by a vapor-phase process. Concretely, the fumed alumina particles are produced by hydrolyzing a gaseous metal chloride in the presence of water that is generated in oxyhydrogen reaction or at a temperature characteristic of the reaction.

Preferably, the mean primary particle size of the alumina particles is at most 100 nm, more preferably at most 20 nm. Containing the alumina particles having an average primary particle diameter of at most 20 nm, the colorant-receiving layer may have an increased porosity and the ink absorbability of the inkjet recording sheet may be thereby increased.

Alumina hydrate used in the invention may be represented by the following general formula:

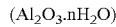

Depending on the composition and the crystal morphology, the alumina hydrate is grouped into gibbsite, bayerite, norstrandite, boehmite, boehmite gel (pseudo-boehmite), diaspore and amorphous alumina. When n in the above-mentioned formula is 1, it indicates alumina hydrate having a boehmite structure; when n is more than 1 but smaller than 3, it indicates alumina hydrate having a pseudo-boehmite structure; and when n is 3 or more, it indicates an amorphous alumina hydrate. Alumina hydrate of the formula where n is more than 1 but smaller than 3 is preferred for use in the invention.

In order that the alumina hydrate ensures rapid ink absorption, it is desirable that the mean pore radius of the alumina hydrate is from 1 to 20 nm, more preferably from 3 to 10 nm. Within the range, the alumina hydrate ensures both rapid ink absorption and rapid ink fixation, and is therefore favorable.

In order that the alumina hydrate ensures good ink absorption, it is desirable that the pore volume of the alumina hydrate is from 0.1 to 1 ml/g, more preferably from 0.4 to 0.6 ml/g. In the case where the pore volume of the ink-receiving layer is too large, the ink-receiving layer may crack or powder away; but when the pore volume thereof is too small, the ink absorption will be poor. Also preferably, the solvent absorption of the ink-receiving layer per the unit area is at least 5 ml/m$^2$, more preferably at least 10 ml/m$^2$. If the solvent absorption per the unit area of the layer is too small, ink will overflow especially in multi-color printing.

In order that the alumina hydrate may satisfactorily absorb the dye in ink and fix it, it is desirable that the BET specific surface area of the alumina hydrate is from 50 to 500 m$^2$/g.

Regarding its shape, the alumina hydrate used in the invention may be tabular, fibrous, needle-like, spherical or rod-like. In view of its ink absorbability, the alumina hydrate is preferably tabular. The tabular alumina hydrate may have a mean aspect ratio of from 3 to 8, preferably from 3 to 6. The aspect ratio means a ratio of the "diameter" to the "thickness" of alumina hydrate particles. The diameter of the alumina hydrate particle means to indicate the diameter of a circle of which the area is the same as the projected area of the particle observed with an electronic microscope. If the aspect ratio of the particles is smaller than the range as above, the pore size distribution in the ink-receiving layer will be narrow and the ink absorbability of the layer will lower. On the other hand, if the aspect ratio is larger than the range, it is difficult to produce uniform alumina hydrate particles.

The method for producing the alumina hydrate used in the invention is not specifically defined. For producing it, any known method is employable. For example, an aluminium alkoxide such as aluminium isopropoxide is hydrolyzed; an aluminium alkoxide having a long carbon chain (for example, alkoxide having from 5 to 40 carbon atoms, preferably from 8 to 22 carbon atoms) is hydrolyzed in the presence of acid; an aluminium salt is neutralized with alkali; or an aluminate is hydrolyzed. The physical properties including the particle size, pore size, pore volume and specific surface area of the alumina hydrate may be controlled by suitably controlling the precipitation temperature, the ageing temperature, the ageing time, the liquid pH, the liquid concentration and the co-existing compounds.

The method of preparing alumina hydrate from alkoxide is described in, for example, Japanese Patent 3,085,746, JP-A 2000-301829, 2000-108505 and 2000-108505.

In the invention, the alumina particles or alumina hydrate may be combined with any other particles not detracting from the effect of the invention. The additional particles may be organic particles or inorganic particles. However, in view of the ink absorbability and the image stability, it is desirable that the colorant-receiving layer contains inorganic particles.

Containing the additional particles, the colorant-receiving layer may have a porous structure and its ink absorbability therefore increases. In particular, when the solid content of the particles in the colorant-receiving layer is at least 50% by weight, more preferably at least 60% by weight, then the layer may have a better porous structure and the inkjet recording sheet may have good ink absorbability. The solid content of the particles in the colorant-receiving layer is obtained through calculation on the basis of the components except water that constitute the composition of the colorant-receiving layer.

The organic particles are preferably polymer particles that are obtained, for example, through emulsion polymerization, microemulsion polymerization, soap-free polymerization, seed polymerization, dispersion polymerization or suspension polymerization. They are powdery, latex or emulsion polymer particles of, for example, polyethylene, polypropylene, polystyrene, polyacrylate, polyamide, silicone resin, phenolic resin or natural polymers.

The inorganic particles are, for example, silica particles, colloidal silica, titanium dioxide, barium sulfate, calcium silicate, zeolite, kaolinite, halloysite, mica, talc, calcium carbonate, magnesium carbonate, calcium sulfate, zinc oxide, zinc hydroxide, calcium silicate, magnesium silicate, zirconium oxide, zirconium hydroxide, cerium oxide, lanthanum oxide and yttrium oxide. Of those, preferred are silica particles and colloidal silica. When used herein, the particles may be primary particles directly as they are, or they may form secondary particles. Preferably, the particles have an average primary particle diameter of at most 2 μm, more preferably at most 200 nm.

More preferred for use in the invention are silica particles having an average primary particle diameter of at most 30 nm or colloidal silica having an average primary particle diameter of at most 30 nm; and even more preferred are such silica particles.

Depending on their production method, silica particles are generally grouped into two types, wet-process particles and dry-process (fumed) particles. In the wet process, active silica is formed through acidolysis of silicates, and this is polymerized to a suitable degree and flocculated to obtain hydrous silica. This is the mainstream of the process. On the other hand, the vapor-phase process includes two types; one comprises high-temperature vapor-phase hydrolysis of silicon halide to obtain anhydrous silica (flame hydrolysis), and the other comprises thermal reduction vaporization of silica sand and coke in an electric furnace followed by oxidizing it in air to also obtain anhydrous silica (arc process). These two are the main stream of the vapor-phase process. The "fumed silica" means to indicate anhydrous silica particles obtained in the vapor-phase process. For the silica particles used in the invention, especially preferred are the fumed silica particles.

The fumed silica differs from hydrous silica in point of the density of the surface silanol group and of the presence or absence of pores therein, and the two different types of silica have different properties. The fumed silica is suitable for forming a three-dimensional structure of high porosity. Though not clear, the reason may be because the silanol group density in the surfaces of the particles of hydrous silica is high, concretely from 5 to $8/nm^2$, and the silica particles may readily densely aggregate, while, on the other hand, the silanol group density in the surfaces of the fumed silica particles is low, concretely from 2 to $3/nm^2$, and the particles sparsely flocculate, thereby forming a structure of high porosity.

(Water-Soluble Resin)

In one preferred embodiment of the inkjet recording sheet in the invention, the colorant-receiving layer is formed by applying a dispersion of the above-mentioned particles with a water-soluble resin onto a support.

For the water-soluble resin, for example, those described hereinabove in the section of the first aspect of the invention are employable.

Above all, especially preferred is polyvinyl alcohol resin. More preferred is polyvinyl alcohol resin having a degree of saponification of from 70 to 100%, even more preferably from 80 to 99.5%. For examples of the polyvinyl alcohol of the type, referred to are those that are described in the references listed hereinabove in the section of the first aspect of the invention.

Examples of other water-soluble resins than polyvinyl alcohol resins that are also usable herein are the compounds described in JP-A 2001-205919, 2002-264489, and paragraphs [0011] to [0014] of JP-A 11-165461.

One or more of these water-soluble resin may be used herein either singly or as combined.

Preferably, the water-soluble resin content of the colorant-receiving layer in the invention is from 9 to 40% by weight, more preferably from 12 to 33% by weight of the total solid content of the layer.

In the case where the polyvinyl alcohol resin is combined with any other water-soluble resin in the invention, the ratio of the polyvinyl alcohol resin to all the water-soluble resins is preferably at least 50% by weight, more preferably at least 70% by weight.

(Content Ratio of Particles to Water-Soluble Resin)

The content ratio by weight of the particles (x) to the water-soluble resin (y), PB ratio x/y, has some significant influence on the film structure and the film strength of the colorant-receiving layer. Concretely, if the content ratio by weight, PB ratio, is large, the porosity, the pore volume and the surface area (per the unit weight) of the layer are all high but the density and the strength thereof tend to decrease.

In the colorant-receiving layer in the invention, the content ratio by weight, PB ratio x/y, is preferably from 1.5/1 to 10/1 for the following reasons: if the PB ratio is too large, the film strength of the layer is low and the layer readily cracks in dry; but if too small, the resin will fill up the pores in the layer to lower the layer porosity, and the ink absorbability of the layer will be thereby lowered. To evade the problems, the PB ratio is preferably within the range as above.

While running through the conveyor system in an inkjet printer, the recording sheet may receive stress, and therefore the strength of its colorant-receiving layer must be high. In addition, when the sheet is cut, its colorant-receiving layer should not crack or peel, and therefore the strength of the layer must be high. Taking these into consideration, the ratio by weight, x/y is preferably at most 5/1. In order that the layer has the ability to rapidly absorb ink in inkjet printers, the ratio is more preferably at least 2/1.

(Crosslinking Agent)

The crosslinking agent for use in the second aspect of the invention may be the same as that referred to hereinabove in the section of the first aspect of the invention.

(Mordant)

In the invention, the colorant-receiving layer contains a mordant for improving the waterproofness and the bleeding resistance in storage of the images formed therein.

The mordant is preferably an organic mordant, cationic polymer (cationic mordant), or an inorganic mordant. The mordant in the colorant-receiving layer interacts with the colorant, anionic dye in liquid ink and stabilizes the colorant, and therefore improves the waterproofness and the bleeding resistance in storage of the formed images. One or more different types of organic mordants and inorganic mordants may be used herein, or an organic mordant and an inorganic mordant may be combined for use herein.

The mordant may be added to the coating liquid A that contains particles and a water-soluble resin. However, if it may interact with the particles, the mordant may be added to the coating liquid B.

For the cationic mordant, referred to are those described hereinabove in the section of the first aspect of the invention.

In view of the bleeding resistance in storage, compounds having a weight-average molecular weight of from 500 to 100,000 are preferred for the organic mordant for use herein.

In the case where a mordant is in the basic solution (coating liquid B) having pH of at least 7.1, the mordant preferably contains at least one cationic polymer having a primary, secondary or tertiary amino group. Examples of the cationic polymer having a primary amino group are polyallylamine and its derivatives. The derivatives include, for example, salts of polyallylamine with acid (in which the acid includes inorganic acids such as hydrochloric acid, sulfuric acid, phosphoric acid and nitric acid, organic acids such as methanesulfonic acid, toluenesulfonic acid, acetic acid, propionic acid, cinnamic acid, (meth)acrylic acid, and their combinations; and only a part of allylamine may be converted into its salt), derivatives produced through polymer reaction of polyallylamine, and copolymers of polyallylamine with any other copolymerizable monomer (examples of the monomer are (meth)acrylates, styrenes, (meth)acrylamides, acrylonitrile and vinyl esters).

Examples of polyallylamine and its derivatives are described in JP-B 62-31722, 2-14364, 63-43402, 63-43403, 63-45721, 63-29881, 1-26362, 2-56365, 2-57084, 4-41686, 6-2780, 6-45649, 6-15592, 4-68622; Japanese Patents 3,199,227, 3,008,369; JP-A 10-330427, 11-21321, 2000-281728, 2001-106736, 62-256801, 7-173286, 7-213897, 9-235318, 9-302026, 11-21321; WO99/21901, WO99/19372; JP-A 5-140213; and JP-T 11-506488.

An inorganic mordant may be used herein, and it includes polyvalent water-soluble metal salt and hydrophobic metal salt compounds.

Examples of the inorganic mordant are salts and complexes with a metal selected from magnesium, aluminium, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten and bismuth.

Concretely, for example, they are calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupric chloride, copper(II)ammonium chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidosulfate tetrahydrate, aluminium sulfate, aluminium alum, aluminium chloro hydrate, aluminium sulfite, aluminium thiosulfate, aluminium sesquichloro hydrate, aluminium nitrate 9-hydrate, aluminium chloride hexahydrate, basic aluminium lactate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium acetylacetonate, zirconyl acetate, zirconyl sulfate, ammonium zirconium carbonate, zirconyl lactate, zirconyl succinate, zirconyl oxalate, zirconyl stearate, zirconyl octylate, zirconyl nitrate, ammonium zirconium acetate, potassium zirconium carbonate, sodium zirconium lactate, basic zirconium glycinate, basic aluminium sulfate, basic aluminium nitrate, basic aluminium sulfamate, basic aluminium formate, basic aluminium acetate, basic aluminium glycinate, zirconium oxychloride, zirconium hydroxychloride, chromium acetate, chromium sulfate, magnesium sulfate, magnesium chloride hexahydrate, magnesium citrate 9-hydrate, sodium phosphotungstate, sodium tungsten citrate, 12-tungstophosphoric acid n-hydrate, 12-tungstosilicic acid 26-hydrate, molybdenum chloride, 12-molybdophosphoric acid n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride, bismuth nitrate, etc.

For the inorganic mordant used in the invention, preferred are aluminium-containing compounds, titanium-containing compounds, zirconium-containing compounds, and metal compounds (salts or complexes) of the Group IIIB series of the Periodic Table of Elements.

The amount of the mordant that may be in the colorant-receiving layer in the invention is preferably from 0.01 g/m$^2$ to 5 g/m$^2$, more preferably from 0.1 g/m$^2$ to 3 g/m$^2$.

(Other Components)

For the optional components that may be in the inkjet recording sheet in the second aspect of the invention, referred to are those described hereinabove in the section of the first aspect of the invention.

(Support)

For the support for use in the second aspect of the invention, referred to are those described hereinabove in the section of the first aspect of the invention.

(Fabrication of Inkjet Recording Sheet)

In the invention, the colorant-receiving layer may be formed on the inkjet recording sheet in any known coating method, not specifically defined. For it, for example, usable is any of an extrusion die coater, an air doctor coater, a blade coater, a rod coater, a knife coater, a squeeze coater, a reverse roll coater or a bar coater. One or more colorant-receiving layers may be formed on the support, having a single-layered or multi-layered structure. In addition, the sheet may additionally have an ink solvent absorbent layer, an interlayer, a protective layer and others. In the invention, the inorganic mordant may be in every colorant-receiving layer or around the ink-receiving face of the sheet.

Specifically, it is desirable that the colorant-receiving layer is formed by applying a first coating liquid (hereinafter this will be referred to as "coating liquid (A2)") that contains at least particles and a water-soluble resin, onto a support, applying a second coating liquid (hereinafter this will be referred to as "coating liquid (B2)") that contains at least a mordant and has a pH of 7.1 or more, onto the coating layer either (1) simultaneously with the coating or (2) while the coating layer formed is dried but before it exhibits a falling rate of drying, and crosslinking and curing the coating layer having the second coating liquid applied thereonto (wet-on-wet method). In the method, the inorganic mordant to be in the colorant-receiving layer in the invention is preferably in at least either of the coating liquid (A2) or the coating liquid (B2). It is more preferably in the coating liquid (A2). Also preferably, a crosslinking agent for crosslinking the water-soluble resin is at least in either of the coating liquid (A2) or the coating liquid (B2). The pH of the coating liquid (B2) is preferably at least 7.5 and more preferably at least 8.

Forming the crosslinked and cured, colorant-receiving layer in the sheet is preferred in view of the ink absorbability and the cracking resistance of the layer.

In the invention, the coating liquid (A2) for forming the colorant-receiving layer that contains at least particles (for example, fumed alumina) and a water-soluble resin (e.g., polyvinyl alcohol) may be prepared, for example, as follows.

Particles of fumed alumina and a dispersant are added to water (for example, alumina particles in water account for from 10 to 20% by weight), dispersed therein with a high-revolution wet colloid mill (e.g., M Technic's CLEARMIX), under a high revolution condition, for example, at 10,000 rpm (preferably from 5,000 to 20,000 rpm) for 20 minutes (preferably from 10 to 30 minutes), then a crosslinking agent (boron compound) and an aqueous polyvinyl alcohol (PVA) solution are added thereto (for example, so that the amount of PVA added may be around ⅓ by weight of the fumed alumina), and when the coating liquid for the colorant-receiving layer shall contain an inorganic mordant, the mordant is added to it, and this is dispersed under the same revolution condition as previously to prepare the intended coating liquid for the colorant-receiving layer. Thus prepared, the coating liquid is in the form of a uniform sol, and this is applied onto a support according to the coating method mentioned below, and dried to form thereon the intended, porous colorant-receiving layer having a three-dimensional network structure.

For preparing the aqueous dispersion of the above-mentioned fumed alumina and dispersant, an aqueous dispersion of the fumed alumina is first prepared, and the resulting aqueous dispersion may be added to an aqueous solution of dispersant, or an aqueous solution of dispersant may be added to the aqueous dispersion of fumed alumina, or they may be mixed all at a time. If desired, not the aqueous dispersion of fumed alumina but the powdery fumed alumina itself may be directly added to an aqueous solution of dispersant.

After the fumed alumina and the dispersant have been mixed, the resulting mixture is further dispersed by using a disperser to obtain an aqueous dispersion having a mean particle size of from 50 to 300 nm. For obtaining the aqueous dispersion, various conventional dispersing machines such as high-revolution dispersers, medium-assisted stirring dispersers (e.g., ball mills, sand mills), ultrasonic dispersers, colloid mill dispersers and high-pressure dispersers may be used. In the invention, for efficiently dispersing lumps of particles that may be formed, stirring dispersers, colloid mill dispersers or high-pressure dispersers are preferably used.

For the details of the solvent in each step, the dispersant, the amount of the dispersant relative to particles, the calendering treatment of the colorant-receiving layer, the thickness of the colorant-receiving layer, the pore size of the colorant-receiving layer, the transparency of the colorant-receiving layer, the dispersion of polymer particles optionally added to the constitutive layers of the inkjet recording sheet and the method of fabricating the inkjet recording sheet in the second aspect of the invention, referred to are those described hereinabove in the section of the first aspect of the invention.

<Inkjet Recording Method>

For the modes of the inkjet recording method of the second aspect of the invention, referred to are those described hereinabove in the section of the first aspect of the invention.

Next described is the third aspect of the invention.

<Inkjet Recording Ink>

The inkjet recording ink for use in the third aspect of the invention is the same as that for use in the first aspect thereof described hereinabove.

<Inkjet Recording Sheet>

The inkjet recording sheet in this aspect has a colorant-receiving layer at least on a support, and the colorant-receiving layer contains a cationic polymer having at least any one of primary, secondary or tertiary amino groups.

The cationic polymer having any of primary, secondary or tertiary amino groups is preferably a compound having a weight-average molecular weight of from 500 to 100,000 in view of its ability to improve the ink absorbability of the colorant-receiving layer.

The cationic polymer having any of primary, secondary or tertiary amino groups includes, for example, polyethylenimine, polyvinylamine, polyallylamine, chitosan, amino group-having (meth)acrylate or acrylamide polymers (e.g., poly(dialkylaminoethyl (meth)acrylates), poly(dialkylaminoethyl(meth) acrylamides), poly(dialkylaminopropyl (meth) acrylates), poly(dialkylaminopropyl(meth) acrylamides)) and their derivatives and copolymers with any other copolymerizable monomer (for example, (meth)acrylates (e.g., methyl acrylate, methyl methacrylate, ethyl methacrylate, butyl methacrylate, hydroxyethyl methacrylate, 2-ethylhexyl methacrylate, stearyl methacrylate, trimethyl-2-methacryloyloxyammonium chloride, N,N-dimethyl-N-vinylbenzylammonium chloride), and (meth)acrylamides (e.g., acrylamide, methacrylamide, N-methylmethacrylamide, butylacrylamide, t-butylacrylamide), N-vinylimidazole, N-vinylpyridine, N-vinylpyrrolidone, cyanoacrylates). Of those, especially preferred for use herein are polyvinylamine, polyallylamine and their derivatives.

Polyallylamine for use herein is a polymer prepared through polymerization of monoallylamine (including its salts).

The polyallylamine and its derivatives for use herein may be any known ones. The derivatives include, for example, salts of polyallylamine with acid (in which the acid includes inorganic acids such as hydrochloric acid, sulfuric acid, phosphoric acid and nitric acid, organic acids such as methanesulfonic acid, toluenesulfonic acid, acetic acid, propionic acid, cinnamic acid, (meth)acrylic acid, and their combinations; and only a part of allylamine may be converted into its salt), derivatives produced through polymer reaction of polyallylamine, and copolymers of polyallylamine with any other copolymerizable monomer (examples of the monomer are (meth)acrylates, styrenes, (meth)acrylamides, acrylonitrile and vinyl esters).

Examples of polyallylamine and its derivatives are described in JP-B 62-31722, 2-14364, 63-43402, 63-43403, 63-45721, 63-29881, 1-26362, 2-56365, 2-57084, 4-41686, 6-2780, 6-45649, 6-15592, 4-68622; Japanese Patents 3,199, 227, 3,008,369; JP-A 10-330427, 11-21321, 2000-281728, 2001-106736, 62-256801, 7-173286, 7-213897, 9-235318, 9-302026, 11-21321; WO99/21901, WO99/19372; JP-A 5-140213; and JP-T 11-506488.

The polyvinylamine and its derivatives for use herein may be any known ones. For the derivatives of polyvinylamine, referred to are the derivatives of polyallylamine mentioned hereinabove.

Examples of polyvinylamine and its derivatives are described in JP-B 5-35162, 5-35163, 5-35164, 5-88846; JP-A 7-118333, 2000-344990; and Japanese Patents 2,648, 847, 2,661,677.

For the cationic polymer having any of primary, secondary or tertiary amino groups for use herein, especially preferred are polyallylamine and its derivatives.

(Water-Soluble Resin)

Preferably, the colorant-receiving layer of the inkjet recording sheet in the invention contains a water-soluble resin.

For the details of the water-soluble resin, referred to are those described hereinabove in the section of the first aspect of the invention.

Above all, polyvinyl alcohol resin is preferred for the water-soluble resin. For the details of the polyvinyl alcohol resin, referred to are those described hereinabove in the section of the first aspect of the invention.

Examples of other water-soluble resins than polyvinyl alcohol resins that are also usable herein are the compounds described in JP-A 2001-205919, 2002-264489, and paragraphs [0011] to [0014] of JP-A 11-165461.

One or more of these water-soluble resin may be used herein either singly or as combined.

Preferably, the water-soluble resin content of the colorant-receiving layer in the invention is from 9 to 40% by weight, more preferably from 12 to 33% by weight of the total solid content of the layer.

(Particles)

For the particles for use in the third aspect of the invention, referred to are those described hereinabove in the section of the first aspect of the invention.

(Content Ratio of Particles to Water-Soluble Resin)

For the details of the content ratio of the particles to the water-soluble resin in the third aspect of the invention, referred to are those described hereinabove in the section of the first aspect of the invention.

(Crosslinking Agent).

For the crosslinking agent for use in the third aspect of the invention, referred to are those described hereinabove in the section of the first aspect of the invention.

(Mordant)

In the colorant-receiving layer in the invention, the cationic polymer that has at least any one of primary, secondary or tertiary amino groups may be combined with a polymer having a quaternary ammonium salt group except the cationic polymer that has at least any of primary, secondary or tertiary amino group or with an inorganic mordant, for improving the waterproofness and the bleeding resistance in storage of the images formed therein.

One of the organic mordants and inorganic mordants may be used singly herein, or the two, organic and inorganic mordants may be combined.

In the case where the cationic polymer that has at least any one of primary, secondary or tertiary amino groups is combined with any other mordant in the invention, the blend ratio may be determined depending on the balance of the storability and the bleeding resistance of the layer. Preferably, the ratio of the cationic polymer that has at least any one of primary, secondary or tertiary amino groups is at least 10%, more preferably at least 20% of the combined mordant.

The mordant may be added to the coating liquid A that contains particles and a water-soluble resin. However, if it may interact with the particles, the mordant may be added to the coating liquid B.

The examples a polymer having a quaternary ammonium salt group to be used with the cationic polymer are as per described in the section of the first aspect of the invention.

The examples of the inorganic mordant are as per described in the section of the first aspect of the invention.

(Other Components)

For the other components that are optionally in the inkjet recording sheet in the third aspect of the invention, referred to are those described hereinabove in the section of the first aspect of the invention.

(Support)

For the details of the support for use in the third aspect of the invention, referred to are those described hereinabove in the section of the first aspect of the invention.

(Fabrication of Inkjet Recording Sheet)

Preferably, the colorant-receiving layer in the inkjet recording sheet in the invention is formed by applying a first coating liquid (hereinafter this will be referred to as "coating liquid (A3)") that contains at least particles and a water-soluble resin, onto a support, applying a second coating liquid (hereinafter this will be referred to as "coating liquid (B3)") that contains at least a mordant and has a pH of 7.1 or more, onto the coating layer either (1) simultaneously with the coating or (2) while the formed coating layer is dried before it exhibits a falling rate of drying, and crosslinking and curing the coating layer having the second coating liquid applied thereonto (wet-on-wet method). The pH of coating liquid (B3) is preferably at least 7.5 and more preferably at least 8. In the method, the cationic polymer that has either any of primary, secondary or tertiary amino groups in the invention is preferably in at least either of the coating liquid (A3) or the coating liquid (B3). More preferably, the cationic polymer that has at least any of primary, secondary or tertiary amino groups is in the coating liquid (B3). Also preferably, a crosslinking agent for crosslinking the water-soluble resin is also in at least either of the coating liquid (A3) or the coating liquid (B3).

Formation of thus the crosslinked and cured, colorant-receiving layer in the sheet is preferred in view of the ink absorbability and the cracking resistance of the layer.

The above-mentioned embodiment is preferred since much mordant may be around the surface of the colorant-receiving layer and the inkjet colorant may be fully mordanted by it to improve the waterproofness of the printed letters and images printed. A part of the mordant may also be in the coating liquid (A3). In this case, the mordant to be in the coating liquid (A3) and that to be in the coating liquid (B3) may be the same or different.

In the invention, the coating liquid (A3) for forming the colorant-receiving layer that contains at least particles (for example, fumed silica) and a water-soluble resin (e.g., polyvinyl alcohol) may be prepared, for example, as follows.

Particles of fumed silica and a dispersant are added to water (for example, silica particles in water account for from 10 to 20% by weight), dispersed therein with a high-revolution wet colloid mill (e.g., M Technic's CLEAMIX), under a high revolution condition, for example, at 10,000 rpm (preferably from 5,000 to 20,000 rpm) for 20 minutes (preferably from 10 to 30 minutes), then a crosslinking agent (boron compound) and an aqueous polyvinyl alcohol (PVA) solution are added thereto (for example, so that the amount of PVA added may be around ⅓ by weight of the fumed silica), and this is dispersed under the same revolution condition as previously to prepare the intended coating liquid for the colorant-receiving layer. Thus prepared, the coating liquid is in the form of a uniform sol, and this is applied onto a support according to the coating method mentioned below, and dried to form thereon the intended, porous colorant-receiving layer having a three-dimensional network structure.

For preparing the aqueous dispersion of the above-mentioned fumed silica and dispersant, an aqueous dispersion of the fumed silica is first prepared, and the resulting aqueous dispersion may be added to an aqueous solution of dispersant, or an aqueous solution of dispersant may be added to the aqueous dispersion of fumed silica, or they may be mixed all at a time. If desired, not the aqueous dispersion of fumed silica but the powdery fumed silica itself may be directly added to an aqueous solution of dispersant.

After the fumed silica and the dispersant have been mixed, the resulting mixture is further dispersed by using a disperser to obtain an aqueous dispersion having a mean particle size of from 50 to 300 nm. For obtaining the aqueous dispersion, various conventional dispersing machines such as high-revolution dispersers, medium-assisted stirring dispersers (e.g., ball mills, sand mills), ultrasonic dispersers, colloid mill dispersers and high-pressure dispersers may be used. In the invention, for efficiently dispersing lumps of particles that may be formed, stirring dispersers, colloid mill dispersers or high-pressure dispersers are preferably used.

The solvent in each step may be any of water, organic solvents or their mixed solvents. The organic solvents usable for the coating operation are, for example, alcohols such as methanol, ethanol, n-propanol, i-propanol, methoxypropanol; ketones such as acetone, methyl ethyl ketone; and tetrahydrofuran, acetonitrile, ethyl acetate, toluene, etc.

For the dispersant, usable are cationic polymers. The cationic polymers are, for example, those mentioned hereinabove for the mordant. For the dispersant, also preferred are silane coupling agents.

The amount of the dispersant is preferably from 0.1% to 30%, more preferably from 1% to 10% of the particles.

The coating liquid for the colorant-receiving layer may be applied onto the support in any known method. For it, for example, usable is any of an extrusion die coater, an air doctor coater, a blade coater, a rod coater, a knife coater, a squeeze coater, a reverse roll coater or a bar coater.

While the colorant-receiving layer coating liquid (A3) is applied onto the support or after it has been applied thereon, the coating liquid (B3) is applied to the coating layer. The coating liquid (B3) may be applied thereto before the coating layer exhibits a falling rate of drying. In other words, after the colorant-receiving layer coating liquid (A3) has been applied onto the support, a mordant is introduced into the coating layer while the coating layer shows a constant rate of drying, and the intended colorant-receiving layer is favorably formed.

"Before the coating layer exhibits a falling rate of drying" in the method is generally a period of a few minutes just after the coating of the coating liquid on the colorant-receiving layer. Within this period, the formed coating layer shows a constant rate of drying, namely, the solvent (dispersion medium) content of the coating layer decreases in proportion to time. The period in which a constant rate of drying is shown is described, for example, in *Handbook of Chemical Engineering* (pp. 707–712, by Maruzen Publishing, Oct. 25, 1980).

As mentioned above, after the first coating liquid has been applied onto the support, it is dried until it exhibits a falling rate of drying. In general, the layer is dried at 50 to 180° C. for 0.5 to 10 minutes (preferably for 0.5 to 5 minutes). Naturally varying depending on the amount of the coating liquid applied to the support, the range as above is suitable for the drying time.

For applying the second coating liquid to the first coating layer before the first coating layer exhibits a falling rate of drying, for example, (1) the coating layer is further coated with the coating liquid (B3); (2) the coating liquid (B3) is sprayed on the layer; or (3) the support coated with the coating layer is dipped in the coating liquid (B3).

For the method (1) of further coating the coating layer with the coating liquid (B3), for example, any known coating method of using a curtain flow coater, an extrusion die coater, an air doctor coater, a blade coater, a rod coater, a knife coater, a squeeze coater, a reverse roll coater or a bar coater may be utilized. However, it is desirable to utilize a method of using an extrusion die coater, a curtain flow coater or a bar coater in which the coater is not brought into direct contact with the already-formed first coating layer.

After the mordant solution (coating liquid (B3)) has been applied thereto, the coating layer is heated generally at 40 to 180° C. for 0.5 to 30 minutes, and is thus dried and cured. Preferably, it is heated at 40 to 150° C. for 1 to 20 minutes.

In the case where the mordant solution (coating liquid (B3)) is applied to the support at the same time that the colorant-receiving layer coating liquid (coating liquid (A3)) is applied thereto, the two may be simultaneously applied to the support (in a mode of double-layer coating) so that the colorant-receiving layer coating liquid (coating liquid (A3)) is just above the support, and then the coating layer is dried and cured to be the intended colorant-receiving layer.

The simultaneous coating (double-layer coating) may be effected, for example, according to a coating method using an extrusion die coater or a curtain flow coater. After the simultaneous coating, the coating layer formed is dried. In this case, the coating layer is heated and dried generally at 40 to 150° C. for 0.5 to 10 minutes. Preferably, it is heated and dried at 40 to 100° C. for 0.5 to 5 minutes.

In the case where the simultaneous coating (double-layer coating) is effected, using an extrusion die coater, the two coating liquids jetted out through the die at the same time are layered at around the outlet of the extrusion die coater, namely, before they reach the support, and they are layered on the support in that condition. The coating liquids thus layered before they reach the support are readily crosslinked at the interface between the two liquids when they reach the support, and the two liquids are mixed at around the outlet of the extrusion die coater and are often thickened to interfere with the coating operation. Therefore, in the simultaneous coating method as above, it is desirable that a barrier layer coating liquid (interlayer coating liquid) is made to exist between the colorant-receiving layer coating liquid (coating liquid (A3)) and the mordant solution (coating liquid (B3)) to form three layers at the same time.

The barrier layer coating liquid is not specifically defined. For example, it may be an aqueous solution containing a minor water-soluble resin, or water. The water-soluble resin serves as a tackifier and is selected in consideration of its coatability. For it, for example, polymers such as cellulosic resins (e.g., hydroxypropylmethyl cellulose, methyl cellulose, hydroxyethylmethyl cellulose), polyvinylpyrrolidone and gelatin are usable. Incidentally, the above-mentioned mordant may be added to the barrier layer coating liquid.

For the details of the calendering treatment of the colorant-receiving layer, the thickness of the colorant-receiving layer, the pore size of the colorant-receiving layer, the transparency of the colorant-receiving layer, the dispersion of polymer particles optionally added to the constitutive layers of the inkjet recording sheet and the method of fabricating the inkjet recording sheet in the third aspect of the invention, referred to are those described hereinabove in the section of the first aspect of the invention.

<Inkjet Recording Method>

For the modes of the inkjet recording method of the third aspect of the invention, referred to are those described hereinabove in the section of the first aspect of the invention.

Next described is the fourth aspect of the invention.

<Inkjet Recording Ink>

The inkjet recording ink for use in the fourth aspect of the invention is the same as that for use in the first aspect thereof described hereinabove.

<Inkjet Recording Sheet>

(Composition of Inkjet Recording Sheet)

The inkjet recording sheet in this aspect has a colorant-receiving layer on a support, and the colorant-receiving layer contains a quaternary ammonium salt cationic polymer having at least one aromatic group in a partial structure thereof.

Depending on the mordant to be combined with it, dye may often too much aggregate to undesirably lower the density of the image formed of it. Basically the same shall apply to any and every dye of high fastness having a specific oxidation potential. In the invention, a specific dye is combined with a specific cationic polymer, or that is, a quaternary ammonium salt cationic polymer having an aromatic group in its partial structure in the colorant-receiving layer in the inkjet recording sheet, and the layer gives a color image of high density with the dye therein still having good fastness.

Regarding the type of the aromatic group therein, the quaternary ammonium salt cationic polymer used in the invention preferably has any of phenyl, phenylene, naphthyl or naphthylene group in its partial structure, more preferably a phenyl or phenylene group therein.

As the starting materials for it are readily available, the quaternary ammonium salt cationic polymer that has an aromatic group in its partial structure used in the invention preferably has an aryl group-substituted alkylene group in its partial structure. More preferably, it has a benzyl bond, a phenethyl bond, a cinnamyl bond or a diphenylmethyl bond in its partial structure, even more preferably a benzyl bond therein.

Concretely, the quaternary ammonium salt cationic polymer that has an aromatic group in its partial structure used in the invention preferably has at least one unit represented by the following general formulae (III) to (V):

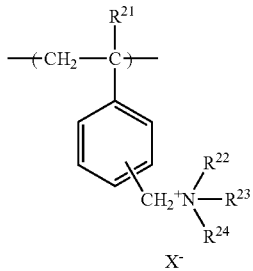

General Formula (III)

In general formula (III), $R^{21}$ represents a hydrogen atom or an alkyl group having from 1 to 4 carbon atoms; $R^{22}$ to $R^{24}$ each independently represent an aliphatic group or an aromatic group; and $X^-$ represents an anionic group.

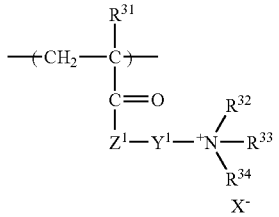

General Formula (IV)

In general formula (IV), $R^{31}$ represents a hydrogen atom or an alkyl group having from 1 to 4 carbon atoms; $R^{32}$ represents an aromatic group or an aromatic group-substituted alkyl group; $R^{33}$ and $R^{34}$ each independently represent an aliphatic group or an aromatic group; $Z^1$ represents —O— or —NH—; $Y^1$ represents a divalent linking group; and $X^-$ represents an anionic group.

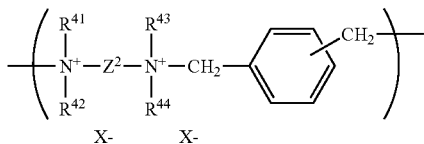

General Formula (V)

In general formula (V), $R^{41}$ to $R^{44}$ each independently represent a hydrogen atom or an aliphatic group; $Z^2$ represents a divalent linking group; $X^-$ represents an anionic group; and $R^{41}$ and $R^{43}$, or $R^{42}$ and $R^{44}$ may bond to each other to form an alkylene group. The alkylene group preferably has from 1 to 10 carbon atoms, more preferably from 2 to 4 carbon atoms.

The aliphatic group for $R^{22}$ to $R^{24}$, $R^{33}$, $R^{34}$, and $R^{41}$ to $R^{44}$ includes, for example, an alkyl group, an alkenyl group, an alkynyl group, and an aralkyl group. These groups may be further substituted. Of those, preferred are an alkyl group, a substituted alkyl group, an alkenyl group, a substituted alkenyl group, an aralkyl group, and a substituted aralkyl group; and more preferred are an alkyl group and a substituted alkyl group.

The aliphatic group may be linear or cyclic, and the linear aliphatic group may be branched.

The alkyl group includes linear, branched and cyclic alkyl groups, preferably having from 1 to 30 carbon atoms, more preferably from 1 to 20 carbon atoms. The preferred range of the number of the carbon atoms to form the alkyl group may apply to the alkyl moiety of the substituted alkyl group.

Examples of the alkyl group are methyl, ethyl, propyl, butyl, pentyl, hexyl, octyl, 2-ethylhexyl, t-octyl, decyl, dodecyl, octadecyl, cyclohexyl, cyclopentyl, neopentyl, isopropyl and isobutyl groups.

Substituents of the substituted alkyl group include a carboxyl group, a sulfo group, a cyano group, a halogen atom (e.g., fluorine atom, chlorine atom, bromine atom), a hydroxyl group, an alkoxycarbonyl group having at most 30 carbon atoms (e.g., methoxycarbonyl group, ethoxycarbonyl group, benzyloxycarbonyl group), an aryloxycarbonyl group having at most 30 carbon atoms (e.g., phenoxycarbonyl group), an alkylsulfonylaminocarbonyl group having at most 30 carbon atoms (e.g., methylsulfonylaminocarbonyl group, octylsulfonylaminocarbonyl group), an arylsulfoylaminocarbonyl group (e.g., toluenesulfonylaminocarbonyl group), an acylaminosulfonyl group having at most 30 carbon atoms (e.g., benzoylaminosulfonyl group, acetylaminosulfonyl group, pivaloylaminosulfonyl group), an alkoxy group having at most 30 carbon atoms (e.g., methoxy group, ethoxy group, benzyloxy group, phenoxyethoxy group, phenethyloxy group), an arylthio group having at most 30 carbon atoms, an alkylthio group (e.g., phenylthio group, methylthio group, ethylthio group, dodecylthio group), an aryloxy group having at most 30 carbon atoms (e.g., phenoxy group, p-tolyloxy group, 1-naphthoxy group, 2-naphthoxy group), a nitro group, an alkyl group having at most 30 carbon atoms, an alkoxycarbonyloxy group (e.g., methoxycarbonyloxy group, stearyloxycarbonyloxy group, phenoxyethoxycarbonyloxy group), an aryloxycarbonyloxy group (e.g., phenoxycarbonyloxy group, chlorophenoxycarbonyloxy group), an acyloxy group having at most 30 carbon atoms (e.g., acetyloxy group, propionyloxy group), an acyl group having at most 30 carbon atoms (e.g., acetyl group, propionyl group, benzoyl group), a carbamoyl group (e.g., carbamoyl group, N,N-dimethylcarbamoyl group, morpholinocarbonyl group, piperidinocarbonyl group), a sulfamoyl group (e.g., sulfamoyl group, N,N-dimethylsulfamoyl group, morpholinosulfonyl group, piperidinosulfonyl group), an alkylsulfonyl group having at most 30 carbon atoms (e.g., methylsulfonyl group, trifluoromethylsulfonyl group, ethylsulfonyl group, butylsulfonyl group, dodecylsulfonyl group), an arylsulfonyl group (e.g., benzenesulfonyl group, toluenesulfonyl group, naphthalenesulfonyl group, pyridinesulfonyl group, quinolinesulfonyl group), an aryl group having at most 30 carbon atoms (e.g., phenyl group, dichlorophenyl group, toluyl group, methoxyphenyl group, diethylaminophenyl group, acetylaminophenyl group, methoxycarbonylphenyl group, hydroxyphenyl group, t-octylphenyl group, naphthyl group), a substituted amino group (e.g., amino group, alkylamino group, dialkylamino group, arylamino group, diarylamino group, acylamino group), a substituted phosphono group (e.g., phosphono group, diethylphosphono group, diphenylphosphono group), a heterocyclic group (e.g., pyridyl group, quinolyl group, furyl group, thienyl group, tetrahydrofuryl group, pyrazolyl group, isoxazolyl group, isothiazolyl group, imidazolyl group, oxazolyl group, thiazolyl group, pyridazyl group, pyrimidyl group, pyrazyl group, triazolyl group, tetrazolyl group, benzoxazolyl group, benzimidazolyl group, isoquinolyl group, thiadiazolyl group, morpholino group, piperidino group, piperazino group, indolyl group, isoindolyl group, thiomorpholino group), an ureido group (e.g., methylureido group, dimethylureido group, phenylureido group), a sulfamoylamino group (e.g., dipropylsulfamoylamino group), an alkoxycarbonylamino group (e.g., ethoxycarbonylamino group), an aryloxycarbonylamino group (e.g., phenyloxycarbonylamino group), an alkylsulfinyl group (e.g., methylsulfinyl group), an arylsulfinyl group (e.g., phenylsulfinyl group), a silyl group (e.g., trimethoxysilyl group, triethoxysilyl group), a silyloxy group (e.g., trimethylsilyloxy group), etc.

The above-mentioned carboxyl group, sulfo group, hydroxyl group and phosphono group may form salts. For the cation to form the salts, preferred are organic cationic compounds, transition metal-coordinated complex cations (e.g., compounds described in Japanese Patent 2,791,143) or metal cations (e.g., $Na^+$, $K^+$, $Li^+$, $Ag^+$, $Fe^{2+}$, $Fe^{3+}$, $Cu^+$, $Cu^{2+}$, $Zn^{2+}$, $Al^{3+}$, $½Ca^{2+}$).

The organic cationic compounds include, for example, quaternary ammonium cations, quaternary pyridinium cations, quaternary quinolinium cations, phosphonium cations, iodonium cations and sulfonium cations.

The alkenyl group includes linear, branched and cyclic alkenyl groups, preferably having from 2 to 30 carbon atoms, more preferably from 2 to 20 carbon atoms. The preferred range of the number of the carbon atoms to form the alkenyl group may apply to the alkenyl moiety of the substituted alkenyl group.

Examples of the alkenyl group are vinyl group, allyl group, prenyl group, geranyl group, oleyl group, cycloalkenyl group (e.g., 2-cyclopenten-1-yl group, 2-cyclohexen-1-yl group), bicyclo[2,2,1]hept-2-en-1-yl group, bicyclo[2,2,2]oct-2-en-4-yl group.

For the substituents of the substituted alkenyl group, referred to are the same as those mentioned hereinabove for the substituted alkyl group.

The alkynyl group includes linear, branched and cyclic alkynyl groups, preferably having from 2 to 30 carbon atoms, more preferably from 2 to 20 carbon atoms. The preferred range of the number of the carbon atoms to form the alkynyl group may apply to the alkynyl moiety of the substituted alkynyl group.

Examples of the alkynyl group are ethynyl group, propargyl group, trimethylsilylethynyl group, etc.

For the substituents of the substituted alkynyl group, referred to are the same as those mentioned hereinabove for the substituted alkyl group.

The aralkyl group includes linear, branched and cyclic aralkyl groups, preferably having from 7 to 35 carbon atoms, more preferably from 7 to 25 carbon atoms. The preferred range of the number of the carbon atoms to form the aralkyl group may apply to the aralkyl moiety of the substituted aralkyl group.

Examples of the aralkyl group are benzyl group, phenethyl group, methylbenzyl group, octylbenzyl group, dodecylbenzyl group, hexadecylbenzyl group, dimethylbenzyl group, octyloxybenzyl group, octadecylaminocarbonylbenzyl group, chlorobenzyl group, etc.

For the substituents of the substituted aralkyl group, referred to are the same as those mentioned hereinabove for the substituted alkyl group.

The aromatic group for $R^{22}$ to $R^{24}$, and $R^{32}$ to $R^{34}$ includes, for example, an aryl group and a substituted aryl group. The aryl group preferably has from 6 to 30 carbon atoms, more preferably from 6 to 20 carbon atoms. The preferred range of the number of the carbon atoms to form the aryl group may apply to the aryl moiety of the substituted aryl group.

Examples of the aryl group are phenyl group, α-naphthyl group, β-naphthyl group, etc.

The aromatic group may be substituted. For the substituents of the substituted aromatic group, referred to are the same as those mentioned hereinabove for the substituted alkyl group.

For the aromatic group-substituted alkyl group for $R^{32}$, referred to are the same as those mentioned hereinabove for the aralkyl group for $R^{22}$.

In general formulae (III) to (V), the anionic group for $X^-$ includes, for example, a halide ion (e.g., chloride ion, bromide ion, iodide ion), a sulfonate ion (e.g., benzenesulfonate ion, paratoluenesulfonate ion, methanesulfonate ion, trifluoromethanesulfonate ion), an ethylsulfate ion, a 1,5-disulfonaphthalene dianion, $PF_6^-$, $BF_4^-$ and a perchlorate ion. Especially preferred are a halide ion and a sulfonate ion. $X^-$ may be a substituent that is in any substitutable position of the cation site of formulae (III) to (V), and, in this case, the compounds of formulae (III) to (V) form internal salts.

The divalent linking group for $Y^1$ is preferably at least one atom or atomic group of carbon, nitrogen, sulfur and oxygen atoms. Concretely, its preferred examples are an alkylene group (e.g., methylene, ethylene, propylene, butylene, pentylene), an arylene group (e.g., phenylene, naphthylene), an alkenylene group (e.g., ethenylene, propenylene) and an alkynylene group (e.g., propynylene). These may be repeatedly bonded via an oxygen atom, a sulfur atom or a substituted amino group. The substituents of the divalent group may be further substituted. For the substituents of the substituted divalent group, referred to are the same as those mentioned hereinabove for the substituted alkyl group. More preferably, substituents of the divalent group is an alkylene group having from 1 to 12 carbon atoms, an arylene group having from 6 to 18 carbon atoms, or an alkenylene group having from 2 to 12 carbon atoms.

The divalent linking group for $Z^2$ is preferably at least one atom or atomic group of carbon, nitrogen, sulfur and oxygen atoms. Concretely, its preferred examples are an alkylene group (e.g., methylene, ethylene, propylene, butylene, pentylene), an arylene group (e.g., phenylene, naphthylene), an alkenylene group (e.g., ethenylene, propenylene) and an alkynylene group (e.g., propynylene). These may be repeatedly bonded via an oxygen atom, a sulfur atom or a substituted amino group. The substituents of the divalent group may be further substituted. For the substituents of the substituted divalent group, referred to are the same as those mentioned hereinabove for the substituted alkyl group. More preferably, substituents of the divalent group is an alkylene group having from 1 to 12 carbon atoms, an arylene group having from 6 to 18 carbon atoms, or an alkenylene group having from 2 to 12 carbon atoms.

The polymers having at least one unit of formulae (III) and (IV) may be copolymers with any other ethylenic unsaturated group-having monomer.

The copolymerizable monomer includes, for example, (meth)acrylates (e.g., methyl acrylate, methyl methacrylate, ethyl methacrylate, butyl methacrylate, hydroxyethyl methacrylate, 2-ethylhexyl methacrylate, stearyl methacrylate, trimethyl-2-methacryloyloxyammonium chloride, dimethylaminoethyl methacrylate), (meth)acrylamides (e.g., acrylamide, methacrylamide, N-methylacrylamide, butylacrylamide, t-butylacrylamide), N-vinylimidazole, N-vinylpyridine, N-vinylpyrrolidone and cyanoacrylates.

Preferably, the quaternary ammonium salt cationic polymer used in the invention has at least one unit of formula (III).

Serving as a mordant for dye, the quaternary ammonium salt cationic polymer is in the colorant-receiving layer in the invention. In the case where the colorant-receiving layer contains particles and is porous, the polymer may also serve as a flocculation inhibitor for the particles.

The weight-average molecular weight of the quaternary ammonium salt cationic polymer used in the invention is preferably at most 200,000, more preferably from 1,000 to 100,000 in view of the ink absorbability of the layer that contain the polymer.

Examples of the quaternary ammonium salt cationic polymer used in the invention that contains the unit of formula (III) are (1-1) to (1-12) mentioned below; those of the polymer that contains the unit of formula (IV) are (2-1) to (2-8); and those of the polymer that contains the unit of formula (V) are (3-1) to (3-4).

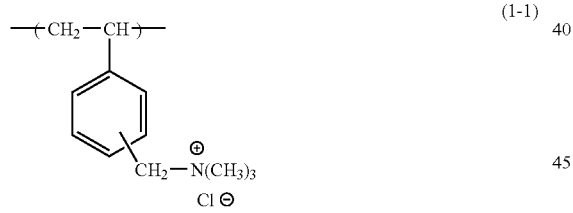

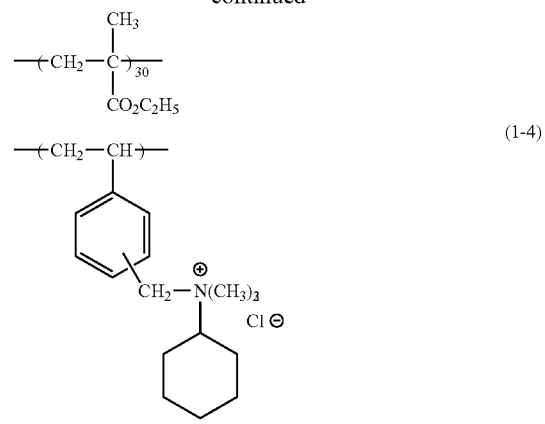

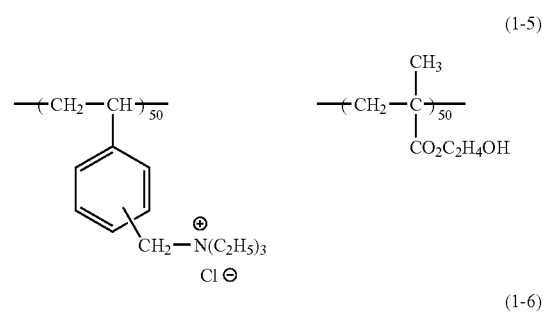

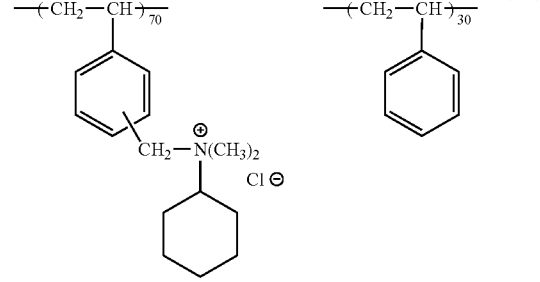

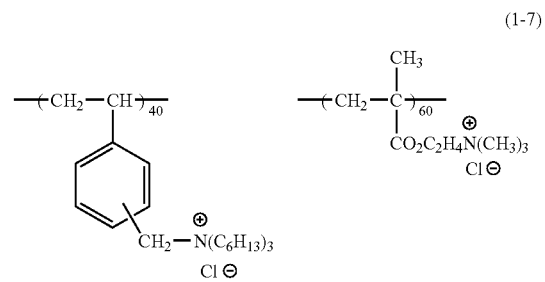

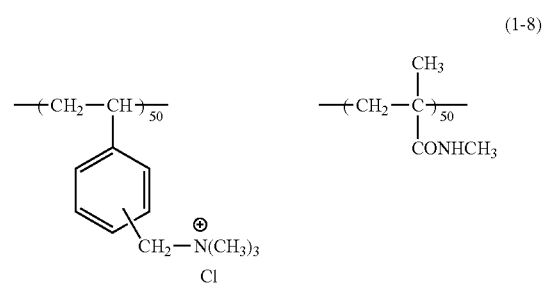

-continued
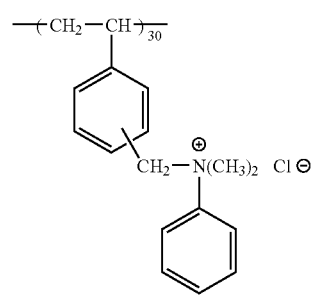 (1-9)
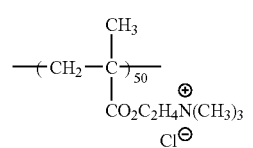
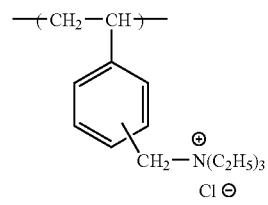 (1-10)
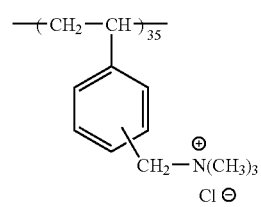 (1-11)
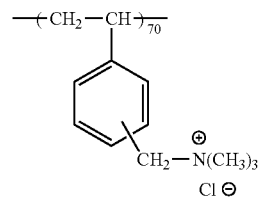 (1-12)
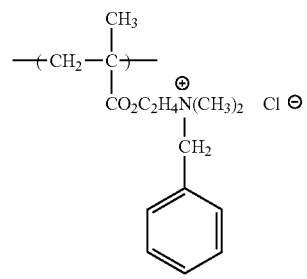 (2-1)
-continued
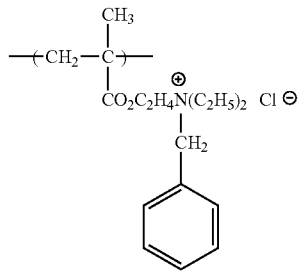 (2-2)
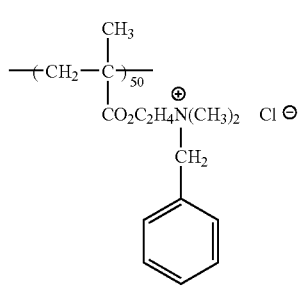 (2-3)
(2-4)
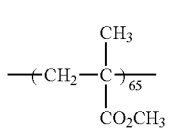
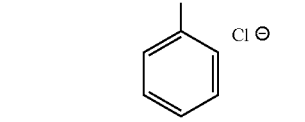
(2-5)
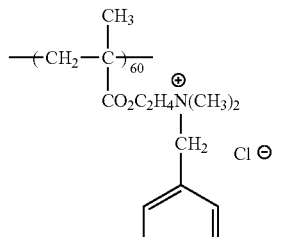
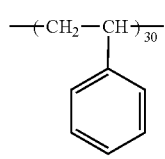
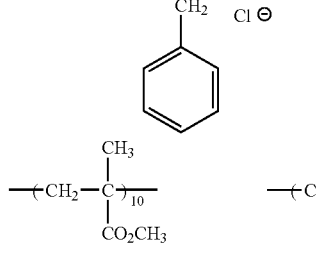
(2-6)
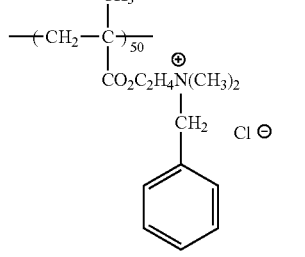

-continued

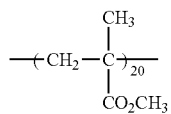

(2-7)

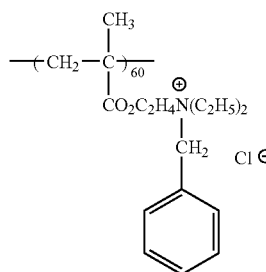

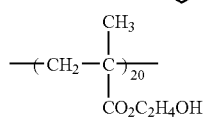

(2-8)

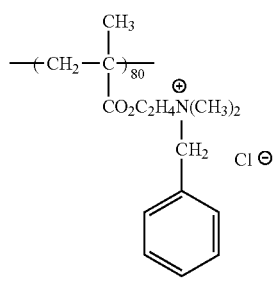

(3-1)

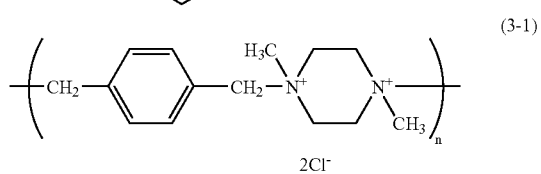

(3-2)

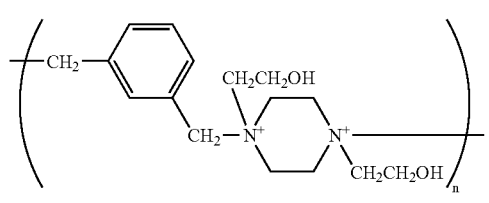

(3-3)

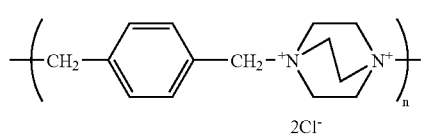

(3-4)

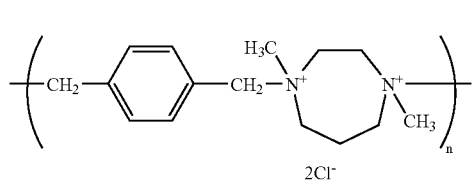

Another embodiment of the quaternary ammonium salt cationic polymer used in the invention, which has at least one aromatic group in its partial structure, has at least one unit represented by the following general formula (VI):

General Formula (VI)

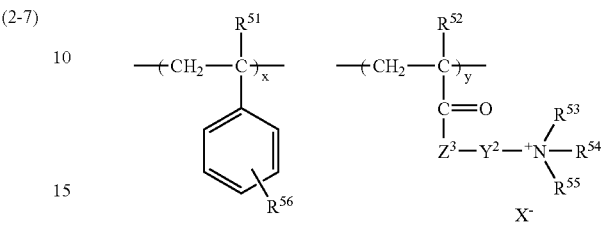

In general formula (VI), $R^{51}$ and $R^{52}$ each represent a hydrogen atom or an alkyl group having from 1 to 4 carbon atoms; $R^{53}$, $R^{54}$ and $R^{55}$ each represent an alkyl group; $Z^3$ has the same meaning as that of $Z^2$ in formula (V); $Y^2$ has the same meaning as that of $Y^1$ in formula (IV); $X^-$ has the same meaning as in formula (III); and x and y each indicate an integer of 1 or more.

In formula (VI), the quaternary ammonium salt site does not have an aromatic group. However, the polymer that has at least one unit of formula (VI) is copolymerized with styrene, and the styrene moiety therein is recognized as the aromatic group of the copolymer.

In formula (VI), x is preferably from 10 to 90, more preferably from 20 to 80 per the total monomer units of 100.

Examples of the compounds of formula (VI) are mentioned below.

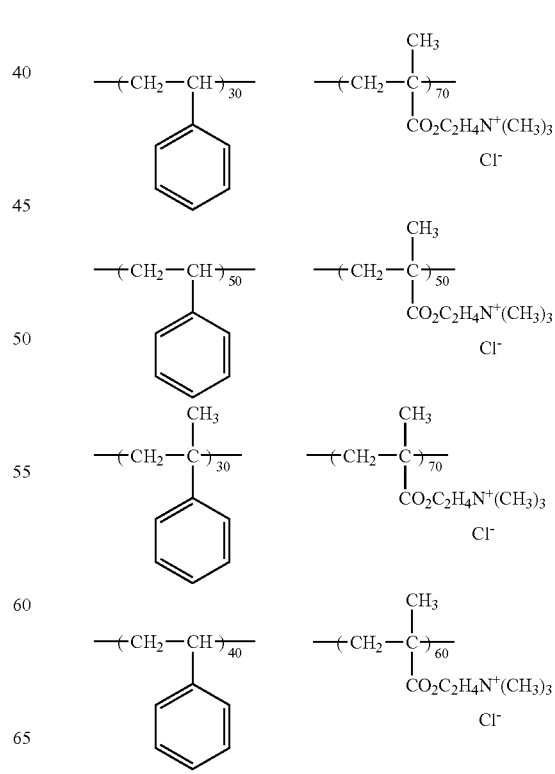

-continued

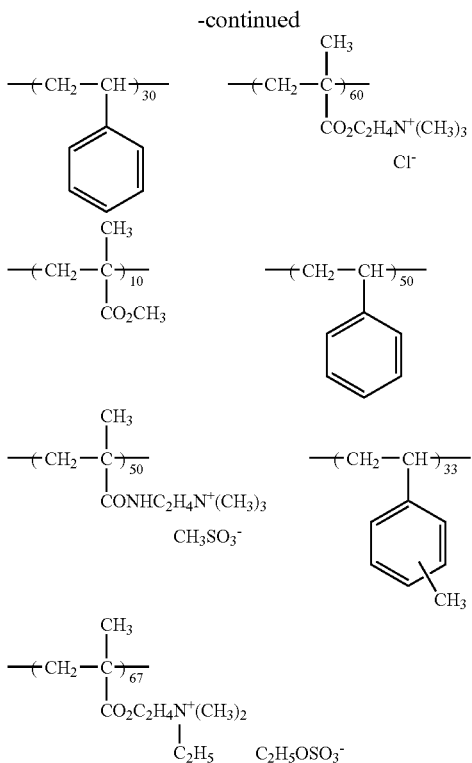

(Water-Soluble Resin)

Preferably, the colorant-receiving layer in the inkjet recording sheet in the intention contains a water-soluble resin.

For the details of the water-soluble resin, referred to are those mentioned hereinabove in the section of the first aspect of the invention.

Above all, polyvinyl alcohol resins are preferred for the water-soluble resin for use herein. For examples of polyvinyl alcohol, referred to are the ones described in the publications mentioned hereinabove in the section of the first aspect of the invention.

Examples of other water-soluble resins than polyvinyl alcohol resins that are also usable herein are the compounds described in JP-A 2001-205919, 2002-264489, and paragraphs [0011] to [0014] of JP-A 11-165461.

One or more of these water-soluble resins may be used herein either singly or as combined.

The water-soluble resin content of the colorant-receiving layer in the invention is preferably from 9 to 40% by weight, more preferably from 12 to 33% by weight of the total solid content of the layer.

(Particles)

For the particles for use in the fourth aspect of the invention, referred to are those described hereinabove in the section of the first aspect of the invention.

(Content Ratio of Particles to Water-Soluble Resin)

For the details of the content ratio of the particles to the water-soluble resin in the fourth aspect of the invention, referred to are those described hereinabove in the section of the first aspect of the invention.

(Crosslinking Agent)

For the crosslinking agent for use in the fourth aspect of the invention, referred to are those described hereinabove in the section of the first aspect of the invention.

(Mordant)

In the invention, the colorant-receiving layer contains a quaternary cationic polymer that has at least one aromatic group in its partial structure. If desired, the cationic polymer may be combined with any other type of cationic polymer than the quaternary cationic polymer that has at least one aromatic group in its partial structure or with an inorganic mordant. In this case, the blend ratio of the compounds may be determined depending on the balance of the image storability (fastness to light and ozone) and the bleeding resistance. Preferably, in the mixture, the blend ratio of the quaternary cationic polymer that has at least one aromatic group in its partial structure is at least 10% by weight, more preferably at least 20% by weight.

Also, the cationic polymer may be combined with those described in the first aspect of the invention, that is, an organic cationic polymer that does not have an aromatic group or an inorganic mordant.

The mordant may be added to the coating liquid A that contains particles and a water-soluble resin. However, in the case where the mordant may react with the particles in the liquid to form aggregates, it may be added to the coating liquid B.

The cationic polymer that may be combined with the quaternary cationic polymer having an aromatic group in its partial structure is, for example, a polymer that has a primary to tertiary amino group or an quaternary ammonium salt group not having an aromatic group in its partial structure.

For the polymer mordant that may be combined with the quaternary cationic polymer, preferred are homopolymers of a monomer having a primary to tertiary amino group or its salt or a quaternary ammonium base not having an aromatic group in its partial structure (mordant monomer), and copolymers or polycondensates of the mordant monomer with any other monomer (hereinafter referred to as "non-mordant monomer"). These polymer mordants may be used in any form of water-soluble polymers or water-dispersible latex particles.

The monomer (mordant monomer) includes, for example, quaternates of N,N-dimethylaminoethyl (meth)acrylate, N,N-diethylaminoethyl (meth)acrylate, N,N-dimethylaminopropyl (meth) acrylate, N,N-diethylaminopropyl (meth) acrylate, N,N-dimethylaminoethyl(meth) acrylamide, N,N-diethylaminoethyl(meth)acrylamide, N,N-dimethylaminopropyl(meth)acrylamide, N,N-diethylaminopropyl(meth)acrylamide with methyl chloride, ethyl chloride, methyl bromide, ethyl bromide, methyl iodide or ethyl iodide; and their sulfonates, alkylsulfonates, acetates or alkylcarboxylates derived from them through anion substitution.

Concretely, for example, they include monomethyldiallylammonium chloride, trimethyl-2-(methacryloyloxy)ethylammonium chloride, triethyl-2-(methacryloyloxy)ethylammonium chloride, trimethyl-2-(acryloyloxy) ethylammonium chloride, triethyl-2-(acryloyloxy) ethylammonium chloride, trimethyl-3-(methacryloyloxy) propylammonium chloride, triethyl-3-(methacryloyloxy) propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino)propylammonium chloride, triethyl-3-(acryloylamino)propylammonium chloride, N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino)propylammonium chloride, trimethyl-2-(methacryloyloxy)ethylammonium bromide, trimethyl-3-(acryloylamino)propylammonium bromide, trimethyl-2-(methacryloyloxy)ethylammonium sulfonate, trimethyl-3-(acryloylamino)propylammonium acetate.

In addition, N-vinylimidazole and N-vinyl-2-methylimidazole, etc. are also copolymerizable monomers for use herein.

Also usable are allylamine, diallylamine and their derivatives and salts. Examples of the compounds are allylamine, allylamine hydrochloride, allylamine acetate, allylamine sulfate, diallylamine, diallylamine hydrochloride, diallylamine acetate, diallylamine sulfate, diallylmethylamine and its salts (e.g., its hydrochloride, acetate, sulfate), diallylethylamine and its salts (e.g., its hydrochloride, acetate, sulfate) and diallyldimethylammonium salt (its counter anion includes chloride, sulfate and acetate ions). These allylamine and diallylamine derivatives are poorly polymerizable when they are in the form of free amines. In general, therefore, their salts are polymerized and the resulting polymers are optionally desalted.

Further, units of N-vinylacetamide or N-vinylformamide may also be used, and the polymers formed are hydrolyzed to form vinylamine units, and they may be further converted into their salts for use herein.

The non-mordant monomer does not contain a basic or cationic moiety of primary to tertiary amino groups and their salts or quaternary ammonium bases, and does not interact with dye in inkjet ink or substantially interacts little with it.

The non-mordant monomer includes, for example, alkyl (meth)acrylates; cycloalkyl (meth)acrylates such as cyclohexyl (meth)acrylate; vinyl esters such as vinyl acetate, vinyl propionate, vinyl versatate; allyl esters such as allyl acetate; halogen-containing monomers such as vinylidene chloride, vinyl chloride; vinyl cyanides such as (meth)acrylonitrile; and olefins such as ethylene, propylene.

Of the alkyl (meth)acrylates, those in which the alkyl moiety has from 1 to 18 carbon atoms are preferred. They include, for example, methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, stearyl (meth)acrylate.

Of those, more preferred are methyl acrylate, ethyl acrylate, methyl methacrylate, ethyl methacrylate and hydroxyethyl methacrylate.

One or more of the non-mordant monomers may be used singly or as combined.

Other preferred examples of the cationic polymer are polydiallyldimethylammonium chloride, polymethacryloyloxyethyl-β-hydroxyethyldimethylammonium chloride, polyethylenimine, polyallylamine and its derivatives, polyamide-polyamine resin, cationated starch, dicyandiamide-formalin condensate, dimethyl-2-hydroxypropylammonium salt polymer, polyamidine, polyvinylamine; dicyan cationic resins such as typically dicyandiamide-formalin polycondensate; polyamine cationic resins such as typically dicyandiamide-diethylenetriamine polycondensate; epichlorohydrin-dimethylamine addition polymer, dimethyldiallylammonium chloride-$SO_2$ copolymer, diallylamine salt-$SO_2$ copolymer, and (meth)acrylate-containing polymer that has a quaternary ammonium base-substituted alkyl group in the ester moiety.

For the inorganic mordant usable in the fourth aspect of the invention, referred to are those mentioned hereinabove in the section of the second aspect of the invention.

(Other Components)

For the other components that may be optionally in the inkjet recording sheet in the fourth aspect of the invention, referred to are those mentioned hereinabove in the section of the first aspect of the invention.

(Support)

For the support in the fourth aspect of the invention, referred to are those mentioned hereinabove in the section of the first aspect of the invention.

(Fabrication of Inkjet Recording Sheet)

In the invention, the colorant-receiving layer may be formed on the inkjet recording sheet in any known coating method, not specifically defined. For it, for example, usable is any of an extrusion die coater, an air doctor coater, a blade coater, a rod coater, a knife coater, a squeeze coater, a reverse roll coater or a bar coater. One or more colorant-receiving layers may be formed on the sheet, having a single-layered or multi-layered structure. In addition, the sheet may additionally have an ink solvent absorbent layer, an interlayer, a protective layer and others. In the invention, the inorganic mordant may be in every colorant-receiving layer or around the ink-receiving face of the sheet.

For example, it is desirable that the colorant-receiving layer is formed by applying a first coating liquid (hereinafter this will be referred to as "coating liquid (A4)") that contains at least particles and a water-soluble resin, onto a support, applying a second coating liquid (hereinafter this will be referred to as "coating liquid (B4)") that contains at least a mordant and has a pH of 7.1 or more, onto the coating layer either (1) simultaneously with the coating or (2) while the coating layer formed is dried but before it exhibits a falling rate of drying, and crosslinking and curing the coating layer having the second coating liquid applied thereonto (wet-on-wet method). The pH of the coating liquid (B4) is preferably at least 7.5 and more preferably at least 8. In the method, the inorganic mordant to be in the colorant-receiving layer in the invention is preferably in at least either of the coating liquid (A4) or the coating liquid (B4). It is more preferably in the coating liquid (A4). Also preferably, a crosslinking agent for crosslinking the water-soluble resin is in at least either of the coating liquid (A4) or the coating liquid (B4).

Forming the crosslinked and cured, colorant-receiving layer in the sheet is preferred in view of the ink absorbability and the cracking resistance of the layer.

In the fourth aspect of the invention, the coating liquid (A4) for forming the colorant-receiving layer that contains at least particles (for example, fumed silica) and a water-soluble resin (e.g., polyvinyl alcohol) may be prepared, for example, as in the third aspect of the invention described hereinabove.

For the details of the aqueous dispersion of the fumed silica and dispersant, the solvent and the dispersant in each step, the method of applying the colorant-receiving layer coating liquid onto the support, the method of drying the first coating liquid, the method of applying the second coating liquid before the first coating layer exhibits a falling rate of drying, the method of simultaneously coating the two layer (double layer coating) and the liquid for the barrier layer in the fourth aspect of the invention, referred to are those described hereinabove in the section of the third aspect of the invention.

In addition for the details of the calendering treatment of the colorant-receiving layer, the thickness of the colorant-receiving layer, the pore size of the colorant-receiving layer, the transparency of the colorant-receiving layer, the dispersion of polymer particles optionally added to the constitutive layers of the inkjet recording sheet and the method of fabricating the inkjet recording sheet in the fourth aspect of the invention, referred to are those described hereinabove in the section of the first aspect of the invention.

<Inkjet Recording Method>

For the modes of the inkjet recording method of the fourth aspect of the invention, referred to are those described hereinabove in the section of the first aspect of the invention.

EXAMPLES

Examples of the first aspect of the invention are described below, to which, however, the invention is not limited. In the Examples, "part" is by weight.

Example 1

(Preparation of Aqueous Ink)

Deionized water was added to the following ingredients to make 1 liter, and stirred for 1 hour under heat at 30 to 40° C. Next, its pH was made 9 with 10 mol/liter of KOH added thereto, and this was filtered under reduced pressure through a 0.25 μm-microfilter to prepare light magenta ink.

| | |
|---|---|
| Magenta dye (T-1) of the following structural formula | 7.5 g/liter |
| Diethylene glycol | 50 g/liter |
| Urea | 10 g/liter |
| Glycerin | 200 g/liter |
| Triethylene glycol monobutyl ether | 120 g/liter |
| 2-Pyrrolidone | 20 g/liter |
| SURFINOL 465 (surfactant by Air Products Japan, Inc.) | 10.5 g/liter |
| Triethanolamine | 6.9 g/liter |
| Benzotriazole | 0.08 g/liter |
| PROXEL XL-2 (microbicide by ICI Japan) | 3.5 g/liter |

The dye and the additives were varied, and magenta ink, light cyan ink, cyan ink, yellow ink and black ink were prepared to produce an ink set 101 as in Table 1.

TABLE 1

| | Composition of Ink Set 101 | | | | | |
|---|---|---|---|---|---|---|
| | Light Magenta | Magenta | Light Cyan | Cyan | Yellow | Black |
| Dye (g/liter) | T-1 (7.5) | T-1 (30.0) | T-2 (8.75) | T-2 (35.0) | T-3 (29.0) | T-4 (20.0) |
| | | | | | | T-5 (20.0) |
| | | | | | | T-6 (20.0) |
| | | | | | | T-3 (21.0) |
| Diethylene Glycol (g/liter) | 50 | 80 | 170 | 110 | 90 | 10 |
| Urea (g/liter) | 10 | 70 | — | — | — | — |
| Glycerin (g/liter) | 200 | 150 | 170 | 150 | 150 | 160 |
| Triethylene Glycol Monobutyl Ether (g/liter) | 120 | 120 | 130 | 130 | 130 | — |
| Diethylene Glycol Monobutyl Ether (g/liter) | — | — | — | — | — | 110 |
| 2-Pyrrolidone (g/liter) | 20 | — | — | — | — | 50 |
| SURFINOL 465 (g/liter) | 10.5 | 10 | 9.8 | 10.5 | — | — |
| SURFINOL STG (g/liter) | — | — | — | — | 8.5 | 9.8 |
| Triethanolamine (g/liter) | 6.9 | 7 | 6 | 6 | 0.9 | 15 |
| Benzotriazole (g/liter) | 0.08 | 0.07 | 0.08 | 0.08 | — | 0.06 |
| PROXEL XL-2 (g/liter) | 3.5 | 1.5 | 1.1 | 1.2 | 1.5 | 1.1 |

(T-1)  (0.61)

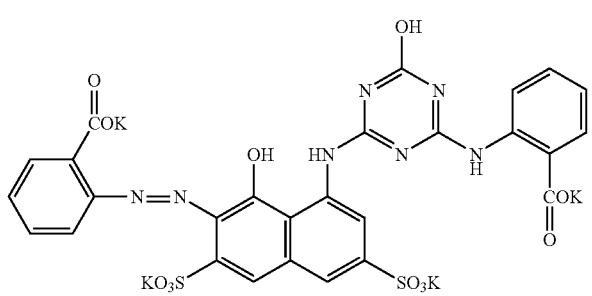

TABLE 1-continued

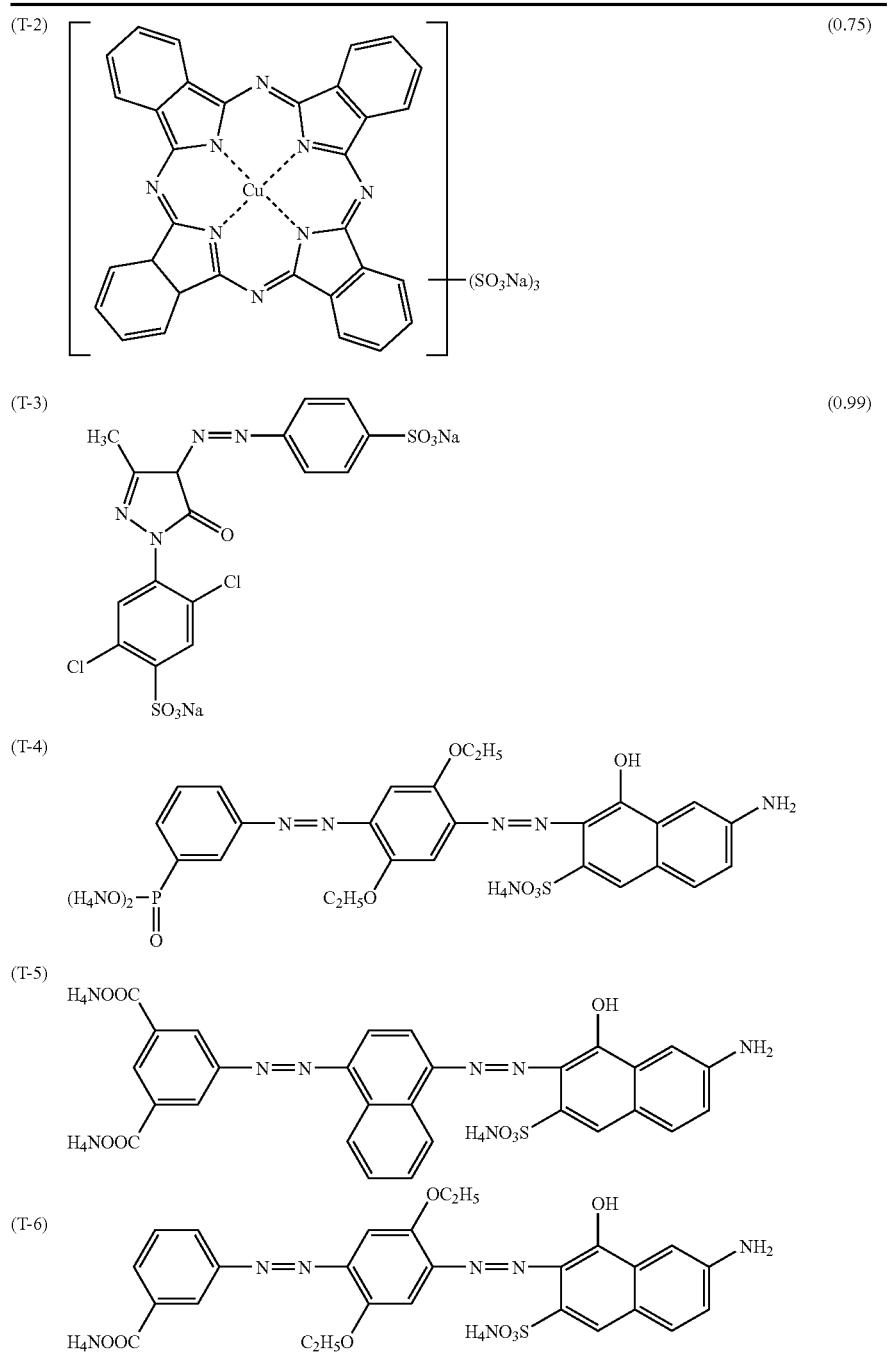

Next, the dye in each of the light magenta, magenta, light cyan, cyan and yellow inks of the ink set 101 was varied as in Table 2 to produce ink sets 102 to 106. In changing it, the dye was so controlled that its amount could be equimolar to each other, and the dye concentration was so controlled that the transmission density of every ink could be the same as that in the ink set 101. In combining them, the dyes were mixed in a ratio of 1/1 by mol.

TABLE 2

| Ink Set | Light Magenta | Magenta | Light Cyan | Cyan | Yellow |
|---|---|---|---|---|---|
| 101 | T-1 | T-1 | T-2 | T-2 | T-3 |
| 102 | T-1 | T-1 | C-10 | C-10 | T-3 |
| 103 | M-11 | M-11 | T-2 | T-2 | T-3 |
| 104 | M-11 | M-11 | C-10 | C-10 | T-3 |
| 105 | M-10 | M-10 | C-40 | C-40 | Y-4 |
| 106 | M-6 | M-3 | C-42 | C-40 | Y-24 Y-25 |

(Formation of Support)

In a double disc refiner, wood pulp of 100 parts of LBKP was beaten to a degree of Canadian freeness of 300 ml, and 0.5 parts of epoxybehenamide, 1.0 part of anionic polyacrylamide, 0.1 parts of polyamidopolyamine-epichlorohydrin and 0.5 parts of cationic polyacrylamide, all in terms of the ratio by weight to the absolute dry weight of the pulp, were added to it. Using a Fourdrinier paper machine, this was metered and made into base paper of 170 g/m².

To control its surface size, the base paper was dipped in an aqueous 4% polyvinyl alcohol solution containing 0.04% of a fluorescent brightener (WHITEX BB by Sumitomo Chemical Co., Ltd.) so that the sizing agent infiltrated into the base paper could be 0.5 g/m² in terms of the absolute dry weight, then dried, and calendered. Thus processed, the base paper had a controlled density of 1.05 g/cc.

The wire-contacted surface (back surface) of the base paper was treated with corona discharge, and then coated with high-density polyethylene of 19 μm thick, using a melt extruder. A mat resin layer was thus formed on the back surface of the base paper (the resin-coated surface is hereinafter referred to as the "back" of the base paper). The back resin layer was treated with corona discharge, and an aqueous dispersion of antistatic agent, aluminium oxide (ALUMINA SOL 100 by Nissan Chemical Industries, Ltd.) and silicon dioxide (SNOWTEX O by Nissan Chemical Industries, Ltd.) in a ratio of ½ by weight, was applied thereto to form a layer having a dry weight of 0.2 g/m².

Further, the felt surface (face) not coated with the resin layer was treated with corona discharge, and low-density polyethylene containing 10% of anatase-type titanium dioxide, minor ultramarine and 0.01% (relative to polyethylene) of a fluorescent brightener and having MFR (melt flow rate) of 3.8 was melt-extruded onto it, using a melt extruder, to form a layer having a thickness of 29 μm. A glossy thermoplastic resin layer was thus formed on the face of the base paper to complete a support (the glossy surface is hereinafter referred to as the "face" of the support).

(Preparation of Coating Liquid A1 for Colorant-Receiving Layer)

In the composition mentioned below, (1) fumed silica particles, (2) ion-exchanged water and (3) SHALLOL DC-902P were mixed, and dispersed for 20 minutes using KD-P (by Shinmaru Enterprises) at 10,000 rpm. Then, a solution containing the following (4) polyvinyl alcohol, (5) boric acid, (6) polyoxyethylene lauryl ether and (7) ion-exchanged water was added to it, and further dispersed for 20 minutes at 10,000 rpm to prepare a coating liquid A1 for colorant-receiving layer.

The ratio by weight of the silica particles to the water-soluble resin, PB ratio (1)/(4) was 4.5/1, and the coating liquid A1 was acidic, having a pH of 3.5.

(Preparation of Coating Liquid A2 for Colorant-Receiving Layer)

A coating liquid A2 for colorant-receiving layer was prepared in the same manner as in preparing the coating liquid A1, except for further adding 1.4 parts of zirconyl acetate (ZIRCOSOL ZA-30 by Daiichi Kigenso Kagaku Kogyo Co., Ltd, aqueous 30% solution).

(Preparation of Coating Liquid A3 for Colorant-Receiving Layer)

A coating liquid A3 for colorant-receiving layer was prepared in the same manner as in preparing the coating liquid A1, except for further adding 1.0 part of basic zirconyl chloride (ZIRCOSOL ZC-2 by Daiichi Kigenso Kagaku Kogyo Co., Ltd.).

(Preparation of Coating Liquid A4 for Colorant-Receiving Layer)

A coating liquid A4 for colorant-receiving layer was prepared in the same manner as in preparing the coating liquid A1, except for further adding 0.8 parts of aluminium chloro hydrate ($Al_2(OH)_5Cl$, aqueous 40% solution), and using polyvinyl alcohol PVA235 (by Kuraray Co., Ltd., having a degree of saponification of 88% and a degree of polymerization of 3500) instead of polyvinyl alcohol PVA124.

(Preparation of Coating Liquid A5 for Colorant-Receiving Layer)

A coating liquid A5 for colorant-receiving layer was prepared in the same manner as in preparing the coating liquid A1, except for further adding 0.4 parts of aluminium chloro hydrate ($Al_2(OH)_5Cl$, aqueous 40% solution).

(Preparation of Coating Liquid A6 for Colorant-Receiving Layer)

A coating liquid A6 for colorant-receiving layer was prepared in the same manner as in preparing the coating liquid A1, except for further adding 0.2 parts of titanium lactate and 0.7 parts of aluminium chloro hydrate ($Al_2(OH)_5Cl$, aqueous 40% solution).

(Preparation of Coating Liquid A7 for Colorant-Receiving Layer)

A coating liquid A7 for colorant-receiving layer was prepared in the same manner as in preparing the coating liquid A1, except for further adding 0.4 parts of lanthanum nitrate.

(Preparation of Coating Liquid A8 for Colorant-Receiving Layer)

A coating liquid A8 for colorant-receiving layer was prepared in the same manner as in preparing the coating liquid A1, except for further adding 1.0 part of methacrylate

| <Composition of coating liquid A1 for colorant-receiving layer> | |
|---|---|
| (1) Fumed silica particles (inorganic particles) (Tokuyama's REOLOSIL QS-30 having an average primary particle diameter of 7 nm) | 10.0 parts |
| (2) Ion-exchanged water | 51.7 parts |
| (3) Polydimethyldiallylamine quaternary ammonium salt (SHALLOL DC-902P by Daiichi Kogyo Seiyaku Co. Ltd.) | 0.8 parts |
| (4) Aqueous solution of 8% polyvinyl alcohol (water-soluble resin) (PVA124 by Kuraray Co., Ltd., having a degree of saponification of 98.5% and a degree of polymerization of 2400) | 27.8 parts |
| (5) Boric acid (crosslinking agent) | 0.4 parts |
| (6) Polyoxyethylene lauryl ether (surfactant) (EMULGEN 109P by Kao Corporation, aqueous 10% solution, having HLB of 13.6) | 1.2 parts |
| (7) Ion-exchanged water | 33.0 parts | quaternary ammonium salt (SHALLOL DM-283P by Daiichi Kogyo Seiyaku Co. Ltd.).

(Preparation of Coating Liquid A9 for Colorant-Receiving Layer)

A coating liquid A9 for colorant-receiving layer was prepared in the same manner as in preparing the coating liquid A1, except for changing the amount of polydimethyldiallylamine quaternary ammonium salt (SHALLOL DC-902P by Daiichi Kogyo Seiyaku Co. Ltd.) to 1.6 parts instead of 0.8 parts.

(Preparation of Coating Liquid A10 for Colorant-Receiving Layer)

A coating liquid A10 for colorant-receiving layer was prepared in the same manner as in preparing the coating liquid A1, except for further adding 1.0 part of polydimethyldiallylamine quaternary ammonium salt (PAS-A-1 by Nitto Boseki Co., Ltd.).

(Preparation of Coating Liquid A11 for Colorant-Receiving Layer)

A coating liquid A11 for colorant-receiving layer was prepared in the same manner as in preparing the coating liquid A1, except for further adding 1.0 part of polydimethylmethylenepiperidinium chloride quaternary ammonium salt (ADEKATHIOACE PD-50 by Asahi Denka Co. Ltd.).

(Fabrication of Inkjet Recording Sheet)

The face of the support was treated with corona discharge. Using an extrusion die coater, any of the coating liquids A1 to A11 prepared above was applied to it to a thickness of 200 ml/m$^2$ (coating step). Thus coated, this was dried with a hot air drier at 80° C. (hot air speed: 3 to 8 m/sec) to make the coating layer have a solid content of 20%. Through the process, inkjet recording sheets (A1) to (A11) were fabricated, in which the colorant-receiving layer had a dry thickness of 32 μm.

(Image Recording and Evaluation)

Each of the ink sets 101 to 106 is filled into a cartridge of an inkjet printer, PM 950C (by Seiko Epson Corp.). Using the printer with the ink-filled cartridge therein, an image is printed on the inkjet recording sheets (A1) to (A11) coated with the coating liquids A1 to A11, respectively, and evaluated as follows.

<Image Stability>

Gray print samples are produced with every ink set and evaluated for the image stability in the manner mentioned below.

1. Lightfastness (Light Resistance):

Immediately after printed, the chromaticity (a*1, b*1) and the lightness (L1) of the image are measured with Gretag's SPM100-II. Then, the image is exposed to xenon light (85,000 luxes) for 7 days, using a weather meter of Atlas, and its chromaticity (a*2, b*2) and lightness (L2) are again measured. The color difference (ΔE) before and after exposure to light is obtained according to the following numerical formula (I):

$$\Delta E = \{(a^*1 - a^*2)^2 + (b^*1 - b^*2)^2 + (L1 - L2)^2\}^{1/2} \quad (I)$$

The color difference is obtained at different three points having a reflection density of 1.0, 1.3 or 1.6. The samples of which the color difference is lower than 5 at every point are indicated as A; those of which the color difference is lower than 5 at some points but not lower than 5 at some other points are indicated as B; and those of which the color difference is not lower than 5 at every point are indicated as C.

2. Ozone Resistance:

The samples are stored in a box having a predetermined ozone gas concentration of 0.5 ppm, for 7 days. The color difference of each sample before and after the storage is obtained in the same manner as that for the lightfastness. Thus tested, every sample is evaluated for the dye retention at different three points having a reflection density of 1.0, 1.3 or 1.6. The samples of which the color difference is lower than 10 at every point are indicated as A; those of which the color difference is lower than 10 at some points but not lower than 10 at some other points are indicated as B; and those of which the color difference is not lower than 10 at every point are indicated as C. The ozone gas concentration in the box is controlled by using an ozone gas monitor, Applics' Model OZG-EM-01.

All the above test results are given in Table 3 below.

TABLE 3

| Ink Set | Inkjet Recording Sheet | Light Resistance | Ozone Resistance | Remarks |
|---|---|---|---|---|
| 101 | (A1) | C | C | comparison |
| 102 | (A1) | C | C | comparison |
| 103 | (A1) | C | C | comparison |
| 104 | (A1) | B | B | comparison |
| 105 | (A1) | B | B | comparison |
| 106 | (A1) | B | B | comparison |
| 101 | (A2) | C | C | comparison |
| 102 | (A2) | C | C | comparison |
| 103 | (A3) | B | C | comparison |
| 104 | (A4) | A | A | the invention |
| 105 | (A5) | A | A | the invention |
| 106 | (A6) | A | A | the invention |
| 105 | (A7) | A | A | the invention |
| 105 | (A8) | B | B | comparison |
| 105 | (A9) | B | B | comparison |
| 105 | (A10) | B | B | comparison |
| 105 | (A11) | B | B | comparison |

It is confirmed from Table 3 that the examples of the inkjet recording method of the invention give images of good light resistance and ozone resistance, as compared with the comparative examples. In addition, the images formed according to the method of the examples of the invention were found good in point of all the bleeding resistance, the waterproofness, the heat resistance, the glossiness, the ink absorption and the image density.

Example 2

The same ink as that produced in Example 1 was charged into an inkjet printer BJF900 (by Canon Inc.), with which an image was printed on the inkjet recording sheet (A4). This was evaluated in the same manner as in Example 1, and it gave the same result as in Example 1.

Example 3

An ink set 201 was prepared in the same manner as in the ink set 101 in Example 1, except for using oil-soluble dye inks of light magenta, magenta, light cyan, cyan and yellow dyes prepared in the manner mentioned below.

8 g of a dye (M-24) and 60 g of a surfactant (EMAL 20C by Kao Corporation) were dissolved in 6 g of a high-boiling-point organic solvent (S-1), 10 g of a high-boiling-point organic solvent (S-2), 1.0 g of an additive (A-1) and 50 ml of ethyl acetate at 70° C. With stirring with a magnetic stirrer, 500 ml of deionized water was added to the resulting solution to prepare a coarse, oil-in-water dispersion.

The structural formulae of the high-boiling-point organic solvents (S-1) and (S-2) and the additive (A-1) are shown below.

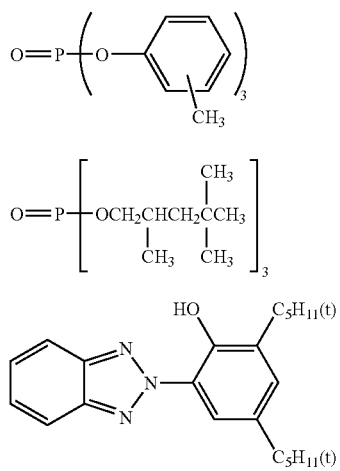

Next, the coarse dispersion was fined down by passing it five times through a microfluidizer (by Microfluidex Inc.) under a pressure of 60 MPa. Further, the resulting emulsion was evaporated for solvent removal by using a rotary evaporator until it gave no more odor of ethyl acetate.

140 g of diethylene glycol, 64 g of glycerin and other additives such as urea were added to the thus-obtained fine emulsion of hydrophobic dye, and deionized water was added thereto to make 1 liter. Then, this was controlled to have a pH of 9 with 10 mol/liter of KOH added thereto. Thus prepared, this is light magenta ink as in Table 4. The volume-average particle size of the emulsion ink was measured with MICROTRACK UPA (by Nikkiso Co., Ltd.), and was 40 nm.

The dye and its amount, the high-boiling-point organic solvents and their amount, and the additives and their amount were varied, to prepare magenta ink, light cyan ink, cyan ink and yellow ink as in Table 4. This is the ink set 201. The data in Table 4 indicate the final composition after solvent removal.

Next, the dye in each ink of the ink set 201 was varied as in Table 5 to produce ink sets 202 to 204. In changing it, the dye was so controlled that its amount could be equimolar to each other, and the dye concentration was so controlled that the transmission density of every ink could be the same as that in the ink set 201.

TABLE 5

| Ink Set | Light Magenta | Magenta | Light Cyan | Cyan | Yellow |
|---|---|---|---|---|---|
| 201 | M-24 | M-24 | C-22 | C-22 | Y-30 |
| 202 | M-21 | M-21 | C-22 | C-22 | Y-30 |
| 203 | M-23 | M-24 | C-24 | C-24 | Y-34 |
| 204 | M-24 | M-24 | C-37 | C-37 | Y-35 |

(Image Recording and Evaluation)

Each of the ink sets 201 to 204 is filled into a cartridge of an inkjet printer, PM 950C (by Seiko Epson Corp.). Using the printer with the ink-filled cartridge therein, an image is printed on the above-mentioned, colorant-receiving layer-having inkjet recording sheets, and evaluated as follows.

<Image Stability>

Gray print samples are produced with every ink set and evaluated for the image stability in the manner mentioned below.

1. Lightfastness (Light Resistance):

Immediately after printed, the chromaticity ($a*1$, $b*1$) and the lightness (L1) of the image are measured with Gretag's SPM100-II. Then, the image is exposed to xenon light (85,000 luxes) for 7 days, using a weather meter of Atlas, and its chromaticity ($a*2$, $b*2$) and lightness (L2) are again measured. The color difference ($\Delta E$) before and after exposure to light is obtained according to the following numerical formula (I):

$$\Delta E = \{(a*1-a*2)^2 + (b*1-b*2)^2 + (L1-L2)^2\}^{1/2} \quad (I)$$

The color difference is obtained at different three points having a reflection density of 1.0, 1.3 or 1.6. The samples of which the color difference is lower than 5 at every point are indicated as A; those of which the color difference is lower than 5 at some points but not lower than 5 at some other points are indicated as B; and those of which the color difference is not lower than 5 at every point are indicated as C.

TABLE 4

Composition of Ink Set 201

|  | Light Magenta | Magenta | Light Cyan | Cyan | Yellow |
|---|---|---|---|---|---|
| Dye (g/liter) | M-24 (5.00) | M-24 (20.0) | C-22 (11.2) | C-22 (44.6) | Y-30 (27.2) |
| High-Boiling-Point (S-1) Organic Solvent (S-2) (g/liter) | 3.75 6.25 | 14.52 25.52 | 8.1 14.3 | 32.4 57.1 | 20.0 34.5 |
| Additive (A-1) (g/liter) | 0.625 | 2.5 | 1.2 | 4.8 | 3.2 |
| EMAL 20C (g/liter) | 38 | 120 | 46.5 | 186 | 150 |
| Diethylene Glycol (g/liter) | 87.5 | 87.5 | 87.5 | 87.5 | 87.5 |
| Glycerin (g/liter) | 40 | 40 | 40 | 40 | 40 |
| SURFINOL 465 (g/liter) | 10 | 10 | 10 | 10 | 10 |
| Triethanolamine (g/liter) | 7.5 | 7.5 | 7.5 | 7.5 | 7.5 |
| Benzotriazole (g/liter) | 0.075 | 0.075 | 0.075 | 0.075 | 0.075 |
| PROXEL XL2 (g/liter) | 2.5 | 2.5 | 2.5 | 2.5 | 2.5 |
| Deionized water added to make 1 liter. |  |  |  |  |  |
| Volume-Average Particle Size | 40 nm | 45 nm | 35 nm | 41 nm | 38 nm |

2. Ozone Resistance:

The samples are stored in a box having a predetermined ozone gas concentration of 0.5 ppm, for 7 days. The color difference of each sample before and after the storage is obtained in the same manner as that for the lightfastness. Thus tested, every sample is evaluated for the dye retention at different three points having a reflection density of 1.0, 1.3 or 1.6. The samples of which the color difference is lower than 10 at every point are indicated as A; those of which the color difference is lower than 10 at some points but not lower than 10 at some other points are indicated as B; and those of which the color difference is not lower than 10 at every point are indicated as C. The ozone gas concentration in the box is controlled by using an ozone gas monitor, Applics' Model OZG-EM-01.

All the above test results are given in Table 6 below.

TABLE 6

| Ink Set | Inkjet Recording Sheet | Light Resistance | Ozone Resistance | Remarks |
|---|---|---|---|---|
| 101 | (A1) | C | C | comparison |
| 102 | (A1) | C | C | comparison |
| 103 | (A1) | C | C | comparison |
| 201 | (A4) | A | A | the invention |
| 202 | (A4) | A | A | the invention |
| 203 | (A4) | A | A | the invention |
| 204 | (A3) | A | A | the invention |

It is confirmed from Table 6 that the examples of the inkjet recording method of the invention give images of good light resistance and ozone resistance, as compared with the comparative examples. In addition, the images formed according to the method of the examples of the invention were found good in every point of the bleeding resistance, the waterproofness, the heat resistance, the glossiness, the ink absorption and the image density.

Examples of the second aspect of the invention are described below, to which, however, the invention is not limited. In the Examples, "part" and "%" are by weight.

Example 4

(Preparation of Aqueous Ink)

Aqueous inks were prepared in the same manner as in Example 1 that demonstrates the first aspect of the invention, and the ink sets as in Table 2 above were produced.

(Formation of Support)

A support was formed in the same manner as in Example 1 that demonstrates the first aspect of the invention.

(Preparation of Coating Liquid B1 for Colorant-Receiving Layer)

In the composition mentioned below, (1) fumed alumina particles, (2) ion-exchanged water and (3) SHALLOL DC-902P were mixed, and dispersed for 20 minutes using KD-P (by Shinmaru Enterprises) at 10,000 rpm. Then, a solution containing the following (4) polyvinyl alcohol, (5) boric acid, (6) polyoxyethylene lauryl ether and (7) ion-exchanged water was added to it, and further dispersed for 20 minutes at 10,000 rpm to prepare a coating liquid B1 for colorant-receiving layer.

<Composition of coating liquid B1 for colorant-receiving layer>

| | | |
|---|---|---|
| (1) | Fumed alumina particles (ALUMINIUM OXIDE C by Nippon Aerosil Co., Ltd., having an average primary particle diameter of 10 nm) | 10.0 parts |
| (2) | Ion-exchanged water | 51.7 parts |
| (3) | Polydimethyldiallylamine quaternary ammonium salt (SHALLOL DC-902P by Daiichi Kogyo Seiyaku Co. Ltd.) | 0.33 parts |
| (4) | Aqueous solution of 8% polyvinyl alcohol (water-soluble resin) (PVA124 by Kuraray Co., Ltd., having a degree of saponification of 98.5% and a degree of polymerization of 2400) | 27.8 parts |
| (5) | Boric acid (crosslinking agent) | 0.4 parts |
| (6) | Polyoxyethylene lauryl ether (surfactant) (EMULGEN 109P by Kao Corporation, aqueous 10% solution, having HLB of 13.6) | 1.2 parts |
| (7) | Ion-exchanged water | 33.0 parts |

(Preparation of Coating Liquid B2 for Colorant-Receiving Layer)

A coating liquid B2 for colorant-receiving layer was prepared in the same manner as in preparing the coating liquid B1, except for omitting SHALLOL DC-902P.

(Preparation of Coating Liquid B3 for Colorant-Receiving Layer)

A coating liquid B3 for colorant-receiving layer was prepared in the same manner as in preparing the coating liquid B1, except for using polyvinyl alcohol PVA235 (by Kuraray Co., Ltd., having a degree of saponification of 88% and a degree of polymerization of 3500) instead of polyvinyl alcohol PVA124.

(Preparation of Coating Liquid B4 for Colorant-Receiving Layer)

A coating liquid B4 for colorant-receiving layer was prepared in the same manner as in preparing the coating liquid B1, except for changing the fumed alumina particles to fumed silica particles (REOLOSIL QS-30 by Tokuyama Corp., having an average primary particle diameter of 7 nm).

(Preparation of Coating Liquid B5 for Colorant-Receiving Layer)

An alumina hydrate was prepared with reference to the method described in the Examples in Japanese Patent 3,085,746, and its dispersion having a solid content of 10% was prepared. The dispersion of 10% alumina hydrate thus prepared was used herein. 15 parts of an aqueous 8% polyvinyl alcohol (PVA235 by Kuraray Co., Ltd.) solution was mixed with 100 parts of the alumina hydrate dispersion. Using NAMOMIZER LA31 (by Nanomizer Inc.), the resulting mixture was processed twice under a pressure of 500 kg/m². The resulting dispersion is coating liquid B5 for colorant-receiving layer.

(Preparation of Coating Liquid B6 for Colorant-Receiving Layer)

An alumina hydrate was prepared with reference to the method described in the Examples in JP-A 2000-247022, and its dispersion having a solid content of 10% was prepared. The dispersion of 10% alumina hydrate thus prepared was used herein. 15 parts of an aqueous 8% polyvinyl alcohol (PVA235 by Kuraray Co., Ltd.) solution was mixed with 100 parts of the alumina hydrate dispersion. Using Nanomizer LA31 (by Nanomizer Inc.), the resulting mixture was processed twice under a pressure of 500 kg/M$^2$. The resulting dispersion is coating liquid B6 for colorant-receiving layer.

(Fabrication of Inkjet Recording Sheet)

The face of the support was treated with corona discharge. Using an extrusion die coater, any of the coating liquids B1 to B6 prepared above was applied to it to a thickness of 200 ml/m$^2$ (coating step). Thus coated, this was dried with a hot air drier at 80° C. (hot air speed: 3 to 8 m/sec) to make the coating layer have a solid content of 20%. Through the process, inkjet recording sheets (BI) to (B6) were fabricated, in which the colorant-receiving layer had a dry thickness of from 32 to 36 μm.

(Image Recording and Evaluation)

Each of the ink sets 101 to 106 is filled into a cartridge of an inkjet printer, PM 950C (by Seiko Epson Corp.). Using the printer with the ink-filled cartridge therein, an image is printed on the inkjet recording sheets (B1) to (B6) coated with the coating liquids B1 to B6, respectively, and evaluated as follows.

<Image Stability>

The image stability was evaluated in the same manner as in Example 1 that demonstrates the first aspect of the invention.

All the test results are given in Table 7 below.

TABLE 7

| Ink Set | Inkjet Recording Sheet | Light Resistance | Ozone Resistance | Remarks |
|---|---|---|---|---|
| 101 | (B4) | C | C | comparison |
| 102 | (B4) | C | C | comparison |
| 103 | (B4) | C | C | comparison |
| 104 | (B4) | B | B | comparison |
| 105 | (B4) | B | B | comparison |
| 106 | (B4) | B | B | comparison |
| 101 | (B1) | C | C | comparison |
| 102 | (B2) | C | C | comparison |
| 103 | (B5) | B | C | comparison |
| 104 | (B1) | A | A | the invention |
| 105 | (B2) | A | A | the invention |
| 106 | (B3) | A | A | the invention |
| 105 | (B5) | A | A | the invention |
| 105 | (B6) | A | A | the invention |

The combination of the ink set and the inkjet recording sheet of the invention gave good results in every point of the bleeding resistance, the waterproofness, the heat resistance, the glossiness, the ink absorption and the image density, as compared with the comparative examples.

Example 5

The same ink as that produced in Example 4 was charged into an inkjet printer BJF900 (by Canon Inc.), with which an image was printed on the inkjet recording sheet (B5). This was evaluated in the same manner as in Example 4, and it gave the same result as in Example 4.

Example 6

In the same manner as in Example 3 that demonstrates the first aspect of the invention, oil-soluble dye inks were prepared and the ink sets as in Table 5 above were produced.

(Image Recording and Evaluation)

Each of the ink sets 201 to 204 is filled into a cartridge of an inkjet printer, PM 950C (by Seiko Epson Corp.). Using the printer with the ink-filled cartridge therein, an image is printed on the above-mentioned, colorant-receiving layer-having inkjet recording sheets, and evaluated as follows.

<Image Stability>

The image stability was evaluated in the same manner as in Example 3 that demonstrates the first aspect of the invention.

All the test results are given in Table 8 below.

TABLE 8

| Ink Set | Inkjet Recording Sheet | Light Resistance | Ozone Resistance | Remarks |
|---|---|---|---|---|
| 101 | (B4) | C | C | comparison |
| 102 | (B4) | C | C | comparison |
| 103 | (B4) | C | C | comparison |
| 201 | (B1) | A | A | the invention |
| 202 | (B2) | A | A | the invention |
| 203 | (B5) | A | A | the invention |
| 204 | (B6) | A | A | the invention |

The combination of the ink set and the inkjet recording sheet of the invention gave good results in every point of the bleeding resistance, the waterproofness, the heat resistance, the glossiness, the ink absorption and the image density, as compared with the comparative examples.

Examples of the third aspect of the invention are described below, to which, however, the invention is not limited. In the Examples, "part" is by weight.

Example 7

(Preparation of Aqueous Ink)

Aqueous inks were prepared in the same manner as in Example 1 that demonstrates the first aspect of the invention, and the ink sets as in Table 2 above were produced.

(Formation of Support)

A support was formed in the same manner as in Example 1 that demonstrates the first aspect of the invention.

(Preparation of Coating Liquid C1 for Colorant-Receiving Layer)

In the composition mentioned below, (1) fumed silica particles, (2) ion-exchanged water and (3) SHALLOL DC-902P were mixed, and dispersed for 20 minutes using KD-P (by Shinmaru Enterprises) at 10,000 rpm. Then, a solution containing the following (4) polyvinyl alcohol, (5) boric acid, (6) polyoxyethylene lauryl ether and (7) ion-exchanged water was added to it, and further dispersed for 20 minutes at 10,000 rpm to prepare a coating liquid C1 for colorant-receiving layer.

The ratio by weight of the silica particles to the water-soluble resin, PB ratio (1)/(4) was 4.5/1, and the coating liquid C1 was acidic, having a pH of 3.5.

| <Composition of coating liquid C1 for colorant-receiving layer> | |
|---|---|
| (1) Fumed silica particles (inorganic particles) (Tokuyama's REOLOSIL QS-30 having an average primary particle diameter of 7 nm) | 10.0 parts |
| (2) Ion-exchanged water | 51.7 parts |
| (3) SHALLOL DC-902P (aqueous 52% solution) (quaternary ammonium salt, by Daiichi Kogyo Seiyaku Co. Ltd.) | 0.8 parts |
| (4) Aqueous solution of 8% polyvinyl alcohol (water-soluble resin) (PVA124 by Kuraray Co., Ltd., having a degree of saponification of 98.5% and a degree of polymerization of 2400) | 27.8 parts |
| (5) Boric acid (crosslinking agent) | 0.4 parts |
| (6) Polyoxyethylene lauryl ether (surfactant) (EMULGEN 109P by Kao Corporation, aqueous 10% solution, having HLB of 13.6) | 1.2 parts |
| (7) Ion-exchanged water | 33.0 parts |

<Fabrication of Inkjet Recording Sheet>

(Inkjet Recording Sheet (C1))

The face of the support was treated with corona discharge. Using an extrusion die coater, the coating liquid C1 prepared above was applied to it to a thickness of 200 ml/m² (coating step). Thus coated, this was dried with a hot air drier at 80° C. (hot air speed: 3 to 8 m/sec) to make the coating layer have a solid content of 20%. Through the process, an inkjet recording sheet (C1) was fabricated, in which the colorant-receiving layer had a dry thickness of 32 μm.

(Inkjet Recording Sheet (C2))

The face of the support was treated with corona discharge. Using an extrusion die coater, the coating liquid C1 prepared above was applied to it to a thickness of 200 ml/m² (coating step). Thus coated, this was dried with a hot air drier at 80° C. (hot air speed: 3 to 8 m/sec) to make the coating layer have a solid content of 20%. During this stage, the coating layer was in a constant-drying-rate period. Immediately after this, the coated support was dipped in a mordant solution C2 having the composition mentioned below, for 30 seconds, and the coating layer had 20 g/m² of the solution thereon (mordant solution applying step). Then, this was heated at 80° C. for 10 minutes (drying step). Through the process, an inkjet recording sheet (C2) was fabricated, and its colorant-receiving layer had a dry thickness of 32 μm.

(Inkjet Recording Sheet (C4))

A coating liquid C4 for colorant-receiving layer was prepared in the same manner as that for the coating liquid C1, except for using 0.4 parts of a quaternary ammonium salt, SHALLOL DM-283P (by Daiichi Kogyo Seiyaku Co. Ltd.) instead of SHALLOL DC-902P. An inkjet recording sheet (C4) was fabricated in the same manner as that for the inkjet recording sheet (C1), except for using the coating liquid C4 instead of the coating liquid C1.

(Inkjet Recording Sheet (C5))

An inkjet recording sheet (C5) was fabricated in the same manner as that for the inkjet recording sheet (C2), except for using the coating liquid C4 instead of the coating liquid C1.

(Inkjet Recording Sheet (C6))

A mordant solution C5 was prepared in the same manner as that for the mordant solution C2, except for using 25 parts of an aqueous solution of 10% polyvinylamine (by Mitsubishi Chemical Corporation, having a weight-average molecular weight of 60,000) instead of PAA-10C. An inkjet recording sheet (C6) was fabricated in the same manner as that for the inkjet recording sheet (C5), except for using the mordant solution C5 instead of the mordant solution C2.

(Image Recording and Evaluation)

Each of the ink sets 101 to 106 is filled into a cartridge of an inkjet printer, PM 950C (by Seiko Epson Corp.). Using

| <Composition of mordant coating liquid C2> | |
|---|---|
| (1) Boric acid (crosslinking agent) | 0.65 parts |
| (2) Aqueous solution of 10% polyallylamine, PAA-10C (mordant, by Nitto Boseki Co., Ltd.) | 25 parts |
| (3) Ion-exchanged water | 61.5 parts |
| (4) Ammonium chloride (surface pH-controlling agent) | 0.8 parts |
| (5) Polyoxyethylene lauryl ether (surfactant) (EMULGEN 109P by Kao Corporation, aqueous 2% solution, having HLB of 13.6) | 10 parts |
| (6) Aqueous solution of 10% MEGAFAC F1405 (Dai-Nippon Ink Chemical Industry's fluorine-containing surfactant) | 2.0 parts |

(Inkjet Recording Sheet (C3))

A mordant solution C3 was prepared in the same manner as that for the mordant solution C2, except for using 25 parts of an aqueous 10% solution of polyallylamine PAA-03 (mordant, by Nitto Boseki Co., Ltd.) instead of PAA-10C. An inkjet recording sheet (C3) was fabricated in the same manner as that for the inkjet recording sheet (C2), except for using the mordant solution C3 instead of the mordant solution C2.

the printer with the ink-filled cartridge therein, an image is printed on the inkjet recording sheets (C1) to (C6), and evaluated as follows.

<Image Stability>

The image stability is evaluated in the same manner as in Example 1 that demonstrates the first aspect of the invention.

<Image Density>

A solid image of magenta (M), cyan (C) and black (Bk) is printed on each inkjet recording sheet. After left for 3 hours as such, the reflection density of the printed surface of each sheet is measured with a reflection densitometer, Xrite's Xrite 938.

Thus tested, the image is evaluated for each color. The reflection density of magenta is evaluated as folios:

| 1.15 or more: | A |
| 1.05 or more and less than 1.15: | B |
| less than 1.05: | C |

The reflection density of cyan is evaluated as follows:

| 0.6 or more: | A |
| 0.55 or more and less than 0.6: | B |
| less than 0.55: | C |

The reflection density of black is evaluated as follos:

| 2.25 or more: | A |
| 2.15 or more and less than 2.25: | B |
| less than 2.15: | C |

(Glossiness of Black Image)

A black image is printed on each inkjet recording sheet to have a reflection density of 2.0, and its surface glossiness is measured. Concretely, using a digital angle-varying glossmeter (UGV-5D of Suga Test Instruments Co., Ltd., having an orifice for measurement of 8 mm), the glossiness of the surface of the black image is measured at 60°. The glossiness is evaluated as follows:

| 65 or more: | A |
| 55 or more and less than 65: | B |
| less than 55: | C |

Those having a higher degree of glossiness are better. All the test results are given in Table 9 below.

The combination of the ink set and the inkjet recording sheet of the invention gave good results in every point of the bleeding resistance, the waterproofness, the heat resistance and the ink absorption.

Example 8

The same ink as that produced in Example 7 was charged into an inkjet printer BJF900 (by Canon Inc.), with which an image was printed on the inkjet recording sheet (C2). This was evaluated in the same manner as in Example 7, and it gave the same result as in Example 7.

Example 9

In the same manner as in Example 3 that demonstrates the first aspect of the invention, oil-soluble dye inks were prepared and the ink sets as in Table 5 above were produced.

(Image Recording and Evaluation)

Each of the ink sets 201 to 204 is filled into a cartridge of an inkjet printer, PM 950C (by Seiko Epson Corp.). Using the printer with the ink-filled cartridge therein, an image is printed on the above-mentioned, colorant-receiving layer-having inkjet recording sheets, and evaluated as follows.

<Image Stability>

The image stability was evaluated in the same manner as in Example 3 that demonstrates the first aspect of the invention.

All the test results are given in Table 10 below.

TABLE 10

| Ink Set | Inkjet Recording Sheet | Light Resistance | Ozone Resistance | Remarks |
|---|---|---|---|---|
| 101 | (C1) | C | C | comparison |
| 102 | (C1) | C | C | comparison |
| 103 | (C1) | C | C | comparison |
| 201 | (C2) | A | A | the invention |
| 202 | (C2) | A | A | the invention |
| 203 | (C2) | A | A | the invention |
| 204 | (C2) | A | A | the invention |

TABLE 9

| Ink Set | Inkjet Recording Sheet | Light Resistance | Ozone Resistance | Image Density M | C | Bk | Glossiness | Remarks |
|---|---|---|---|---|---|---|---|---|
| 101 | (C1) | C | C | C | C | C | C | comparison |
| 102 | (C1) | C | C | C | C | C | C | comparison |
| 103 | (C4) | C | C | C | C | C | C | comparison |
| 104 | (C1) | B | B | C | C | C | C | comparison |
| 105 | (C1) | B | B | C | C | C | C | comparison |
| 106 | (C4) | B | B | C | C | C | C | comparison |
| 101 | (C2) | C | C | A | A | A | A | comparison |
| 102 | (C6) | B | C | A | A | A | A | comparison |
| 104 | (C2) | A | A | A | A | A | A | the invention |
| 105 | (C3) | A | A | A | A | A | A | the invention |
| 106 | (C5) | A | A | A | A | A | A | the invention |
| 105 | (C6) | A | A | A | A | A | A | the invention |

In addition, the combination of the ink set and the inkjet recording sheet of the invention gave solid images of magenta and cyan of high reflection density, as compared with the comparative combination.

Examples of the fourth aspect of the invention are described below, to which, however, the invention is not limited. In the Examples, "part" and "%" are by weight.

Example 10

(Preparation of Aqueous Ink)

Aqueous inks were prepared in the same manner as in Example 1 that demonstrates the first aspect of the invention, and the ink sets as in Table 2 above were produced.

(Formation of Support)

A support was formed in the same manner as in Example 1 that demonstrates the first aspect of the invention.

Preparation of Coating Liquid D1 for Colorant-Receiving Layer)

In the composition mentioned below, (1) fumed silica particles, (2) ion-exchanged water and (3) SHALLOL DC-902P were mixed, and dispersed for 20 minutes using KD-P (by Shinmaru Enterprises) at 10,000 rpm. Then, a solution containing the following (4) polyvinyl alcohol, (5) boric acid, (6) polyoxyethylene lauryl ether and (7) ion-exchanged water was added to it, and further dispersed for 20 minutes at 10,000 rpm to prepare a coating liquid D1 for colorant-receiving layer.

The ratio by weight of the silica particles to the water-soluble resin, PB ratio (1)/(4) was 4.5/1, and the coating liquid D1 was acidic, having a pH of 3.5.

(Preparation of Coating Liquid D4 for Colorant-Receiving Layer)

A coating liquid D4 for colorant-receiving layer was prepared in the same manner as in preparing the coating liquid D1, except for using 2.0 parts of Compound (1-2) (having a weight-average molecular weight of 25,000, aqueous 25% solution) mentioned hereinabove in the section of the fourth aspect of the invention instead of SHALLOL DC-902D, and using polyvinyl alcohol PVA235 (by Kuraray Co., Ltd., having a degree of saponification of 88% and a degree of polymerization of 3500) instead of polyvinyl alcohol PVA124.

(Preparation of Coating Liquid D5 for Colorant-Receiving Layer)

A coating liquid D5 for colorant-receiving layer was prepared in the same manner as in preparing the coating liquid D1, except for further adding 1.2 parts of the quaternary ammonium cationic polymer (having a weight-average molecular weight of 10,000, aqueous 30% solution) that had been prepared with reference to Example 1 in JP-A 10-119418.

(Preparation of Coating Liquid D6 for Colorant-Receiving Layer)

A coating liquid D6 for colorant-receiving layer was prepared in the same manner as in preparing the coating liquid D1, except for further adding 1.0 part of methacrylate quaternary ammonium salt (SHALLOL DM-283P, by Daiichi Kogyo Seiyaku Co. Ltd.).

(Preparation of Coating Liquid D7 for Colorant-Receiving Layer)

| <Composition of coating liquid D1 for colorant-receiving layer> | |
|---|---|
| (1) Fumed silica particles (inorganic particles) (Tokuyama's REOLOSIL QS-30 having an average primary particle diameter of 7 nm) | 10.0 parts |
| (2) Ion-exchanged water | 51.7 parts |
| (3) Polydimethyldiallylamine quaternary ammonium salt (SHALLOL DC-902P by Daiichi Kogyo Seiyaku Co. Ltd.) | 0.8 parts |
| (4) Aqueous solution of 8% polyvinyl alcohol (water-soluble resin) (PVA124 by Kuraray Co., Ltd., having a degree of saponification of 98.5% and a degree of polymerization of 2400) | 27.8 parts |
| (5) Boric acid (crosslinking agent) | 0.4 parts |
| (6) Polyoxyethylene lauryl ether (surfactant) (EMULGEN 109P by Kao Corporation, aqueous 10% solution, having HLB of 13.6) | 1.2 parts |
| (7) Ion-exchanged water | 33.0 parts |

(Preparation of Coating Liquid D2 for Colorant-Receiving Layer)

A coating liquid D2 for colorant-receiving layer was prepared in the same manner as above for preparing the coating liquid D1, to which, however, 1.6 parts of Compound (1-1) (having a weight-average molecular weight of 20,000, aqueous 25% solution) mentioned hereinabove in the section of the fourth aspect of the invention was added.

(Preparation of Coating Liquid D3 for Colorant-Receiving Layer)

A coating liquid D3 for colorant-receiving layer was prepared in the same manner as in preparing the coating liquid D1, except for further adding 1.6 parts of Compound (2-1) (having a weight-average molecular weight of 25,000, aqueous 25% solution) mentioned hereinabove in the section of the fourth aspect of the invention.

A coating liquid D7 for colorant-receiving layer was prepared in the same manner as in preparing the coating liquid D1, except for changing the amount of SHALLOL DC-902P to 1.6 parts instead of 0.8 parts.

(Preparation of Coating Liquid D8 for Colorant-Receiving Layer)

A coating liquid D8 for colorant-receiving layer was prepared in the same manner as in preparing the coating liquid D1, except for further adding 1.0 part of polydimethyldiallylamine quaternary ammonium salt (PAS-A-1, by Nitto Boseki Co., Ltd.).

(Preparation of Coating Liquid D9 for Colorant-Receiving Layer)

A coating liquid D9 for colorant-receiving layer was prepared in the same manner as in preparing the coating liquid D1, except for further adding 1.0 part of polychlorodimethylmethylene piperidinium quaternary ammonium salt (ADEKATHIOACE PD-50, by Asahi Denka Co. Ltd.).

(Preparation of Coating Liquid D10 for Colorant-Receiving Layer)

A coating liquid D10 for colorant-receiving layer was prepared in the same manner as in preparing the coating liquid D1, except for further adding 1 part of the following compound (having a weight-average molecular weight of 10,000, aqueous 20% solution).

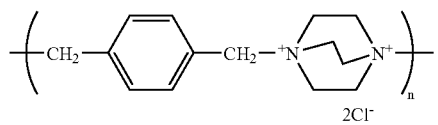

(Preparation of Coating Liquid D11 for Colorant-Receiving Layer)

A coating liquid D11 for colorant-receiving layer was prepared in the same manner as in preparing the coating liquid D1, except for using 2 parts of the following compound (having a weight-average molecular weight of 50,000, aqueous 25% solution) instead of SHALLOL DC-902P.

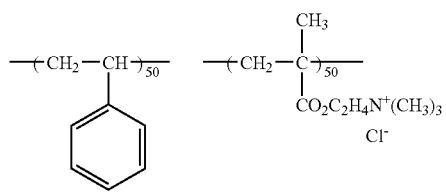

(Fabrication of Inkjet Recording Sheet)

The face of the support was treated with corona discharge. Using an extrusion die coater, any of the coating liquids D1 to D11 prepared above was applied to it to a thickness of 200 ml/m² (coating step). Thus coated, this was dried with a hot air drier at 80° C. (hot air speed: 3 to 8 m/sec) to make the coating layer have a solid content of 20%. Through the process, inkjet recording sheets (D1) to (D11) were fabricated, in which the colorant-receiving layer had a dry thickness of 32 μm.

(Image Recording and Evaluation)

Each of the ink sets 101 to 106 is filled into a cartridge of an inkjet printer, PM 950C (by Seiko Epson Corp.). Using the printer with the ink-filled cartridge therein, an image is printed on the inkjet recording sheets (D1) to (D11) coated with the coating liquids D1 to D11, respectively, and evaluated as follows.

<Image Stability>

The image stability is evaluated in the same manner as in Example 1 that demonstrates the first aspect of the invention.

<Image Density>

A solid image of magenta (M), cyan (C) and black (Bk) is printed on each inkjet recording sheet. After left for 3 hours as such, the reflection density of the printed surface of each sheet is measured with a reflection densitometer, Xrite's Xrite 938.

Thus tested, the image is evaluated for each color. The reflection density of magenta is evaluated as follows:

| | |
|---|---|
| 1.15 or more: | A |
| 1.05 or more and less than 1.15: | B |
| less than 1.05: | C |

The reflection density of cyan is evaluated as follows:

| | |
|---|---|
| 0.65 or more: | A |
| 0.6 or more and less than 0.65: | B |
| less than 0.6: | C |

The reflection density of black is evaluated as follows:

| | |
|---|---|
| 2.15 or more: | A |
| 2.05 or more and less than 2.15: | B |
| less than 2.05: | C |

All the test results are given in Table 11 below.

TABLE 11

| Ink Set | Inkjet Recording Sheet | Light Resistance | Ozone Resistance | M | C | Bk | Remarks |
|---|---|---|---|---|---|---|---|
| 101 | (D1) | C | C | C | C | B | comparison |
| 102 | (D1) | C | C | C | C | B | comparison |
| 103 | (D1) | C | C | C | C | B | comparison |
| 104 | (D1) | B | B | C | C | B | comparison |
| 105 | (D1) | B | B | C | C | B | comparison |
| 106 | (D1) | B | B | C | C | B | comparison |
| 101 | (D2) | C | C | A | A | A | comparison |
| 102 | (D4) | B | C | A | A | A | comparison |
| 103 | (D5) | B | C | B | A | B | comparison |
| 104 | (D2) | A | A | A | A | A | the invention |
| 105 | (D3) | A | A | A | A | A | the invention |
| 106 | (D4) | A | A | A | A | A | the invention |
| 105 | (D5) | A | A | A | A | A | the invention |
| 105 | (D6) | B | B | B | B | B | comparison |
| 105 | (D7) | B | B | B | B | A | comparison |
| 105 | (D8) | B | B | B | B | B | comparison |
| 105 | (D9) | B | B | B | B | B | comparison |
| 105 | (D10) | A | A | A | A | A | the invention |
| 105 | (D11) | A | A | A | A | A | the invention |

The combination of the ink set and the inkjet recording sheet of the invention gave good results in every point of the bleeding resistance, the waterproofness, the heat resistance, the glossiness and the ink absorption, as compared with the comparative examples.

Example 11

The same ink as that produced in Example 10 was charged into an inkjet printer BJF900 (by Canon Inc.), with which an image was printed on the inkjet recording sheet (D4). This was evaluated in the same manner as in Example 10, and it gave the same result as in Example 10.

Example 12

In the same manner as in Example 3 that demonstrates the first aspect of the invention, oil-soluble dye inks were prepared and the ink sets as in Table 5 above were produced.

(Image Recording and Evaluation)

Each of the ink sets 201 to 204 is filled into a cartridge of an inkjet printer, PM 950C (by Seiko Epson Corp.). Using the printer with the ink-filled cartridge therein, an image is printed on the above-mentioned, colorant-receiving layer-having inkjet recording sheets, and evaluated as follows.

<Image Stability>

The image stability was evaluated in the same manner as in Example 3 that demonstrates the first aspect of the invention.

All the test results are given in Table 12 below.

TABLE 12

| Ink Set | Inkjet Recording Sheet | Light Resistance | Ozone Resistance | Remarks |
|---|---|---|---|---|
| 101 | (D1) | C | C | comparison |
| 102 | (D1) | C | C | comparison |
| 103 | (D1) | C | C | comparison |
| 201 | (D4) | A | A | the invention |
| 202 | (D4) | A | A | the invention |
| 203 | (D4) | A | A | the invention |
| 204 | (D4) | A | A | the invention |

In addition, the combination of the ink set and the inkjet recording sheet of the invention gave solid images of magenta and cyan of high reflection density, as compared with the comparative combination.

As described in detail hereinabove with reference to its preferred embodiments, the inkjet recording method of the invention gives color images of good lightfastness and ozone resistance, and high density.

What is claimed is:

1. An inkjet recording method of forming an image on an inkjet recording sheet which has, on a support, a colorant-receiving layer containing at least one inorganic mordant, by using an inkjet recording ink set that comprises, as minimum constituent elements thereof, a yellow ink containing at least one yellow dye, a magenta ink containing at least one magenta dye and a cyan ink containing at least one cyan dye, wherein an oxidation potential of the magenta dye and an oxidation potential of the cyan dye are each nobler than 0.8 V (vs SCE).

2. The inkjet recording method of claim 1, wherein the colorant-receiving layer contains at least an aluminium-containing compound as the at least one inorganic mordant.

3. The inkjet recording method of claim 1, wherein the colorant-receiving layer contains at least a zirconium-containing compound as the at least one inorganic mordant.

4. The inkjet recording method of claim 1, wherein the colorant-receiving layer contains at least a water-soluble aluminium compound as the at least one inorganic mordant.

5. The inkjet recording method of claim 1, wherein the colorant-receiving layer contains at least a water-soluble zirconium compound as the at least one inorganic mordant.

6. The inkjet recording method of claim 1, wherein the colorant-receiving layer contains at least an aluminium chloro hydrate as the at least one inorganic mordant.

7. An inkjet recording method of forming an image on an inkjet recording sheet which has, on a support, a colorant-receiving layer containing at least one of alumina particles and alumina hydrate, by using an inkjet recording ink set that comprises, as minimum constituent elements thereof, a yellow ink containing at least one yellow dye, a magenta ink containing at least one magenta dye and a cyan ink containing at least one cyan dye, wherein an oxidation potential of the magenta dye and an oxidation potential of the cyan dye are each nobler than 0.8 V (vs SCE).

8. The inkjet recording method of claim 7, wherein the colorant-receiving layer further contains inorganic particles in addition to the one of alumina particles and alumina hydrate.

9. The inkjet recording method of claim 8, wherein the inorganic particles are silica particles having an average primary particle diameter of at most 30 nm.

10. The inkjet recording method of claim 8, wherein the inorganic particles are colloidal silica having an average primary particle diameter of at most 30 nm.

11. An inkjet recording method of forming an image on an inkjet recording sheet which has, on a support, a colorant-receiving layer that contains a cationic polymer having at least one selected from the group consisting of a primary amino group, a secondary amino group and a tertiary amino group, by using an inkjet recording ink set that comprises, as minimum constituent elements thereof, a yellow ink containing at least one yellow dye, a magenta ink containing at least one magenta dye and a cyan ink containing at least one cyan dye, wherein an oxidation potential of the magenta dye and an oxidation potential of the cyan dye are each nobler than 0.8 V (vs SCE).

12. The inkjet recording method of claim 11, wherein the cationic polymer has at least one primary amine.

13. The inkjet recording method of claim 11, wherein the cationic polymer is at least one selected from the group consisting of polyallylamine, polyvinylamine and their derivatives.

14. The inkjet recording method of claim 11, wherein:
the colorant-receiving layer is formed by crosslinking and curing a coating layer which is formed by applying a coating liquid that contains at least fine particles and a water-soluble resin;
a crosslinking agent is added to at least one of the coating liquid and a basic solution having pH of at least 7.1; and
crosslinking and curing are performed by applying the basic solution onto the coating layer at the same time that the coating liquid is applied to form the coating layer.

15. The inkjet recording method of claim 11, wherein:
the colorant-receiving layer is formed by crosslinking and curing a coating layer which is formed by applying a coating liquid containing at least fine particles and a water-soluble resin;
a crosslinking agent is added to at least one of the coating liquid and a basic solution having pH of at least 7.1; and
crosslinking and curing are performed by applying the basic solution onto the coating layer before the coating layer exhibits a falling rate of drying during drying thereof.

16. An inkjet recording method of forming an image on an inkjet recording sheet which has, on a support, a colorant-receiving layer that contains a quaternary ammonium salt cationic polymer having at least one aromatic group in a partial structure thereof, by using an inkjet recording ink set that comprises, as minimum constituent elements thereof, a yellow ink containing at least one yellow dye, a magenta ink containing at least one magenta dye and a cyan ink containing at least one cyan dye, wherein an oxidation potential of the magenta dye and an oxidation potential of the cyan dye are each nobler than 0.8 V (vs SCE).

17. The inkjet recording method of claim 16, wherein the quaternary ammonium salt cationic polymer has a benzyl bond in a partial skeleton thereof.

18. The inkjet recording method of claim 16, wherein the quaternary ammonium salt cationic polymer has at least one unit represented by the following general formula (III):

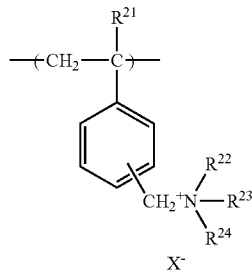

General Formula (III)

wherein $R^{21}$ represents a hydrogen atom or an alkyl group having 1 to 4 carbon atoms; $R^{22}$, $R^{23}$ and $R^{24}$ each independently represent an aliphatic group or an aromatic group; and $X^-$ represents an anionic group.

19. The inkjet recording method of claim 16, wherein the quaternary ammonium salt cationic polymer has at least one unit represented by the following general formula (IV):

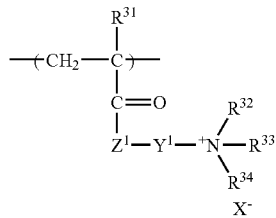

General Formula (IV)

wherein $R^{31}$ represents a hydrogen atom or an alkyl group having 1 to 4 carbon atoms; $R^{32}$ represents an aromatic group or an aromatic group-substituted alkyl group; $R^{33}$ and $R^{34}$ each independently represent an aliphatic group or an aromatic group; $Z^1$ represents —O— or —NH—; $Y^1$ represents a divalent linking group; and $X^-$ represents an anionic group.

20. The inkjet recording method of claim 16, wherein the quaternary ammonium salt cationic polymer has at least one unit represented by the following general formula (V):

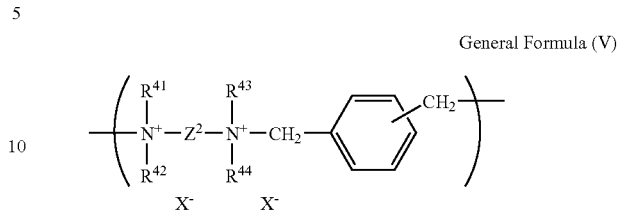

General Formula (V)

wherein $R^{41}$, $R^{42}$, $R^{43}$ and $R^{44}$ each independently represent a hydrogen atom or an aliphatic group; $Z^2$ represents a divalent linking group; $X^-$ represents an anionic group; and $R^{41}$ and $R^{43}$, or $R^{42}$ and $R^{44}$ may bond to each other to form an alkylene group.

21. The inkjet recording method of claim 16, wherein the quaternary ammonium salt cationic polymer has at least one unit represented by the following general formula (VI):

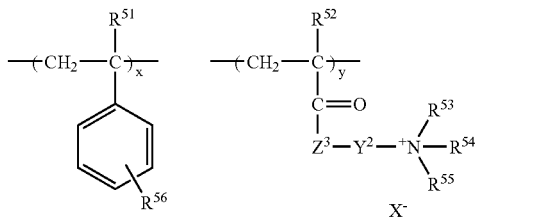

General Formula (VI)

wherein $R^{51}$ and $R^{52}$ each independently represent a hydrogen atom or an alkyl group having 1 to 4 carbon atoms; $R^{53}$, $R^{54}$ and $R^{55}$ each represent an alkyl group; $Z^3$ represents a divalent linking group; $Y^2$ represents a divalent linking group; $X^-$ represents an anionic group; and x and y each indicate an integer of 1 or more.

* * * * *